(12) United States Patent
Suzuki et al.

(10) Patent No.: US 12,533,829 B2
(45) Date of Patent: Jan. 27, 2026

(54) MANUFACTURING METHOD FOR DISPERSION BODY AND MANUFACTURING METHOD FOR CERAMIC FIRED BODY

(71) Applicants: THE SCHOOL CORPORATION KANSAI UNIVERSITY, Suita (JP); DENSO CORPORATION, Kariya (JP)

(72) Inventors: Kouhei Suzuki, Kariya (JP); Mikio Ishihara, Kariya (JP); Hideki Yamamoto, Suita (JP)

(73) Assignees: THE SCHOOL CORPORATION KANSAI UNIVERSITY, Osaka (JP); DENSO CORPORATION, Kariya (JP)

( * ) Notice: Subject to any disclaimer, the term of this patent is extended or adjusted under 35 U.S.C. 154(b) by 825 days.

(21) Appl. No.: 17/896,125

(22) Filed: Aug. 26, 2022

(65) Prior Publication Data

US 2023/0057035 A1 Feb. 23, 2023

Related U.S. Application Data

(63) Continuation of application No. PCT/JP2021/007396, filed on Feb. 26, 2021.

(30) Foreign Application Priority Data

Feb. 28, 2020 (JP) .................. 2020-034362

(51) Int. Cl.
*B28C 3/00* (2006.01)
*B28C 7/02* (2006.01)
*B28C 7/04* (2006.01)

(52) U.S. Cl.
CPC ................. *B28C 3/00* (2013.01); *B28C 7/024* (2013.01); *B28C 7/0418* (2013.01)

(58) Field of Classification Search
CPC ......... B28C 3/00; B28C 7/024; B28C 7/0418; C04B 35/622
See application file for complete search history.

(56) References Cited

U.S. PATENT DOCUMENTS 6,241,940 B1 * 6/2001 Beall ..................... C04B 35/195
264/630
6,368,992 B1 4/2002 Beall et al.

FOREIGN PATENT DOCUMENTS

| JP | 2015-113367 | | 6/2015 | |
|---|---|---|---|---|
| JP | 2015113367 A | * | 6/2015 | |
| WO | 2019/012917 | | 1/2019 | |
| WO | WO-2019012917 A1 | * | 1/2019 | .............. H01F 1/113 |

* cited by examiner

*Primary Examiner* — Elizabeth Insler
(74) *Attorney, Agent, or Firm* — Nixon & Vanderhye P.C.

(57) ABSTRACT

In a manufacturing method for manufacturing a dispersion body, a plurality of types of solid particles, water, and a liquid dispersant are mixed. In the manufacturing method, at least two types of the solid particles and at least one type of the dispersant that are selected based on a material type selection method are used, and at least an optimal amount of the dispersant that is determined based on an optimal amount determination method is added and mixed. The material type selection method is based on a Hansen solubility parameter distance to water, Hansen spheres of the solid particles, and a Hansen sphere of the dispersant.

20 Claims, 29 Drawing Sheets

COMPARATIVE EXAMPLE 1

COMPARATIVE EXAMPLE 2

COMPARATIVE EXAMPLE 3

COMPARATIVE EXAMPLE 4

EXAMPLE 1

EXAMPLE 2

EXAMPLE 3

EXAMPLE 3 AND COMPARATIVE EXAMPLE 5

FIG.15 COMPARATIVE EXAMPLE 1
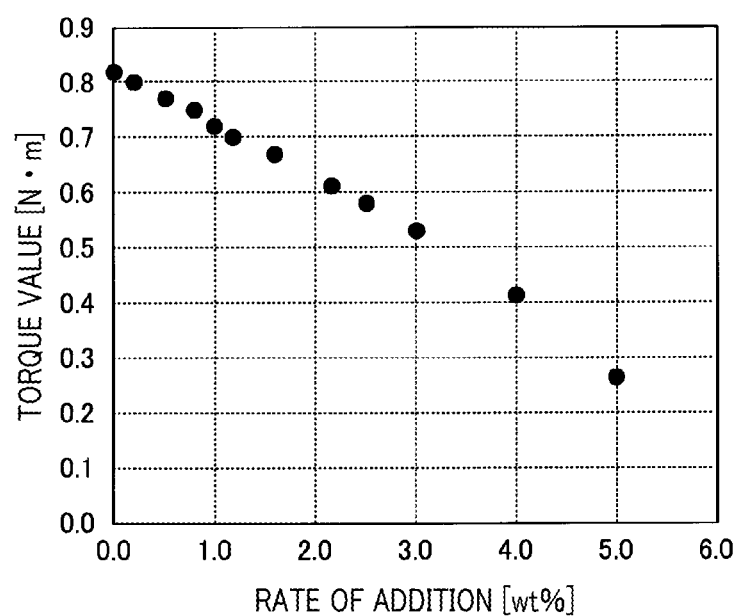

COMPARATIVE EXAMPLE 2

COMPARATIVE EXAMPLE 3

COMPARATIVE EXAMPLE 4

EXAMPLE 1

EXAMPLE 2

COMPARATIVE EXAMPLE 7

EXAMPLE 4

EXAMPLE 5

COMPARATIVE EXAMPLE 6

COMPARATIVE EXAMLE 7

EXAMPLE 4

EXAMPLE 5

MANUFACTURING METHOD FOR DISPERSION BODY AND MANUFACTURING METHOD FOR CERAMIC FIRED BODY

CROSS-REFERENCE TO RELATED APPLICATIONS

The present application is a continuation application of International Application No. PCT/JP2021/007396, filed on Feb. 26, 2021, which claims priority to Japanese Patent Application No. 2020-034362, filed on Feb. 28, 2020. The contents of these applications are incorporated herein by reference in their entirety.

BACKGROUND

Technical Field

The present disclosure relates to a manufacturing method for a dispersion body in which solid particles are dispersed in water and a manufacturing method for a ceramic sintered body.

Related Art

In a manufacturing process for a product that includes a ceramic sintered body, solid particles that serve as a ceramic raw material are dispersed in a liquid, so that a dispersion body, such as a slurry, a paste, or a green body, is manufactured. This dispersion body is molded and fired, so that the ceramic sintered body is manufactured.

SUMMARY

One aspect of the present disclosure provides a manufacturing method for manufacturing a dispersion body by mixing a plurality of types of solid particles, water, and a liquid dispersant. In the manufacturing method, at least two types of the solid particles and at least one type of the dispersant that are selected based on a material type selection method are used, and at least an optimal amount of the dispersant that is determined based on an optimal amount determination method is added and mixed. The material type selection method is based on a Hansen solubility parameter distance to water, Hansen spheres of the solid particles, and a Hansen sphere of the dispersant.

BRIEF DESCRIPTION OF THE DRAWINGS

In the accompanying drawings:

FIG. 15 is a diagram showing a relationship between the added amount of dispersant and the torque value in comparative example 1;

DESCRIPTION OF THE EMBODIMENTS

Figure 1:
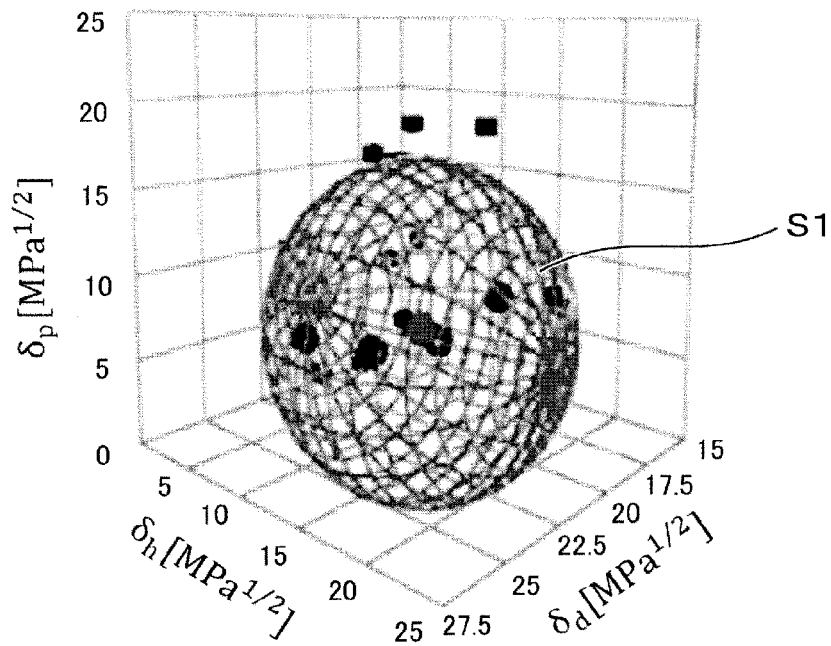
FIG. 1 is an explanatory diagram of a Hansen sphere for solid particles.

In a manufacturing process for a product that includes a ceramic sintered body, a dispersion body, such as a slurry, a paste, or a green body, is manufactured by solid particles that serve as a ceramic raw material being dispersed in a liquid. The ceramic sintered body is manufactured by this dispersion body being molded and fired. From a perspective of preventing breakage due to temperature difference during firing in the ceramic sintered body that has a large mass or volume and the like, as the liquid, use of an organic solvent is avoided and water is used.

When water is used, an issue regarding dispersibility arises. Dispersibility is unstable in a dispersion body that is composed of solid particles, a liquid dispersant, water, and the like that have been selected based on past ideas and theories. That is, tendencies in dispersibility differ depending on combinations of raw materials, and an optimal amount of dispersant also changes. In addition, even when types of raw materials are fixed, the tendencies in dispersibility may change if a manufacturer, a lot, or the like changes, and the optimal amount of dispersant may also change. When the dispersibility changes, even if firing is performed under the same firing conditions, for example, defects such as cracks may occur in the ceramic sintered body. The dispersibility may be temporarily improved and a high-dispersion state may be achieved by a mixing time during manufacturing of the dispersion body being increased. However, the high-dispersion state tends to be lost over time. As disclosed in Japanese Patent Publication No. 4782282, for improvement in dispersibility, use of a Hansen solubility parameter (that is, HSP) theory is proposed.

In general, research into the HSP theory relates to optimal selection of a solvent other than water or an optimal selection of a combination of a plurality of solvents for a single raw material. Under a premise that a plurality of solid raw materials and water are used, combinations of solid particles and liquids are limitless depending on objectives and purposes. Furthermore, an amount of dispersant is required to be determined based on the combination of solid particles and dispersant. That is, indicators for improving dispersibility are not technically established for cases in which water, a plurality of solid particle, and a dispersant are mixed. Therefore, in actuality, the combination is determined through reliance on intuition or know-how of a worker or through trial and error in experiments.

The present disclosure provides a manufacturing method for a dispersion body that has favorable dispersibility and a manufacturing method for a ceramic sintered body using the dispersion body.

A first exemplary embodiment of the present disclosure provides a manufacturing method for manufacturing a dispersion body by mixing a plurality of types of solid particles, water, and a liquid dispersant, the manufacturing method including:

using at least two types of the solid particles and at least one type of the dispersant that are selected based on a material type selection method for selecting the solid particles and the dispersant such that Hansen spheres of at least two types of the solid particles and a Hansen sphere of at least one type of the dispersant mutually overlap, and a Hansen solubility parameter distance to water of at least one type of the solid particles of which the Hansen spheres overlap that of the liquid is greatest among all solid particles used in manufacturing of the dispersion body; and adding and mixing at least an optimal amount of the dispersant that is determined based on an optimal amount determination method for fabricating a mixture by mixing all materials that are used in the manufacturing of the dispersion body, excluding the dispersant, measuring viscosity when the dispersant is gradually added to the mixture while an added amount is increased, and setting, as the optimal amount, the added amount when changes in the viscosity begin to stabilize.

A second exemplary embodiment of the present disclosure provides a manufacturing method for a dispersion body that is a method for manufacturing a dispersion body by mixing a plurality of types of solid particles, water, and a liquid dispersant, the manufacturing method including:

using at least two types of the solid particles and at least one type of the dispersant that are selected based on a material type selection method for selecting at least two types of solid particles from a solid particle candidate group of which a Hansen solubility parameter distance to water is equal to or greater than 28 MPa$^{1/2}$, and selecting the solid particles and the dispersant such that Hansen spheres of the solid particles and a Hansen sphere of at least one type of the dispersant from a dispersant candidate group mutually overlap; and adding and mixing at least an optimal amount of the dispersant that is determined based on an optimal amount determination method for fabricating a mixture by mixing all materials that are used in the manufacturing of the dispersion body, excluding the dispersant, measuring viscosity when the dispersant is gradually added to the mixture while an added amount is increased, and setting, as the optimal amount, the added amount when changes in the viscosity begin to stabilize.

A third exemplary embodiment of the disclosure provides a manufacturing method for a ceramic sintered body in which the solid particles are a ceramic raw material, the manufacturing method including molding and firing a dispersion body that is obtained by the above-described manufacturing method.

In the above-described manufacturing methods for a dispersion body according to the first and second exemplary embodiments, a combination that is suitable for high dispersion is selected as the solid particles and the dispersant. In addition, the dispersant of an amount that is suitable for this combination is added. Therefore, as a result of the above-described manufacturing methods, a dispersion body that has favorable dispersibility while containing water can be manufactured. Consequently, for example, variations in density in the dispersion body can be reduced.

In the above-described manufacturing method for a ceramic sintered body according to the third exemplary embodiment, because the dispersion body is molded, variations in density in a molded body can be reduced. Consequently, occurrence of defects, such as breakage, in the ceramic sintered body can be prevented.

As described above, according to the above-described aspects, a manufacturing method for a dispersion body that has favorable dispersibility and a manufacturing method for a ceramic sintered body using the dispersion body can be provided.

Here, reference numbers within the parentheses in the scope of claims indicate corresponding relationships with specific means according to embodiments described hereafter, and do not limit the technical scope of the present disclosure.

The above-described exemplary embodiments of the present disclosure will be further clarified through the detailed description herebelow, with reference to the accompanying drawings.

First Embodiment

An embodiment related to a manufacturing method for a dispersion body will be described. The dispersion body is manufactured by solid particles, water, and a liquid dispersant being mixed. In the manufacturing of the dispersion body, two or more types of solid particles and one or more types of dispersants are used. Specifically, the solid particles are powder and, for example, are composed of inorganic material. The dispersant is a concept that includes a lubricant, a surfactant, a binder, and the like, and for example, is composed of liquid organic matter. The dispersant is referred to as a "non-aqueous liquid," as appropriate. The non-aqueous liquid refers to a liquid other than water that is used in the manufacturing of the dispersion body.

In the manufacturing method for a dispersion body, at least two types of solid particles and a dispersant that are selected based on a material type selection method A are used to manufacture the dispersion body. In the material type selection method A, the solid particles and the dispersant are selected such that Hansen spheres of at least two types of solid particles and the Hansen sphere of at least one type of dispersant mutually overlap, and a Hansen solubility parameter distance Ra to water of one type of the solid particles of which the Hansen spheres overlap that of the dispersant is greatest among all solid particles used in the manufacturing of the dispersion body. The material type selection method A will be described in detail, below.

In the material type selection method A, as the solid particles and the dispersant that are used in the manufacturing of the dispersion body, those of which Hansen spheres of the at least two types of solid particles and a Hansen sphere of the at least one type of dispersant mutually overlap are selected. For example, when the Hansen spheres of the two types of solid particles mutually overlap and at least one of these Hansen spheres overlap the Hansen sphere of the dispersant, this means that the Hansen spheres mutually overlap. In addition, when the Hansen sphere of one of the two types of solid particles and the Hansen sphere of the dispersant mutually overlap, and either of these Hansen spheres overlap the Hansen sphere of the other of the two types of solid particles, this also means that the Hansen spheres mutually overlap. Furthermore, when the three Hansen spheres of the two types of solid particles and the dispersant mutually overlap, this also means that the Hansen spheres mutually overlap. That is, when two or more sections of overlap in the three Hansen spheres are present, this means that the Hansen spheres of the at least two types of solid particles and the Hansen sphere of the at least one type of dispersant mutually overlap. Here, if the Hansen spheres at least are in point-contact, this means that the Hansen spheres overlap each other. When the Hansen spheres share a portion of volume of each other or one Hansen sphere is inside another Hansen sphere as well, this also means that the Hansen spheres overlap each other.

In addition, in the material type selection method A, at least the solid particles that is one type among the solid particles of which the Hansen spheres overlap that of the dispersant, of which the Hansen solubility parameter distance Ra is greatest among all solid particles used in the manufacturing of the dispersion body are selected and used in the manufacturing of the dispersion body. The Hansen solubility parameter distance Ra is a distance between a Hansen solubility parameter of water and a Hansen solubility parameter of the solid particles. In subsequent descriptions, the Hansen solubility parameter is denoted as "HSP," as appropriate.

Therefore, in the manufacturing of the dispersion body, the solid particles and the dispersant can be used in combination such as to meet condition A1 and condition A2, below.

Condition A1: From a solid particle candidate group and a dispersant candidate group, a combination of solid particles and dispersant in which the Hansen spheres of at least two types of solid particles and the Hansen sphere of at least one type of dispersant mutually overlap is determined.

Condition A2: One of the solid particles that meet condition A1 has the HSP distance Ra to water that is the greatest among all solid particles used in the manufacturing of the dispersion body.

The solid particle candidate group and the dispersant candidate group are determined based on the dispersion body to be fabricated. For example, when the dispersion body is used in a ceramic sintered body, the solid particle candidate group can be determined such that, for example, raw materials of the solid particles chemically react to each other after firing and a ceramic sintered body that has a desired material property is obtained. The solid particle candidate group can include solid particles that are of differing manufacturers, lots, extraction locations, and the like. For example, the dispersant candidate group can include liquid solvents, dispersants, lubricants, binders, and the like that are used for dispersion of the solid particles.

The material property of the solid particles is not particularly limited and, for example, is determined based on intended use of the dispersion body. For example, the solid particles include a ceramic raw material. For example, when the dispersion body is used in manufacturing of a honeycomb structure for an exhaust gas purification filter or a sealing portion for sealing an end surface of the honeycomb structure, as the solid particles, silica, aluminum hydroxide, talc, kaolin, alumina, and the like can be used. When the honeycomb structure is manufactured, for example, the dispersion body is a green body. When the sealing portion is manufactured, for example, the dispersion body is a slurry or a paste. When the dispersion body is used in manufacturing of a honeycomb structure for a monolith carrier that is used to carry an exhaust gas purification catalyst, as the solid particles, kaolin, aluminum hydroxide, silica, alumina, talc, and the like can be used. When the dispersion body is used in manufacturing of a honeycomb structure that has a catalytic function (specifically, a promoter function of a noble metal catalyst), as the solid particles, ceria, zirconia, a ceria-zirconia solid solution, alumina, and the like can be used. In addition to the foregoing, the dispersion body is used in manufacturing of separators and electrodes of solid-state batteries, solid electrolyte bodies of sensors, insulators, and the like. In this case, as the solid particles, a solid electrolyte, alumina, and the like can be used. As the dispersant, oil, wax, fatty acid esters, fatty acid salts, glyceryl ethers, and the like are used.

Properties and viscosity of the dispersion body are not particularly limited. The dispersion body is a concept that is referred to as a slurry, a paste, a green body, or the like and includes a mixture of water, a dispersant, and solid particles. For example, in the dispersion body, the solid particles and the dispersant are dispersoids, and water is a dispersion medium.

In the manufacturing of the dispersion body, the Hansen spheres of the solid particles and the dispersant, and the Hansen solubility parameter distance Ra between water and the solid particles are determined. Hereafter, the Hansen spheres and the HSP distance Ra will be described.

First, the HSP theory will be described. In general, in this theory, surface energies of solutes, solvents, and gases are quantified and classified based on three items. Three energies are London dispersion force $\delta_d$, dipole-dipole force $\delta_p$, and hydrogen bonding force $\delta_h$. The unit of each energy is $MPa^{1/2}$. That is, an HSP value is expressed as coordinates within a three-dimensional space that is referred to as a Hansen space in which the London dispersion force $\delta_d$, the dipole-dipole force $\delta_p$, and the hydrogen bonding force $\delta_h$ are each a coordinate axis.

Based on the HSP theory, for example, a case in which solubility of a solute A and a solvent B is studied will be examined. When the HSP value of the solute A is ($\delta_{dA}$, $\delta_{pA}$, $\delta_{hA}$) and the HSP value of the solvent B is ($\delta_{dB}$, $\delta_{pB}$, $\delta_{hB}$), the distance between these HSP values (that is, an HSP distance $Ra_1$) is expressed by expression I, below.

$$Ra_1 = \{4 \cdot (\delta_{dA}-\delta_{dB})^2 + (\delta_{pA}-\delta_{pB})^2 + (\delta_{hA}-\delta_{hB})^2\}^{1/2} \quad \text{Expression I}$$

The solute is more easily dissolved in the solvent as the HSP distance $Ra_1$ decreases. In a case of a solute that is not dissolved, the solvent serves as the dispersion medium, the solute serves as the dispersoid, and the dispersoid is easily dispersed in the dispersion medium. In the case of the dispersion medium and the dispersoid, a high-dispersion state can be achieved when $Ra_1 \leq 10$, and an ultrahigh-dispersion state can be achieved when $Ra_1 \leq 5$.

Regarding the above-described HSP theory, in the present disclosure, focus is placed on the overlap of the Hansen spheres, and the HSP distance Ra between the solid particles and water. That is, in mixing of at least two types of solid particles, the dispersant, and water, dispersibility is evaluated based on the overlap of the Hansen spheres and the HSP distance Ra. A dispersion body that is in a high-dispersion state is obtained as a result. The HSP distance Ra is calculated based on expression I by using the HSP value of water as the HSP value of the solvent B. Here, the HSP value of water is $\delta_d$: 15.5, $\delta_p$: 16.0, and $\delta_h$: 42.3.

Measurement of the Hansen spheres and the HSP values of the solid particles and the dispersant is performed by reagents of at least 14 types of pure solvents of which the HSP values are already known being classified into good solvent and poor solvent.

For example, the Hansen spheres and the HSP values are determined by analysis software. As the analysis software, the software HSPiP Version 5.2.05 developed by Dr. Hansen can be used. Details of HSPiP are described at https://www.hansen-solubility.com. First, classification results of the solvent reagents are given scores. Next, the scores are inputted to the analysis software. Specifically, a good solvent is given a score 1 and a poor solvent is given a score 0. As a result, in the analysis software, the Hansen sphere can be drawn in the three-dimensional Hansen space in which the London dispersion force $\delta_d$, the dipole-dipole force $\delta_p$, and the hydrogen bonding force $\delta_h$ are each a coordinate axis. FIG. 1 shows an example of the Hansen sphere S1 of a certain solid particle. The Hansen sphere S2 of the dispersant is also drawn in the Hansen space in a manner similar to that in FIG. 1. The HSP value is determined as a center (specifically, a center coordinate) of the Hansen sphere. Here, in cases in which the above-described analysis software or version is not available, the Hansen spheres and the HPS values can be determined by another software or another version that is available and in which similar measurement principles are used, or by calculation using similar measurement principles.

The classification into good solvent and poor solvent can be determined based on a threshold of a certain measurement value. In cases in which the above-described analysis software is used, the threshold can be determined by a fitting value being confirmed. The fitting value being closer to 1 means that the Hansen sphere is more correctly drawn. Therefore, the threshold can be determined such that the fitting value is 1 or a maximum numeric value that is less than 1. Here, although this is an empirical determination based on past experiments, sufficient measurement accuracy may not be achieved when the fitting value is less than 0.8. Therefore, in this case, the solvent reagent is preferably reselected and measured.

The classification into good solvent and poor solvent for determining the Hansen spheres and the HSP values of the solid particles is performed based on (1) confirmation of a precipitation state by a visual observation method, (2) a measurement value of particle size by Stokes' method, (3) a measurement value of particle size by a concentrated particle size analyzer, or (4) a measurement value of a contact angle by a permeation speed method. When (1) classification by the visual observation method cannot be performed, (2) measurement of the particle size by the Stokes' method is selected. When (2) measurement of the particle size by the Stokes' method cannot be performed, (3) measurement of the particle size by the concentrated particle size analyzer is selected. When (3) measurement of the particle size by the concentrated particle size analyzer cannot be performed, (4)

measurement of the contact angle by the permeation speed method is selected. Specific methods will be described below. Here, the classification and measurements are performed under a room-temperature condition (specifically, a temperature of 20° C. to 25° C.).

(1) Visual Observation Method

The precipitation in the solvent reagent is visually confirmed. For example, specific steps are as in (1-1) to (1-3), described below.

(1-1) Prepare at least 14 types of solvent reagents of which the HSP values are already known.

(1-2) Place 0.05 g of the solid particles to be measured in 20 ml of each solvent reagent and shake 30 times. After the solid particles are dispersed in the solvent reagent as a result, let stand.

(1-3) Visually confirm the precipitation state of the solid particles in the solvent reagent after 15 minutes of standing. Determine the solvent reagent to be a poor solvent when precipitation is observed. Determine the solvent reagent to be a good solvent when precipitation is not observed. Perform the foregoing operations for the at least 14 types of solvent reagents.

(2) Stokes Method

The particle size of the solid particles can be measured by the Stokes' method, and the classification into good solvent and poor solvent can be performed based on the particle size. The solvent reagent is considered a better solvent as the particle size decreases. For example, specific steps are as in (2-1) to (2-5), described below.

(2-1) Prepare at least 14 types of solvent reagents of which the HSP values are already known.

(2-2) Place 2 g of the solid particles to be measured in a 25 mL measuring cylinder. Next, pour the solvent reagent into the measuring cylinder up to the 20 mL line. After shaking the measuring cylinder 30 times, let stand. Here, after standing, if the solid particles promptly precipitate in the solvent reagent in a visually observable manner, the measurement of the particle size described hereafter is not necessarily required to be performed. The solvent reagent can be determined to be a poor solvent that has poor dispersibility.

(2-3) Measure a height of an interface between a clear layer and a deposited layer three times each, at 5 minutes after, 10 minutes after, 15 minutes after, 20 minutes after, and 25 minutes after standing. Calculate average values thereof. As a result, the average value of the interface height after the elapse of each amount of time is obtained. Calculate a sedimentation rate v (unit: cm/s) from the average values of the interface height and the elapsed times.

(2-4) Calculate a particle size $D_p$ (unit: cm) by Stokes' law that is expressed in expression II, below. In expression II, η: a coefficient of viscosity of the reagent (unit: cm·s), v: sedimentation rate (unit: cm/s), $\rho_p$: density of the particles (unit: g/cm³), $\rho_0$: density of the reagent (unit: g/cm³), and g: acceleration of gravity. The density of the particles $\rho_p$ is measured using a pycnometer. The acceleration of gravity g is 980 cm/s². Perform the measurement of particle size $D_p$ for the at least 14 types of solvent reagents. The particle size $D_p$ is an average particle size.

(2-5) Classify the solvent reagents into good solvent and poor solvent based on a threshold of the particle size $D_p$. A method for determining the threshold is as described above. Here, for example, the classification can be facilitated by the solvent reagents being arranged in order from that with the smallest particle size $D_p$.

$$D_p = \sqrt{\frac{18\eta v}{(\rho_p - \rho_0)g}} \qquad \text{Expression II}$$

(3) Concentrated Particle Size Analyzer

The particle size (specifically, the average particle size) of the solid particles can be measured using a concentrated particle size analyzer, and the classification into good solvent and poor solvent can be performed based on the particle size. For example, for the measurement, a concentrated particle analyzer "FPAR-100," manufactured by Otsuka Electronics Co., Ltd., is used. The solvent reagent is a better solvent as the particle size decreases. For example, specific steps are as in (3-1) to (3-4), described below.

(3-1) Prepare at least 14 types of solvent reagents of which the HSP values are already known.

(3-2) Fabricate a dispersion liquid that has a particle concentration of 5.0×g/cc using the solid particles to be measured and the solvent reagent.

(3-3) Place the dispersion liquid in the concentrated particle size analyzer and measure the particle size. Perform the measurement of the particle size for the at least 14 types of solvent reagents.

(3-4) Classify the solvent reagents into good solvent and poor solvent based on a threshold of the particle size. A method for determining the threshold is as described above. Here, for example, the classification can be facilitated by the solvent reagents being arranged in order from that with the smallest particle size.

(4) Permeation Speed Method

Figure 2:
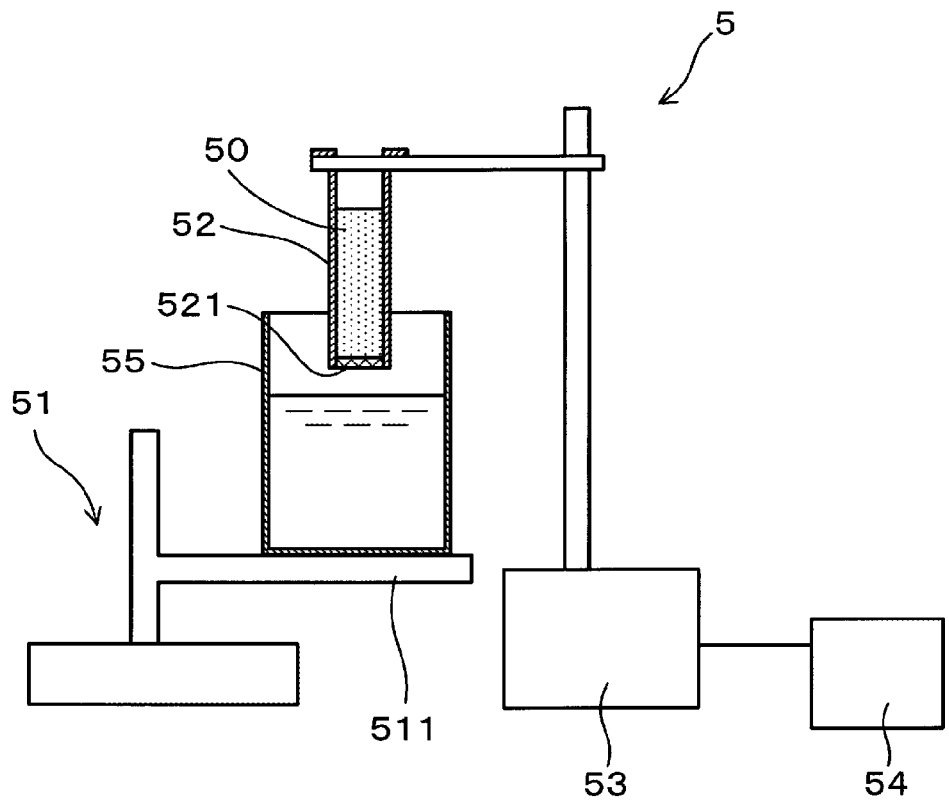
FIG. 2 is a schematic diagram of a configuration of an apparatus for measuring a contact angle by a permeation speed method.

A contact angle between the solid particles and the solvent reagent can be measured by the permeation speed method, and the classification into good solvent and poor solvent can be performed based on the contact angle. The measurement is performed by a measurement apparatus 5 shown in FIG. 2. As shown in FIG. 2, the measurement apparatus 5 is configured by a lifting/lowering apparatus 51, an iron column 52, an electronic scale 53, and a recording apparatus 54. The lifting/lowering apparatus 51 includes a lifting/lowering base 511. A beaker 55 that contains the solvent reagent is arranged on the lifting/lowering base 511. The iron column 52 and the electronic scale 53 are connected. Weight inside the iron column 52 can be measured by the electronic scale. A lower surface of the iron column 52 is composed of a paper filer 521. The inside of the iron column 52 is filled with powder 50 of the solid particles to be measured. The iron column 52 is hung above the beaker 55. For example, the recording apparatus 54 is a computer and records measurement results of the electronic scale 53. For example, the measurement of the contact angle using this measurement apparatus 5 and the classification are specifically performed by steps (4-1) to (4-4), described below.

(4-1) Prepare at least 14 types of solvent reagents of which the HSP values are already known.

(4-2) Place the solvent reagent in the beaker 55. Fill the iron column 52 with the powder 50 of the solid particles to be measured.

(4-3) Operate the lifting/lowering apparatus 51 and immerse a lower surface side of the iron column 52 in the solvent reagent inside the beaker 55. As a result, the solvent reagent permeates the powder 50 of the solid particles inside the iron column 52. After immersion, measure a permeation weight every second through the electronic scale 53, and record the measurement results by the recording apparatus 54. The permeation weight refers to a weight of the solvent reagent that permeates a filling powder (specifically, the powder 50) inside the iron column 52.

(4-4) Calculate a contact angle θ (unit: °) by Washburn's equation that is expressed in expression III, below. In expression III, l: permeation height of the liquid (unit: m), t: permeation time (unit: s), r: capillary radius of the filling powder (unit: m), γ: surface tension of the liquid (unit: mN/m), and viscosity of the liquid (unit: mPa·s). Here, volume of the liquid (specifically, the solvent reagent) that permeates the inside of the column can be calculated from the density and the permeation weight of the liquid. The permeation height 1 can be calculated from the volume and a cross-sectional area of the container. Perform the measurement of the contact angle θ for the at least 14 types of solvent reagents.

$$l^2/t = r\gamma \cos\theta / 2\eta \qquad \text{Expression III}$$

(4-5) Classify the solvent reagents into good solvent and poor solvent based on a threshold of the contact angle. The contact angle being smaller means that permeation of the solvent reagent into the filling power is faster. The solvent reagent is a better solvent as the permeation becomes faster. Meanwhile, a larger contact angle means that permeation of the solvent into the filling powder is slower. The solvent reagent is a poorer solvent as the permeation becomes slower. A method for determining the threshold is as described above. Here, for example, the classification can be facilitated by the solvent reagent being arranged in order from that with the smallest contact angle θ.

For example, the classification into good solvent and poor solvent for determining the Hansen sphere of the dispersant is performed through visual confirmation of the solubility of the dispersant and the solvent reagent. Specifically, at least 14 types of solvent reagents of which the HSP values are already known are prepared. One ml of the dispersant to be measured is placed in a screw tube, and 1 mL of the solvent reagent is further placed therein. After the screw tube is shaken 20 times, a state inside the tube is visually examined. The solvent reagent is determined to be a good solvent when the dispersant is dissolved in the solvent reagent. The solvent reagent is determined to be a poor solvent when the dispersant is not completely dissolved in the solvent reagent and a portion is separated, or the dispersant is completely undissolved in the solvent reagent and both are completely separated. The determination is performed under room-temperature conditions (specifically, a temperature of 20° C. to 25° C.). The foregoing operation is performed on the at least 14 types of solvent reagents.

For example, as the solvent reagent that is used in the measurement of the Hansen spheres of the solid particles and the dispersant, a pure solvent of which $\delta_d$ is 14 to 21, $\delta_p$ is 0 to 20, and $\delta_h$ is 0 to 22 is selected. The HSP values and the Hansen spheres can be measured with higher accuracy as a number of solvent reagents increases. However, calculations can be performed with sufficiently high accuracy with 14 to 20 types. Measurement results hardly change by the number being increased any further. Use of at least 14 types of solvent reagents is sufficient. Table 1 shows the solvent reagents of which the HSP values are already known and the HSP values thereof. The Hansen spheres and the HSP values can be determined by at least 14 types of solvent reagents being used from a list shown in Table 1.

TABLE 1

| Category | Reagent No. | Solvent reagent | $\delta_d$ [MPa$^{1/2}$] | $\delta_p$ [MPa$^{1/2}$] | $\delta_h$ [MPa$^{1/2}$] |
|---|---|---|---|---|---|
| First Group | R1 | 1-Butanol | 16.0 | 5.7 | 15.8 |
| First Group | R2 | Tetrahydrofuran (THF) | 16.8 | 5.7 | 8.0 |
| First Group | R4 | 1,4-Dioxane | 17.5 | 1.8 | 9.0 |
| First Group | R6 | Ethanol | 15.8 | 8.8 | 19.4 |
| First Group | R9 | Dimethyl Sulfoxide (DMSO) | 18.4 | 16.4 | 10.2 |
| First Group | R12 | Acetone | 15.5 | 10.4 | 7.0 |
| First Group | R13 | Toluene | 18.0 | 1.4 | 2.0 |
| First Group | R14 | Methyl Ethyl Ketone (MEK) | 16.0 | 9.0 | 5.1 |
| First Group | R15 | Ethyl Acetate | 15.8 | 5.3 | 7.2 |
| Second Group | R3 | Acetic Acid | 14.5 | 8.0 | 13.5 |
| Second Group | R5 | Dimethyl Formamide (DMF) | 17.4 | 13.7 | 11.3 |
| Second Group | R7 | N-Methyl Formamide | 17.4 | 18.8 | 15.9 |
| Second Group | R8 | 2-Propanol | 15.8 | 6.1 | 16.4 |
| Second Group | R10 | Methyl Isobutyl Ketone (MIBK) | 15.3 | 6.1 | 4.1 |
| Second Group | R11 | Cyclohexane | 16.8 | 0.0 | 0.2 |
| Second Group | R22 | Diacetone Alcohol | 15.8 | 8.2 | 10.8 |
| Third Group | R16 | 1-Methyl Imidazole | 19.7 | 15.6 | 11.2 |
| Third Group | R17 | Benzyl Alcohol | 18.4 | 6.3 | 13.7 |
| Third Group | R18 | N-Methyl-2-Pyrrolidone (NMP) | 18.0 | 12.3 | 7.2 |
| Third Group | R19 | Hexane | 14.9 | 0.0 | 0.0 |
| Third Group | R20 | Ethylene Glycol Monomethyl Ether | 16.0 | 8.2 | 15.0 |
| Third Group | R21 | Quinoline | 20.5 | 5.6 | 5.7 |
| Third Group | R23 | Propylene Carbonate | 20.0 | 18.0 | 4.1 |
| Third Group | R24 | Ethanolamine | 17.0 | 15.5 | 21.0 |
| Third Group | R25 | o-Dichlorobenzene | 19.2 | 6.3 | 3.3 |
| Third Group | R26 | 1-Methoxy-2-Propanol | 15.6 | 6.3 | 11.6 |
| Third Group | R27 | Bromobenzene | 19.2 | 5.5 | 4.1 |
| Third Group | R28 | Pyridine | 19.0 | 8.8 | 5.9 |
| Third Group | R29 | Benzyl Benzoate | 20.0 | 5.1 | 5.2 |
| Third Group | R30 | N,N-Diethyl Formamide | 16.4 | 11.4 | 9.2 |
| Third Group | R31 | γ-Butyrolactone (GBL) | 18.0 | 16.6 | 7.4 |

A method for selecting the solvent reagents to be used for measurement is not limited. However, a combination of reagents of which the values (that is, $\delta_d$, $\delta_p$, and $\delta_h$) of surface energy of the solvent reagents are close is preferably avoided, and a combination in which the values vary over a wide range is preferably selected.

Specifically, of the solvent reagents shown in Table 1, for example, the solvent reagents that belong to a first group can all be used, and the solvent reagents can be selectively used from a second group and a third group depending on the solid particles to be measured and the dispersant. Regarding the dispersant and the solid particles that can be measured by the visual observation method, a solvent reagent that belongs to the first group and a solvent reagent that belongs to the second group can be used in combination. In this case, when the fitting value is poor, a solvent reagent from the third group is preferably additionally used such that the fitting value becomes closer to 1. In addition, depending on the measurement method, there are solvent reagents of which the determination of good solvent and poor solvent cannot be made. Therefore, the solvent reagents can be selected from the second group and the third group based on the measurement method.

The Hansen spheres of the solid particles and the dispersant can be determined as described above. In addition, the HSP value of the solid particles is determined from the Hansen spheres. From this result, the HSP distance Ra between the solid particles and water can be calculated.

As shown in FIG. 1, the Hansen sphere S1 is expressed in a three-dimensional space. In the manufacturing of the dispersion body, the solid particles and the dispersant are selectively used such that the Hansen spheres of at least two types of solid particles and one type of dispersant overlap. Specific examples of overlap of the Hansen spheres will be given in experiment examples.

Next, an optimal amount determining method will be described. In the optimal amount determining method, an optimal amount α of the dispersant that is selected by the material type selection method can be determined. The optimal amount α is a minimum added amount. In the manufacturing of the dispersion body, at least the optimal amount α of the dispersant is added. The optimal amount determination method will be described below.

In the optimal amount determination method, materials other than the dispersant that are used in the manufacturing of the dispersion body are all mixed and a mixture is fabricated. Viscosity of the mixture is measured while the dispersant is gradually added to the mixture. The added amount when changes in viscosity begin to stabilize is the optimal amount.

For example, the optimal amount can be calculated as an amount (unit: wt %) in relation to 100 weight % of dispersoid, such as the solid particles and the dispersant to be used. That is, the optimal amount can be calculated as an amount in relation to 100 weight % of all materials other than water. In addition, the optimal amount α wt % may be calculated as an amount in relation to 100 weight % of solid particles to be used. Furthermore, the optimal amount α wt % may be calculated as an amount in relation to all materials to be used including water. Preferably, the optimal amount α wt % is calculated as an amount of dispersant in relation to 100 weight % of all materials other than the dispersant that are used in the manufacturing of the dispersion body.

The viscosity of the mixture can be measured by a viscometer. This measurement method is referred to, hereafter, as a "viscometer method," as appropriate. In addition, a torque value during kneading of the mixture can be measured and the torque value may be set as the viscosity. This method is referred to, hereafter, as a "torque method," as appropriate. Which of the viscometer method and the torque method is used to measure the viscosity can be determined based on properties of the mixture. For example, in a case of a mixture that has low viscosity, such as a slurry or a paste, the viscosity can be measured by the viscometer method. Meanwhile, in a case of a mixture that has high viscosity, such as a green body, the viscosity can be measured by the torque method. For example, when the viscosity can be measured by a viscometer, such as a B-type viscometer, an E-type viscometer, or a plate-type rheometer, the viscosity can be measured by the viscometer method. When the viscosity cannot be measured by the viscometer, the viscosity can be measured by the torque method. For example, when the mixture is a liquid or a viscoelastic fluid, the viscometer method can be used.

In the torque method, the torque can be measured using a kneading machine. For example, as the kneading machine, a laboratory kneader mill TDR100-type 3-3440, manufactured by Toshin Co., Ltd. can be used. Details of a configuration of this kneader is as follows:

Blade shape: Banbury type
Blade material: SCM440 with Colmonoy overlay tip
Kneading vessel material: SUS304 Ion nitriding.

For example, measurement conditions of the torque method are as follows. Here, a setting temperature of a cooling chiller, described hereafter, can be set to a temperature that suppresses heat generation during kneading and suppresses evaporation of moisture.

Filling rate of a measurement sample in the kneading vessel of kneader mill (that is, the filling rate at final stage of measurement step (6), below): 35 volume %
Setting temperature of cooling chiller: 10° C.

For example, measurement steps of the torque method are as follows.

(1) Start recording of data in a recording apparatus. The data to be recorded is a torque value of stirring blades of the kneader, a rotation frequency of the stirring blades of the kneader, time, temperature, and the like.

(2) Fill the kneading vessel with half of an amount of solid components to be used for mixing. Next, add liquid components (specifically, water), and turn the mixture into a clay-like state (such as into a paste-like state) by mixing at 100 rpm for about 60 seconds.

(3) Add the remaining half amount of the solid components and the liquid components into the kneading vessel and turn the mixture into a clay-like state (such as into a paste-like state) by mixing at 100 rpm for about 240 seconds.

(4) After turning the mixture into a clay-like state, mix at 15 rpm for about 60 seconds and record a reference torque value.

(5) After adding a predetermined amount of dispersant into the mixture, mix at 15 rpm until the torque value stabilizes. A waveform or a value of the torque value being continuously stable for at least 240 seconds means that the torque value is stable at this added amount. If the torque value is not continuously stable for 240 seconds, continue mixing in 60-second units, for example, until the torque value is stabilized (see FIG. 11(*a*)).

(6) Repeat step (5) above until changes in the torque value that has stabilized by the addition of the dispersant become small and the torque value hardly changes as a result of the dispersant being added (see FIG. 11(*a*)). Specifically, repeat step (5) until a rate of change in the torque value (such as a maximum torque value, a minimum torque value or a moving average value) is within 0.02 N·m/weight %, for example, by the dispersant being added. The dispersant is preferably added by a smallest amount possible. Specifically, for example, the dispersant can be added by an amount that is equal to or less than 0.2 weight %. Here, if the torque value does not stabilize even when the dispersant is continuously added, the measurement may be stopped when the added amount exceeds 5 weight %. In this case, this dispersant is preferably not used since use of the dispersant will lead to increase in cost.

In addition, in the torque method, the torque value at which stabilization is confirmed after addition of the dispersant can be set as the viscosity. For example, this torque value can be read from the maximum torque value, the minimum torque value, or the moving average value of a waveform of the torque of which the value has stabilized. Furthermore, the maximum torque value or the minimum torque value in a waveform in which the torque value is continuously stable for 240 seconds, as described above, can be set as the viscosity at this added amount.

For example, in the viscometer method, the viscosity can be measured by a measurement method that is based on JIS K7244:2005, using a rheometer. In addition, the viscosity can be measured by a measurement method that is based on JIS K7199:1999, using a capillary rheometer. The viscosity measurement using the rheometer and the viscosity measurement using the capillary rheometer can be selectively used depending on viscosity of a measurement target. For example, when the measurement target is a slurry-like mixture, the viscosity can be measured using the rheometer. When the measurement target is a paste-like mixture, the viscosity can be measured using the capillary rheometer. For example, as the rheometer, MCR302, manufactured by Anton Paar GmbH, can be used. For example, as the capillary rheometer, RH2000, manufactured by Rosand, can be used. Measurement steps in the viscometer method can be performed in a manner similar to the above-described torque method, excluding the viscosity of the mixture being measured instead of the torque value of the kneading machine.

For example, when the mixture to be measured is a paste and the capillary rheometer is used for the measurement of the viscosity, a stress value that is an intercept is set as a yield point based on a flow curve that is obtained by the measurement method based on JIS K 7199:1999. In addition, for example, when the mixture to be measured is a slurry and the rheometer is used for the measurement of the viscosity, a modulus of elasticity is measured by the measurement method based on JIS K 7244:2005.

A graph that indicates a relationship between the added amount of the dispersant and the viscosity of the mixture can be obtained by the viscometer method and the torque method. A specific example of the graph obtained by the torque method is shown in experiment example 1, described hereafter. The added amount of the dispersant when the changes in viscosity begin to stabilize is set as the optimal amount, based on this graph.

In the manufacturing method according to the present embodiment, the dispersion body is manufactured by the solid particles of a plurality of types (specifically, powder), water, and a dispersant being mixed. In the manufacturing of the dispersion body, at least two types of solid particles and at least one type of dispersant that are selected based on the material type selection method A are used. In addition, the dispersant at at least an optimal amount α weight % that is determined by the optimal amount determination method is used. As a result, the dispersion body that is of a combination that is suitable for higher dispersibility as the solid particles and the dispersant can be obtained. Furthermore, the dispersion body in which the dispersant is added at an amount that is suitable for high dispersibility can be obtained.

As a result, the dispersion body that has favorable dispersibility while containing water can be manufactured. Consequently, variations in the density of the dispersion body can be reduced. In addition, changes over time in the viscosity of the dispersion body can also be reduced.

When the dispersion body is a green body, the dispersibility can be evaluated based on a variance between a green-body density actual measurement value and theoretical density. In addition, when the dispersion body is a slurry, the dispersibility can be evaluated by a laser-type particle size analyzer or an image-type particle size analyzer. For example, as the laser-type particle size analyzer, MT3000II, manufactured by MicrotracBEL Corp., can be used. As the image-type particle size analyzer, FPIA-3000, manufactured by Sysmex Corp., can be used.

When the dispersion body is a paste, the dispersibility can be evaluated based on pressure variation during extrusion of the dispersion body. Specifically, for example, evaluation can be performed by the steps below. First, a screen is set at an outlet of a vacuum extrusion molding machine, and a pressure gauge is set before the screen (specifically, on the outlet side). For example, the screen is a metal mesh for filtration. Next, a fixed amount (such as 15 kg) of paste is extruded at a fixed speed (such as 3 kg/h). Pressure variation (that is, pressure difference) between start of extrusion and end of extrusion is calculated. When the dispersibility is poor, the mesh of the screen becomes clogged with aggregates and pressure increases, or the screen tears as a result of the aggregates and pressure decreases. In either case, pressure variation increases. Therefore, the pressure variation can serve as an indicator for dispersibility. Here, the screen becomes clogged when the aggregate is large. The screen tears when numerous aggregates are present. Therefore, focus can be placed on the clogging of the screen, and a pressure increase rate can serve as the indicator for dispersibility. The pressure increase rate is calculated by a maximum pressure difference being divided by time.

In addition, in the manufacturing method according to the present embodiment, the optimal amount α of the dispersant is determined. As a result of at least the optimal amount α of the dispersant being added, the dispersibility of the dispersion body can be made favorable. As a result, the amount of dispersant that is used in the manufacturing of the dispersion body can be reduced. Therefore, manufacturing cost of the dispersion body can be reduced. Furthermore, the optimal amount α that serves as reference for the added amount can be determined without reliance on inefficient methods for determining the added amount that are based on intuition and know-how of the manufacturer. Consequently, for example, waste in which the dispersant is excessively added from a perspective of allowing latitude for response to change can be eliminated or reduced. Moreover, because the amount of dispersant can be minimized based on the optimal amount α, even when the dispersion body is used for firing, for example, occurrence of defects, such as cracks, in the sintered body can be prevented.

Next, a preferred embodiment of the material type selection method A will be described. In the description hereafter, the solid particles of which the Hansen sphere overlaps that of the dispersant is referred to as "dispersant-affinity solid particles," as appropriate. In the material type selection method A, the solid particles are preferably selected such that a mixing ratio of one type among the dispersant-affinity solid particles is greatest among all solid particles used in the manufacturing of the dispersion body, and used in the manufacturing of the dispersion body. In this case, a dispersion body that has more favorable dispersibility can be manufactured. A reason for this is that affinity between the solid particles of which an amount used is greatest and the dispersant becomes favorable. Here, the mixing ratio is mass ratio. In the present specification, mass ratio and weight ratio are synonymous.

In addition, when, among all solid particles that are used in the manufacturing of the dispersion body, the solid particles of which the HSP distance Ra to water is the greatest is first solid particles, the first solid particles are preferably selected as the solid particles that have the greatest HSP distance Ra in the solid particle candidate group that can be used in the manufacturing of the dispersion body. In this case as well, a dispersion body that has more favorable dispersibility can be manufactured. A reason for this is that affinity between the first solid particles of which affinity with water is lowest among the solid particle candidate group and the dispersant becomes favorable.

Either of the selection of the solid particles of which the HSP distance Ra is the greatest and the selection of the combination of the solid particles and the dispersant of which the Hansen spheres overlap may be performed first. That is, the order of selection may be interchanged. For example, the HSP values of the solid particle candidate group are determined and the solid particle candidate group is arrayed in order from that with the greatest HSP distance Ra to water. Then, the solid particles and the dispersant are selected such that the Hansen spheres of the solid particles of which the HSP distance Ra to water is great and the dispersant overlap. The solid particles and the dispersant can then be used in the manufacturing of the dispersion body. Meanwhile, the combinations of the solid particles and the dispersants can be studied from the overlap of the Hansen spheres, first. The combination that includes the solid particles of which the HSP distance Ra to water is great can then be selected from the combinations.

Second solid particles that are solid particles other than the first solid particles among the dispersant-affinity solid particles are preferably selected as the solid particles of which the HSP distance Ra is second greatest in the solid particle candidate group, and used in the manufacturing of the dispersion body. In this case as well, a dispersion body that has more favorable dispersibility can be manufactured. A reason for this is that affinity between the first solid particles of which affinity with water is lowest among the solid particle candidate group, the second solid particles, and the dispersant becomes favorable.

The second solid particles that are the solid particles other than the first solid particles among the dispersant-affinity solid particles are preferably selected as the solid particles of which the mixing ratio is greatest or second greatest among all solid particles used in the fabrication of the dispersion body. In this case as well, a dispersion body that has more favorable dispersibility can be manufactured. A reason for this is that affinity between the second solid particles of which the amount used is large and the dispersant becomes favorable. Here, the mixing ratio is mass ratio.

Next, a preferred embodiment of the optimal amount determination method will be described. In the optimal amount determination method, the viscosity is preferably measured as the torque value by the torque method. Specifically, the viscosity is preferably measured as the torque value of the mixture that is being kneaded, and the added amount when the changes in torque value begin to stabilize is preferably set as the optimal amount $\alpha$. In this case, the viscosity can be measured as the torque value for a mixture that has high viscosity and a mixture that has low viscosity as well. Regarding the mixture that has high viscosity such as a green body, the torque value is preferably used as the viscosity in the optimal amount determination method. A reason for this is that the changes in torque value increase in the mixture that has high viscosity, and the optimal amount $\alpha$ is more easily determined.

The stabilization of the changes in viscosity can be directly read from the relationship between the added amount of the dispersant and the viscosity, but can also be read from the added amount of the dispersant and a rate of change in viscosity. Preferably, the stabilization is read from the rate of change in viscosity. In this case, for example, the stabilization can be more easily read from an essentially flat region of a graph in which the added amount of the dispersant is a horizontal axis and the rate of change in viscosity is a vertical axis.

The graph of the added amount of the dispersant and the rate of change in viscosity is preferably acquired, the graph is preferably approximated by two straight lines, and an intersection of the approximate straight lines is preferably set as the optimal amount $\alpha$. In this case, the optimal amount $\alpha$ can be more clearly prescribed with more ease. In the manufacturing of the dispersion body, the dispersant is preferably added at the optimal amount $\alpha$ weight % or greater and $\alpha+\alpha$ (that is, $2\alpha$) weight % or less. The dispersibility becomes favorable as a result of the added amount of the dispersant being equal to or greater than the optimal amount $\alpha$ weight %. From the perspective of further improving the dispersibility, the added amount of the dispersant is more preferably equal to or greater than $\alpha+0.05\alpha$ weight %, and even more preferably equal to or greater than $\alpha+0.1\alpha$ weight %. Meanwhile, as a result of the added amount being equal to or less than $2\alpha$ weight %, cost of the dispersant can be suppressed and a high-dispersion dispersion body can be manufactured at low cost. In addition, when the dispersion body is used in the manufacturing of a sintered body, the occurrence of defects, such as cracks, due to thermal stress attributed to the dispersant amount can be prevented in the sintered body. Furthermore, occurrence of cracked gas and residue can be prevented, and defects occurring in the sintered body can be prevented. From a perspective of further reducing cost and improving effects of preventing the occurrence of defects in the sintered body, the added amount of the dispersant is preferably equal to or less than $\alpha+0.5\alpha$ weight %, and even more preferably equal to or less than $\alpha+0.2\alpha$ weight %.

In addition, an upper limit of the dispersant amount can also be determined based on a heat generation amount (unit: J/kg) of the dispersant. Details are as follows. Cracks during firing occur as a result of thermal stress caused by a temperature difference in the sintered product that is being sintered. The temperature difference is caused by a dehydration reaction in the ceramic raw materials, decomposition of the binder and the dispersant, and heat absorption/generation due to combustion, in addition to intentional heating through conduction and transfer of heat by heating of a furnace heater or hot air, and the like. When the dispersant amount is increased, an amount of heat absorption/generation increases and the temperature difference in the sintered product increases. The dispersant amount can be set such that the temperature difference becomes thermal stress that is equal to or less than strength of the sintered product that is being sintered.

Specifically, the dispersant amount is preferably set such that strength σw of the sintered product that is being fired satisfies a relationship in expression (IV), below. In the expression (IV), Ew is Young's modulus of the sintered product that is being fired (unit: Pa), aw is a coefficient of thermal expansion of the sintered product that is being fired (unit: 1/K), and ΔT is a temperature difference in the sintered product that is being fired (unit: K). The coefficient of thermal expansion is a value that takes into consideration changes in volume due to dehydration during firing, and decomposition and combustion of the binder and dispersant. The dispersant amount may be suppressed to achieve a value that is equal to or less than a value of ΔT that is derived from expression (IV).

In addition, a heat generation amount Q of the dispersant satisfies a relationship in expression (V), below. In expression (V), a is a heat generation amount per 1 kg of the dispersant (unit: J/kg), x is the added amount of the dispersant that is used in the manufacturing of the sintered product (unit: kg), Mw is weight [kg] of the sintered product, and Cw is specific heat of the sintered product [unit: J/(kg·K)]. The added amount of the dispersant is expressed by x/Mw (unit: weight %) and preferably satisfies x/Mw≤Cw·ΔT/a.

$$\sigma W \geq Ew \cdot aw \cdot \Delta T \quad (IV)$$

$$Q = a \cdot x = Mw \cdot Cw \cdot \Delta T \quad (V)$$

Parameters in each of the expressions above are measured in the following manner. The strength σw of the sintered product that is being fired is measured by a bending strength test being performed on a sample before firing. The measurement is performed using a thermo-mechanical analyzer (TMA) and a bending test jig in a reaction temperature range of the dispersant at which occurrence of cracking becomes an issue. Specifically, first, a sample is processed into a test piece for strength measurement. The test piece is then heat-treated to a testing temperature in a furnace, and the bending strength is measured at room temperature. Alternatively, after the temperature of the test piece is raised to the testing temperature, load is applied to the testing piece in a state in which the temperature is held constant. The load at a breaking point when the test piece breaks is read and bending stress is calculated. Specifically, the reaction temperature of the dispersant at which occurrence of cracking becomes an issue is read from heat absorption/generation and changes in mass that occur when the temperature of the dispersant is raised by a thermal gravity differential thermal analysis apparatus (TG-DTA). For example as the TG-DTA, TG-DTA2000SA, manufactured by Bruker AXS Inc., can be used. For example, as the TMA, TD4000S, manufactured by Bruker AXS Inc., can be used. As the bending test jig, an optional pressing rod for three-point bending and specimen stub can be used.

The Young's modulus Ew of the sintered product that is being fired is measured by a resonance method in the reaction temperature range of the dispersant at which occurrence of cracks becomes an issue. Regarding the Young's modulus as well, in a manner similar to the strength σw, there is a method in which the test piece that has been heated in a furnace is removed and measured at room temperature, and a method in which the test piece is directly measured at a high temperature using an apparatus that is capable of measuring the Young's modulus in a high-temperature environment. Either method may be used. When evaluation is performed at room temperature, for example, as the measurement apparatus, a room-temperature Young's modulus measurement apparatus JE-RT type, manufactured by Nihon Techno-Plus Co. Ltd., can be used. When measurement is performed at a high temperature, for example, as the measurement apparatus, a high-temperature Young's modulus and modulus-of-rigidity measurement apparatus EG-HT type, manufactured by Nihon Techno-Plus Co. Ltd., can be used.

The coefficient of thermal expansion aw of the sintered product that is being fired can be calculated by based on a result of evaluation of variations in dimensional expansion and contraction when a sample is heated, using the TMA. For example, as the TMA, TD4000S, manufactured by Bruker AXS Inc., can be used.

The heat generation amount α per 1 kg of dispersant is measured by a differential scanning calorimeter (DSC). Specifically, as the DSC, DSC3300SA, manufactured by Bruker AXS Inc., can be used.

For the weight Mw of the sintered product, a sample before firing may be measured by a typical scale or an electronic scale. The specific heat Cw of the sintered product can be measured by the DSC method using the DSC. Specifically, as the DSC, DSC3300SA, manufactured by Bruker AXS Inc., can be used.

The temperature difference ΔT in the sintered product that is being fired is calculated from the strength σw, the Young's modulus Ew, and the coefficient of linear expansion aw that are determined as described above. To confirm the calculated ΔT, thermocouples are preferably set in a center and an outer side of the sintered product, and the temperature is measured through actual firing.

As described above, according to the present embodiment, a manufacturing method for a dispersion body that has favorable dispersibility can be provided.

Second Embodiment

Another embodiment related to the manufacturing method for the dispersion body will be described. Here, reference numbers used according to the second and subsequent embodiments that are the same as the reference numbers used according to earlier embodiments indicate constituent elements and the like that are similar to those according to the earlier embodiments.

The manufacturing method for the dispersion body according to the present embodiment is performed in a manner similar to that according to the first embodiment, other than the solid particles and the dispersant used in the manufacturing of the dispersion body being selected by a material type selection method B, instead of the material type selection method A. Hereafter, the material type selection method B will be described in detail.

In the material type selection method B, at least two types of solid particles are selected from a solid particle candidate group of which the HSP distance to water is equal to or greater than 28 MPa$^{1/2}$. Then, the solid particles and the dispersant are selected such that the Hansen spheres of the solid particles and the Hansen sphere of at least one type of dispersant from a dispersant candidate group mutually overlap. As described according to the first embodiment, for the HSP distance Ra between the solid particles and water, the respective HSP values may be measured and the distance therebetween may be calculated.

A reason for selecting the solid particles from the solid particle candidate group of which the HSP distance Ra to water is equal to or greater than 28 MPa$^{1/2}$ is as follows. When the Hansen solubility parameter distance Ra is equal to or greater than 28 MPa$^{1/2}$, in the water does not significantly deteriorate. Therefore, a favorable dispersion body can be obtained by mechanical energy through kneading and stirring. Meanwhile, when the Hansen solubility parameter distance Ra is less than 28 MPa$^{1/2}$, the solid particles are likely to form aggregates with one another in the water, and the aggregates are difficult to disperse by the above-described mechanical energy. Therefore, the solid particles are preferably selected from the solid particle candidate group of which the Hansen solubility parameter distance Ra to water is equal to or greater than 28 MPa$^{1/2}$.

Through use of the solid particles and the dispersant that are selected as described above, the dispersion body that has favorable dispersibility can be manufactured.

The solid particles are preferably selected such that the mixing ratio of at least one type of solid particles selected from the solid particle candidate group is greatest among all solid particles used in the manufacturing of the dispersion body, and used in the manufacturing of the dispersion body. In this case, a dispersion body that has more favorable dispersibility can be manufactured. A reason for this is that affinity between the solid particles of which the amount used is the greatest and the dispersant become favorable. Here, the mixing ratio is mass ratio. In other respects, the present embodiment can be carried out in a manner similar to the first embodiment, and similar effects are achieved.

Third Embodiment

Figure 3:
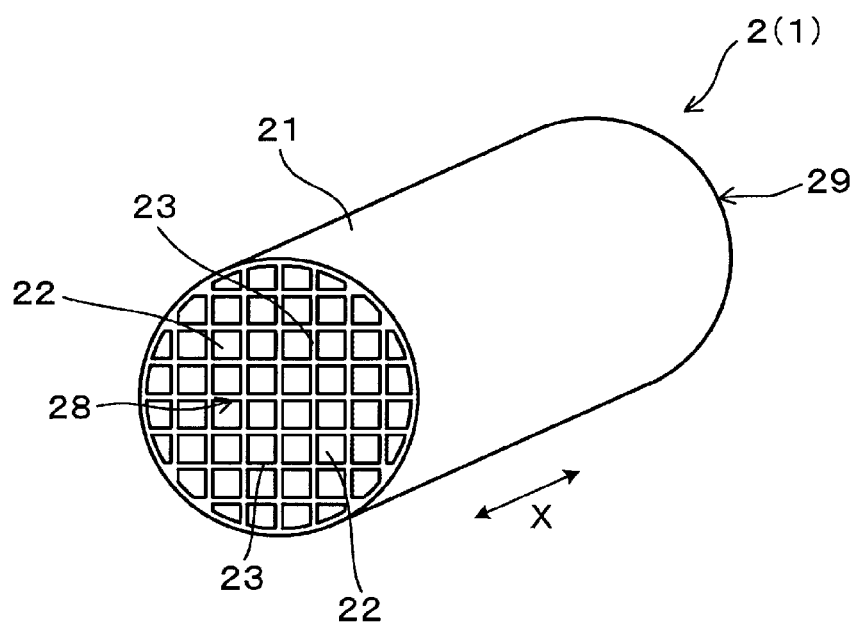
FIG. 3 is a perspective view of a honeycomb structure.
Figure 4:
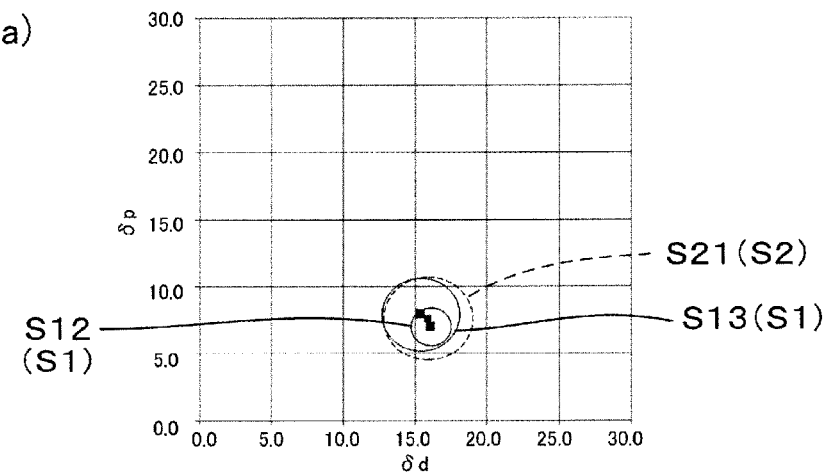
FIG. 4(a) to (c) are explanatory diagrams of overlap of the Hansen spheres of solid particles and a dispersant in comparative example 1.
Figure 4:
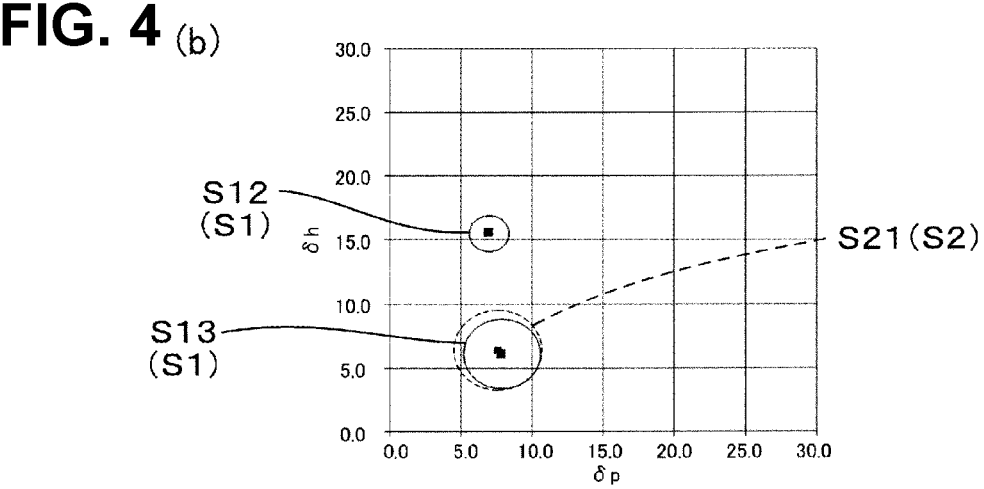
Figure 4:
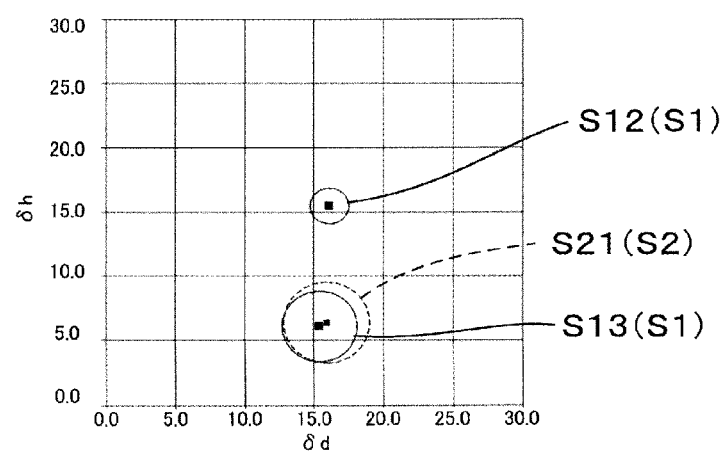
Figure 5A:
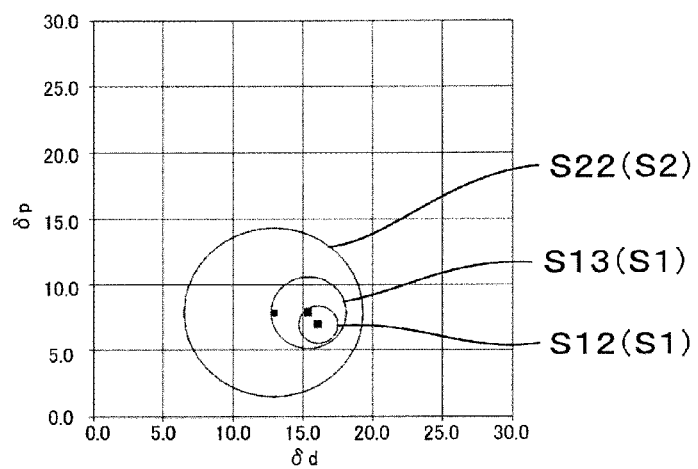
FIG. 5(a) to (c) are explanatory diagrams of overlap of the Hansen spheres of solid particles and a dispersant in comparative example 2.
Figure 5B:
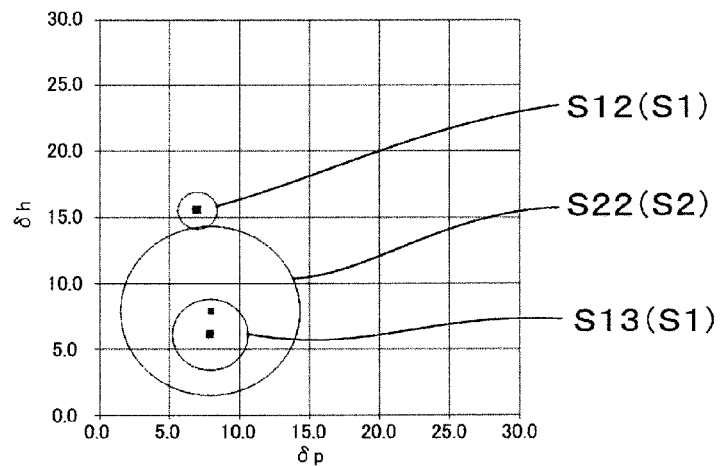
Figure 5C:
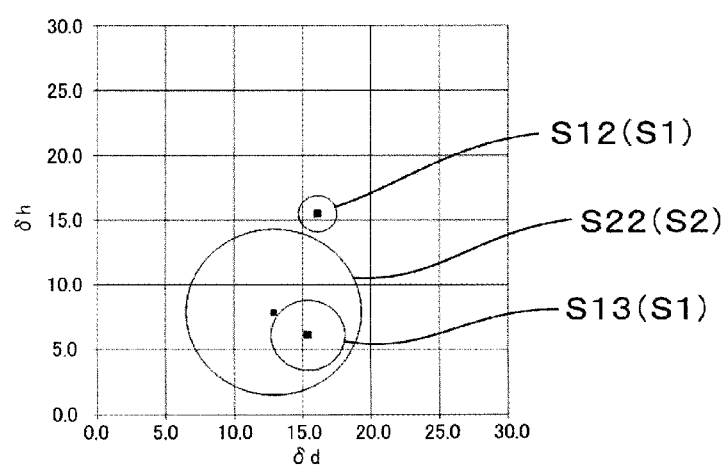
Figure 6:
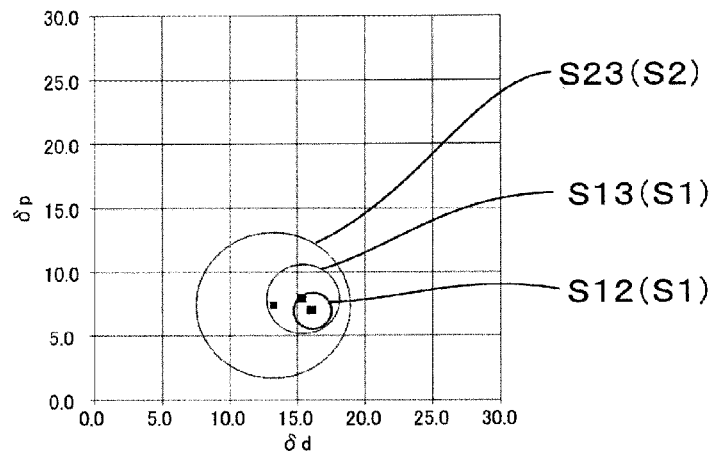
FIG. 6(a) to (c) are explanatory diagrams of overlap of the Hansen spheres of solid particles and a dispersant in comparative example 3.
Figure 6:
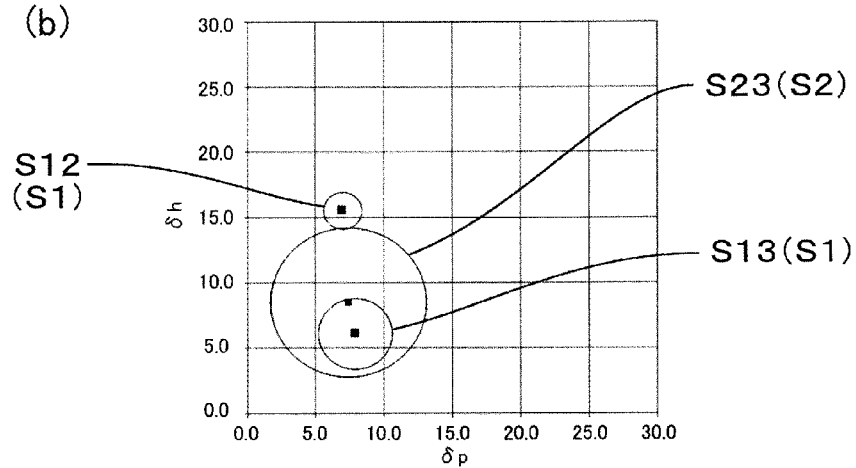
Figure 6:
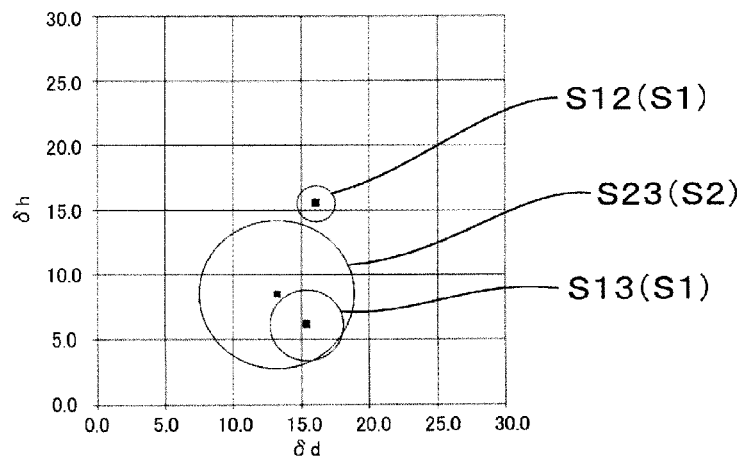
Figure 7:
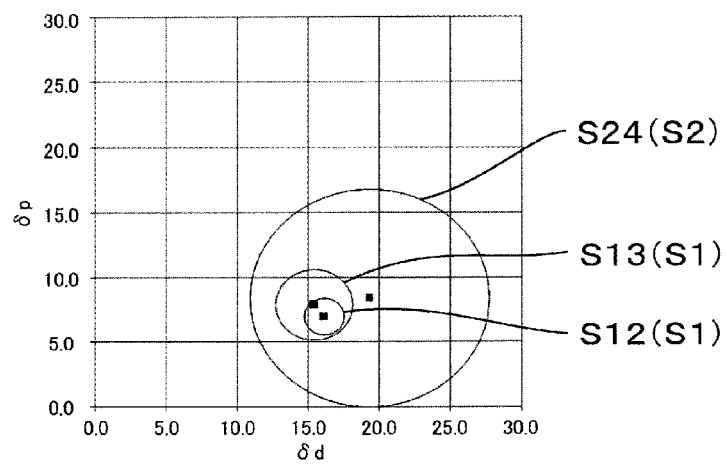
FIG. 7(a) to (c) are explanatory diagrams of overlap of the Hansen spheres of solid particles and a dispersant in comparative example 4.
Figure 7:
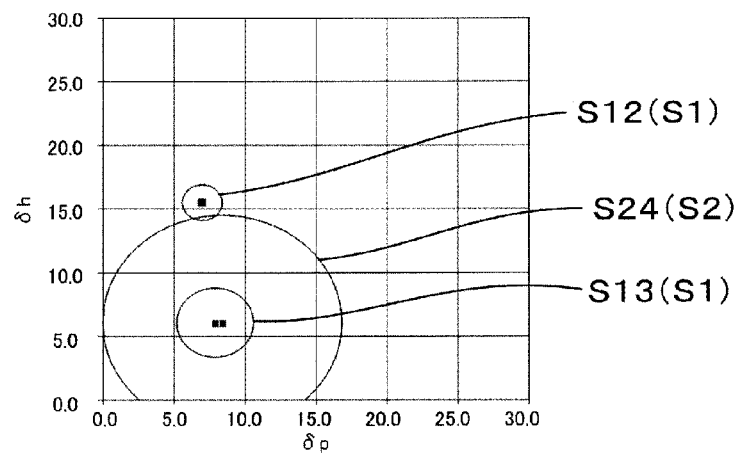
Figure 7:
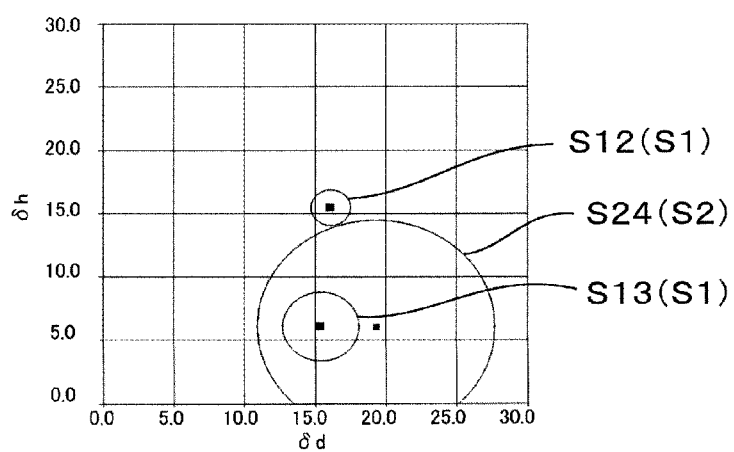

An embodiment in which a honeycomb structure 2 is manufactured as a ceramic sintered body 1 using a dispersion body will be described. As shown in FIG. 3, for example, the honeycomb structure 2 has a circular cylindrical outer skin 21 and partition walls 23 that partition an interior of the outer skin 21 into numerous cells 22. The partition walls 23 are provided in a lattice shape. The cell 22 extends along an axial direction X of the outer skin 21. The axial direction X of the outer skin 21 is also an axial direction X of the honeycomb structure 2.

As the honeycomb structure 2, there is a monolith substrate that is used to carry an exhaust gas purification catalyst such as a noble metal catalyst, and an exhaust gas purification filter that forms a sealing portion and is used to collect particulate matter in the exhaust gas. Although illustration of the sealing portion is omitted, the sealing portion is formed on both ends 28 and 29 in the axial direction X of the honeycomb structure 2. In each cell 22, a first end 28 or a second end 29 is sealed by the sealing portion. In the first end 28 or the second end 29, the sealing portions and open portions that are not sealed by the sealing portion are arranged in a checkerboard pattern. Hereafter, the honeycomb structure for the monolith substrate is referred to as a "first honeycomb structure" and the honeycomb structure for the exhaust gas purification filter is referred to as a "second honeycomb structure."

The first honeycomb structure and the second honeycomb structure both have the honeycomb structure shown in FIG. 3, and are composed of cordierite, SiC, aluminum titanate, or the like. For example, even in the case of the same cordierite, because required performance, such as heat resistance, strength, and porosity, differs between the first honeycomb structure and the second honeycomb structure, differing raw materials are used.

When the first honeycomb structure is composed of cordierite, the raw material is selected from kaolin, aluminum hydroxide, silica, alumina, talc, and a pore-forming material. In addition, when the second honeycomb structure is composed of cordierite, the raw material is selected from silica, such as porous silica, aluminum hydroxide, talc, and a pore-forming material. Meanwhile, to improve wettability between the raw material and water, and improve dispersibility, a lubricating oil or a dispersant is used as the dispersant.

A manufacturing method for the honeycomb structure is as follows. First, the solid particles of the raw material that is selected from a candidate group, the dispersant that is selected from a candidate group, and water are mixed and kneaded, and a green body is thereby prepared. This green body is the dispersion body. Next, the green body is extruded into a honeycomb shape and a molded body is obtained. As a result of the molded body being dried and fired, the honeycomb structure is obtained.

A green body that has favorable dispersibility can be obtained by the solid particles and the dispersant being selected and the green body being prepared as according to the first and second embodiments. As a result, occurrence of defects, such as cracks and distortion of cells, after firing can be prevented. As a result of the dispersion body according to the first embodiment and the second embodiment being used, even in cases in which the ceramic sintered body 1 has a thin portion, such as the partition wall 23 of the honeycomb structure 2, occurrence of an abnormality in shape in the thin portion after molding or after firing can be prevented. In addition, a dispersion body that is in a high-dispersion state can be obtained even when the amount of dispersant is reduced. Therefore, imbalance in a dispersant component within the green body is reduced. Consequently, stress during firing is suppressed, and defects that may occur in the sintered body can be further prevented.

Experiment Example 1

A present example is an example in which solid particles and a dispersant that are used to manufacture a honeycomb structure that is composed of cordierite are selected from candidate groups. Specifically, the solid particles and the dispersant that are used to manufacture the first honeycomb structure for the monolith substrate are selected.

In the present example, in the manufacturing of the first honeycomb structure, aluminum hydroxide, alumina, silica, talc, and kaolin were used as the solid particles of the raw material of the first honeycomb structure. In addition, a dispersion body was manufactured by these raw materials, water, and a liquid dispersant being mixed. The dispersion body was then molded, dried, and fired and the honeycomb structure was thereby manufactured. First, the HSP values of the solid particles and the dispersant that are used as the raw materials of the honeycomb structure were measured using the method described according to the first embodiment.

Tables 2 to 4 show measurement targets for the HSP value, and the solvent reagents that were used for the measurement. A circle mark in the table indicates that the corresponding solvent reagent was used. A blank field indicates that the corresponding solvent reagent was not used. Here, Tables 2 to 4 also show measurement targets that serve as the manufacturing raw materials of the second honeycomb structure for the exhaust gas purification filter, described in experiment example 2, and the solvent reagents. Here, in the tables, the measurement targets to which a letter of the alphabet is attached indicate measurement targets that differ in manufacturer, place of production, product name (product number), and the like.

TABLE 2

| Reagent No. | Category | Solvent reagent | Aluminum hydroxide A | Aluminum hydroxide D | Alumina | Silica | Talc A | Kaolin |
|---|---|---|---|---|---|---|---|---|
| R1 | First Group | 1-Butanol | ○ | ○ | ○ | ○ | ○ | ○ |
| R2 | First Group | Tetrahydrofuran (THF) | ○ | ○ | ○ | ○ | ○ | ○ |
| R3 | Second Group | Acetic Acid | ○ | | | ○ | ○ | ○ |
| R4 | First Group | 1,4-Dioxane | ○ | ○ | ○ | ○ | ○ | ○ |
| R5 | Second Group | Dimethyl Formamide (DMF) | ○ | ○ | ○ | ○ | ○ | ○ |
| R6 | First Group | Ethanol | ○ | ○ | ○ | ○ | ○ | ○ |
| R7 | Second Group | N-Methyl Formamide | ○ | ○ | ○ | ○ | ○ | ○ |
| R8 | Second Group | 2-Propanol | ○ | | ○ | ○ | ○ | ○ |
| R9 | First Group | Dimethyl Sulfoxide (DMSO) | ○ | ○ | ○ | ○ | ○ | ○ |
| R10 | Second Group | Methyl Isobutyl Ketone (MIBK) | ○ | | | ○ | | ○ |
| R11 | Second Group | Cyclohexane | ○ | | ○ | ○ | ○ | |
| R12 | First Group | Acetone | ○ | ○ | ○ | ○ | ○ | ○ |
| R13 | First Group | Toluene | ○ | ○ | ○ | ○ | ○ | ○ |
| R14 | First Group | Methyl Ethyl Ketone (MEK) | ○ | ○ | ○ | ○ | ○ | ○ |
| R15 | First Group | Ethyl Acetate | ○ | ○ | ○ | ○ | ○ | ○ |
| R16 | Third Group | 1-Methyl Imidazole | ○ | | | | | |
| R17 | Third Group | Benzyl Alcohol | ○ | | | | | |
| R18 | Third Group | N-Methyl-2-Pyrrolidone (NMP) | ○ | | | | | |
| R19 | Third Group | Hexane | ○ | | | | | |
| R20 | Third Group | Ethylene Glycol Monomethyl Ether | ○ | | | | | |
| R21 | Third Group | Quinoline | ○ | | | | | |
| R22 | Second Group | Diacetone Alcohol | | | ○ | ○ | ○ | ○ |

TABLE 3

| Reagent No. | Category | Solvent reagent | Talc D | Talc C | Talc D | Aluminum hydroxide B | Aluminum hydroxide C | Silica C |
|---|---|---|---|---|---|---|---|---|
| R1 | First Group | 1-Butanol | ○ | ○ | ○ | ○ | ○ | ○ |
| R2 | First Group | Tetrahydrofuran (THF) | ○ | ○ | ○ | ○ | ○ | ○ |
| R3 | Second Group | Acetic Acid | ○ | ○ | ○ | ○ | ○ | |
| R4 | First Group | 1,4-Dioxane | ○ | ○ | ○ | ○ | ○ | ○ |
| R5 | Second Group | Dimethyl Formamide (DMF) | ○ | ○ | ○ | ○ | ○ | |
| R6 | First Group | Ethanol | ○ | ○ | ○ | ○ | ○ | ○ |
| R7 | Second Group | N-Methyl Formamide | ○ | ○ | | ○ | ○ | |
| R8 | Second Group | 2-Propanol | ○ | | | ○ | ○ | |
| R9 | First Group | Dimethyl Sulfoxide (DMSO) | ○ | ○ | ○ | ○ | ○ | ○ |
| R10 | Second Group | Methyl Isobutyl Ketone (MIBK) | | ○ | | ○ | ○ | |
| R11 | Second Group | Cyclohexane | ○ | | ○ | ○ | ○ | |
| R12 | First Group | Acetone | ○ | ○ | ○ | ○ | ○ | ○ |
| R13 | First Group | Toluene | ○ | ○ | ○ | ○ | ○ | ○ |
| R14 | First Group | Methyl Ethyl Ketone (MEK) | ○ | ○ | ○ | ○ | ○ | ○ |
| R15 | First Group | Ethyl Acetate | ○ | ○ | ○ | ○ | ○ | ○ |
| R18 | Third Group | N-Methyl-2-Pyrrolidone (NMP) | | | | | | ○ |
| R22 | Third Group | Diacetone Alcohol | | | | ○ | ○ | ○ |
| R25 | Third Group | o-Dichlorobenzene | | | | | | ○ |
| R26 | Third Group | 1-Methoxy-2-Propanol | | | | | | ○ |
| R27 | Third Group | Bromobenzene | | | | | | ○ |
| R28 | Third Group | Pyridine | | | | | | ○ |
| R29 | Third Group | Benzyl Benzoate | | | | | | ○ |
| R30 | Third Group | N,N-Diethyl Formamide | | | | | | ○ |
| R31 | Third Group | γ-Butyrolactone (GBL) | | | | | | ○ |

TABLE 4

| Reagent No. | Category | Solvent reagent | Canola oil | Dispersant A | Dispersant B | Dispersant C |
|---|---|---|---|---|---|---|
| R1 | First Group | 1-Butanol | ○ | ○ | ○ | ○ |
| R2 | First Group | Tetrahydrofuran (THF) | ○ | ○ | ○ | ○ |
| R3 | Second Group | Acetic Acid | ○ | ○ | ○ | |
| R4 | First Group | 1,4-Dioxane | ○ | ○ | ○ | ○ |

TABLE 4-continued

| Reagent No. | Category | Solvent reagent | Measurement target (solid particles) | | | |
|---|---|---|---|---|---|---|
| | | | Canola oil | Dispersant A | Dispersant B | Dispersant C |
| R5 | Second Group | Dimethyl Formamide (DMF) | ○ | ○ | ○ | ○ |
| R6 | First Group | Ethanol | ○ | ○ | ○ | ○ |
| R7 | Second Group | N-Methyl Formamide | ○ | ○ | ○ | |
| R8 | Second Group | 2-Propanol | ○ | ○ | ○ | ○ |
| R9 | First Group | Dimethyl Sulfoxide (DMSO) | ○ | ○ | ○ | ○ |
| R10 | Second Group | Methyl Isobutyl Ketone (MIBK) | ○ | ○ | ○ | ○ |
| R11 | Second Group | Cyclohexane | ○ | ○ | ○ | ○ |
| R12 | First Group | Acetone | ○ | ○ | ○ | ○ |
| R13 | First Group | Toluene | ○ | ○ | ○ | ○ |
| R14 | First Group | Methyl Ethyl Ketone (MEK) | ○ | ○ | ○ | ○ |
| R15 | First Group | Ethyl Acetate | ○ | ○ | ○ | ○ |
| R19 | Third Group | Hexane | | ○ | ○ | |
| R22 | Third Group | Diacetone Alcohol | ○ | ○ | | ○ |
| R23 | Third Group | Propylene Carbonate | ○ | ○ | ○ | ○ |
| R24 | Third Group | Ethanolamine | ○ | | | ○ |

Table 5 shows measurement results of the HSP values of the solid particles and the HSP distance Ra to water. Table 6 shows measurement results of the HSP values of the dispersants. In addition, Table 7 to Table 22 show classification results of the solvent reagents that are used for measurement of the HSP values of the solid particles and the dispersants that serve as the measurement targets. Score 1 indicates a good solvent and a score 0 indicates a poor solvent. Here, "-" in Table 7, Table 8, and Table 10 to Table 14 indicates that determination was made based on visual observation. Illustration of the three-dimensional Hansen sphere for each measurement target is omitted. However, for example, a Hansen sphere similar to that in FIG. 1 can be obtained through software.

TABLE 5

| Measurement target No. | Measurement target | Manufacturer, place of production | HSP value | | | Fitting value | Measurement method | HSP distance Ra to water |
|---|---|---|---|---|---|---|---|---|
| | | | $\delta_d$ [MPa$^{1/2}$] | $\delta_p$ [MPa$^{1/2}$] | $\delta_h$ [MPa$^{1/2}$] | | | |
| S1 | Aluminum hydroxide A | Manufacturer A | 16.7 | 4.6 | 12.0 | 1.000 | Stokes' method | 32.5 |
| S2 | Aluminum hydroxide D | Manufacturer B | 16.1 | 7.0 | 15.5 | 1.000 | Concentrated particle size analyzer | 28.3 |
| S3 | Alumina | Manufacturer C | 15.9 | 7.4 | 13.5 | 1.000 | Visual observation method | 30.1 |
| S4 | Silica | Manufacturer D | 15.1 | 8.4 | 16.6 | 1.000 | Stokes' method | 26.8 |
| S5 | Kaolin | Manufacturer E | 16.6 | 12.4 | 16.1 | 1.000 | Stokes' method | 26.5 |
| S6 | Talc A | Manufacturer F | 15.4 | 7.9 | 6.1 | 1.000 | Stokes' method | 37.1 |
| S7 | Talc B | Manufacturer G Place of production A | 16.9 | 10.5 | 14.8 | 1.000 | Stokes' method | 28.2 |
| S8 | Talc C | Manufacturer G Place of production B | 14.8 | 7.7 | 6.5 | 1.000 | Stokes' method | 36.8 |
| S9 | Talc D | Manufacturer G Place of production C | 18.8 | 12.0 | 13.0 | 0.857 | Visual observation method | 30.3 |
| S10 | Aluminum hydroxide B | Manufacturer H | 12.6 | 15.2 | 14.8 | 0.822 | Visual observation method | 28.1 |
| S11 | Aluminum hydroxide C | Manufacturer I | 16.7 | 12.3 | 15.8 | 1.000 | Visual observation method | 26.9 |
| S12 | Porous silica | Manufacturer J | 17.4 | 6.6 | 4.6 | 0.993 | Permeation speed method | 39.0 |

TABLE 6

| Measurement target No. | Measurement target | Product number | HSP value | | | Fitting value | Measurement method |
|---|---|---|---|---|---|---|---|
| | | | $\delta_d$ [MPa$^{1/2}$] | $\delta_p$ [MPa$^{1/2}$] | $\delta_h$ [MPa$^{1/2}$] | | |
| L1 | Canola oil | — | 15.9 | 7.6 | 6.4 | 0.822 | Visual observation method |
| L2 | Dispersant A | Unilube* 50MB-26 | 12.9 | 7.9 | 7.9 | 1.000 | Visual observation method |
| L3 | Dispersant B | Unilube* 750E-25 | 13.2 | 7.4 | 8.5 | 0.993 | Visual observation method |
| L4 | Dispersant C | Unilube* 25TG-55 | 19.3 | 8.4 | 6.1 | 0.993 | Visual observation method |

*Unilube is a registered trademark.

TABLE 7

| | | | Aluminum hydroxide A | | | | | | |
|---|---|---|---|---|---|---|---|---|---|
| | | | HSP value | | | Solvent | Solvent | Average | |
| Reagent No. | Category | Solvent reagent | $\delta_d$ [MPa$^{1/2}$] | $\delta_p$ [MPa$^{1/2}$] | $\delta_h$ [MPa$^{1/2}$] | density [kg/m$^3$] | viscosity [Pa · s] | particle size [nm] | Score |
| R1 | First Group | 1-Butanol | 16.0 | 5.7 | 15.8 | 810 | 0.002571 | 6784 | 1 |
| R2 | First Group | Tetrahydrofuran (THF) | 16.8 | 5.7 | 8.0 | 886 | 0.00046 | 8660 | 1 |
| R3 | Second Group | Acetic Acid | 14.5 | 8.0 | 13.5 | 1050 | 0.001066 | 9709 | 0 |
| R4 | First Group | 1,4-Dioxane | 17.5 | 1.8 | 9.0 | 1030 | 0.001204 | 12120 | 0 |
| R5 | Second Group | Dimethyl Formamide (DMF) | 17.4 | 13.7 | 11.3 | 944 | 0.000802 | 12168 | 0 |
| R6 | First Group | Ethanol | 15.8 | 8.8 | 19.4 | 789 | 0.001082 | 13653 | 0 |
| R7 | Second Group | N-Methyl Formamide | 17.4 | 18.8 | 15.9 | 1011 | 0.00165 | 19031 | 0 |
| R8 | Second Group | 2-Propanol | 15.8 | 6.1 | 16.4 | 786 | 0.00255 | 20932 | 0 |
| R9 | First Group | Dimethyl Sulfoxide (DMSO) | 18.4 | 16.4 | 10.2 | 1101 | 0.001991 | 21435 | 0 |
| R10 | Second Group | Methyl Isobutyl Ketone (MIBK) | 15.3 | 6.1 | 4.1 | 802 | 0.0005463 | — | 0 |
| R11 | Second Group | Cyclohexane | 16.8 | 0.0 | 0.2 | 779 | 0.000629 | — | 0 |
| R12 | First Group | Acetone | 15.5 | 10.4 | 7.0 | 788 | 0.000303 | — | 0 |
| R13 | First Group | Toluene | 18.0 | 1.4 | 2.0 | 867 | 0.0005525 | — | 0 |
| R14 | First Group | Methyl Ethyl Ketone (MEK) | 16.0 | 9.0 | 5.1 | 805 | 0.00078 | — | 0 |
| R15 | First Group | Ethyl Acetate | 15.8 | 5.3 | 7.2 | 902 | 0.000426 | — | 0 |

TABLE 8

| | | | Aluminum hydroxide D | | | | |
|---|---|---|---|---|---|---|---|
| | | | HSP value | | | Average | |
| Reagent No. | Category | Solvent reagent | $\delta_d$ [MPa$^{1/2}$] | $\delta_p$ [MPa$^{1/2}$] | $\delta_h$ [MPa$^{1/2}$] | particle size [nm] | Score |
| R12 | First Group | Acetone | 15.5 | 10.4 | 7.0 | — | 0 |
| R16 | Third Group | 1-Methyl Imidazole | 19.7 | 15.6 | 11.2 | — | 0 |
| R17 | Third Group | Benzyl Alcohol | 18.4 | 6.3 | 13.7 | 1428.2 | 0 |
| R9 | First Group | Dimethyl Sulfoxide (DMSO) | 18.4 | 16.4 | 10.2 | 1167.8 | 0 |
| R5 | Second Group | Dimethyl Formamide (DMF) | 17.4 | 13.7 | 11.3 | 1119.7 | 0 |
| R18 | Third Group | N-Methyl-2-Pyrrolidone (NMP) | 18.0 | 12.3 | 7.2 | 1673.2 | 0 |
| R2 | First Group | Tetrahydrofuran (THF) | 16.8 | 5.7 | 8.0 | — | 0 |
| R13 | First Group | Toluene | 18.0 | 1.4 | 2.0 | — | 0 |
| R4 | First Group | 1,4-Dioxane | 17.5 | 1.8 | 9.0 | — | 0 |
| R19 | Third Group | Hexane | 14.9 | 0.0 | 0.0 | — | 0 |
| R1 | First Group | 1-Butanol | 16.0 | 5.7 | 15.8 | 970.4 | 1 |
| R6 | First Group | Ethanol | 15.8 | 8.8 | 19.4 | 1160.1 | 0 |
| R7 | Second Group | N-Methyl Formamide | 17.4 | 18.8 | 15.9 | 1306.2 | 0 |
| R15 | First Group | Ethyl Acetate | 15.8 | 5.3 | 7.2 | — | 0 |
| R20 | Third Group | Ethylene Glycol Monomethyl Ether | 16.0 | 8.2 | 15.0 | 1055.9 | 1 |
| R21 | Third Group | Quinoline | 20.5 | 5.6 | 5.7 | — | 0 |
| R14 | First Group | Methyl Ethyl Ketone (MEK) | 16.0 | 9.0 | 5.1 | — | 0 |

TABLE 9

| | | | Alumina | | | | | |
|---|---|---|---|---|---|---|---|---|
| | | | HSP value | | | Solvent | Solvent | |
| Reagent No. | Category | Solvent reagent | $\delta_d$ [MPa$^{1/2}$] | $\delta_p$ [MPa$^{1/2}$] | $\delta_h$ [MPa$^{1/2}$] | density [kg/m$^3$] | viscosity [Pa · s] | Score |
| R1 | First Group | 1-Butanol | 16.0 | 5.7 | 15.8 | 810 | 0.002571 | 1 |
| R22 | Third Group | Diacetone Alcohol | 15.8 | 8.2 | 10.8 | 938 | 0.003193 | 1 |
| R3 | Second Group | Acetic Acid | 14.5 | 8.0 | 13.5 | 1050 | 0.001066 | 1 |

TABLE 9-continued

Alumina

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa·s] | Score |
|---|---|---|---|---|---|---|---|---|
| R8 | Second Group | 2-Propanol | 15.8 | 6.1 | 16.4 | 786 | 0.00255 | 0 |
| R6 | First Group | Ethanol | 15.8 | 8.8 | 19.4 | 789 | 0.001082 | 0 |
| R9 | First Group | Dimethyl Sulfoxide (DMSO) | 18.4 | 16.4 | 10.2 | 1101 | 0.001991 | 0 |
| R5 | Second Group | Dimethyl Formamide (DMF) | 17.4 | 13.7 | 11.3 | 944 | 0.000802 | 0 |
| R7 | Second Group | N-Methyl Formamide | 17.4 | 18.8 | 15.9 | 1011 | 0.00165 | 0 |
| R11 | Second Group | Cyclohexane | 16.8 | 0.0 | 0.2 | 779 | 0.000629 | 0 |
| R12 | First Group | Acetone | 15.5 | 10.4 | 7.0 | 788 | 0.000303 | 0 |
| R13 | First Group | Toluene | 18.0 | 1.4 | 2.0 | 867 | 0.0005525 | 0 |
| R4 | First Group | 1,4-Dioxane | 17.5 | 1.8 | 9.0 | 1030 | 0.001204 | 0 |
| R2 | First Group | Tetrahydrofuran (THF) | 16.8 | 5.7 | 8.0 | 886 | 0.00046 | 0 |
| R14 | First Group | Methyl Ethyl Ketone (MEK) | 16.0 | 9.0 | 5.1 | 805 | 0.00078 | 0 |
| R15 | First Group | Ethyl Acetate | 15.8 | 5.3 | 7.2 | 902 | 0.000426 | 0 |

TABLE 10

Silica

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa·s] | Average particle size [nm] | Score |
|---|---|---|---|---|---|---|---|---|---|
| R8 | Second Group | 2-Propanol | 15.8 | 6.1 | 16.4 | 786 | 0.00255 | 3576 | 1 |
| R3 | Second Group | Acetic Acid | 14.5 | 8.0 | 13.5 | 1050 | 0.001066 | 4872 | 1 |
| R6 | First Group | Ethanol | 15.8 | 8.8 | 19.4 | 789 | 0.001082 | 6391 | |
| R22 | Third Group | Diacetone Alcohol | 15.8 | 8.2 | 10.8 | 938 | 0.003193 | 7685 | 0 |
| R14 | First Group | Methyl Ethyl Ketone (MEK) | 16.0 | 9.0 | 5.1 | 805 | 0.00078 | 7750 | 0 |
| R1 | First Group | 1-Butanol | 16.0 | 5.7 | 15.8 | 810 | 0.002571 | 8150 | 0 |
| R10 | Second Group | Methyl Isobutyl Ketone (MIBK) | 15.3 | 6.1 | 4.1 | 802 | 0.0005463 | — | 0 |
| R11 | Second Group | Cyclohexane | 16.8 | 0.0 | 0.2 | 779 | 0.000629 | — | 0 |
| R12 | First Group | Acetone | 15.5 | 10.4 | 7.0 | 788 | 0.000303 | — | 0 |
| R13 | First Group | Toluene | 18.0 | 1.4 | 2.0 | 867 | 0.0005525 | — | 0 |
| R4 | First Group | 1,4-Dioxane | 17.5 | 1.8 | 9.0 | 1030 | 0.001204 | — | 0 |
| R2 | First Group | Tetrahydrofuran (THF) | 16.8 | 5.7 | 8.0 | 886 | 0.00046 | — | 0 |
| R5 | Second Group | Dimethyl Formamide (DMF) | 17.4 | 13.7 | 11.3 | 944 | 0.000802 | — | 0 |
| R15 | First Group | Ethyl Acetate | 15.8 | 5.3 | 7.2 | 902 | 0.000426 | — | 0 |
| R9 | First Group | Dimethyl Sulfoxide (DMSO) | 18.4 | 16.4 | 10.2 | 1101 | 0.001991 | — | 0 |
| R7 | Second Group | N-Methyl Formamide | 17.4 | 18.8 | 15.9 | 1011 | 0.00165 | — | 0 |

TABLE 11

Kaolin

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa·s] | Average particle size [nm] | Score |
|---|---|---|---|---|---|---|---|---|---|
| R6 | First Group | Ethanol | 15.8 | 8.8 | 19.4 | 786 | 0.001082 | 2510 | 1 |
| R5 | Second Group | Dimethyl Formamide (DMF) | 17.4 | 13.7 | 11.3 | 1050 | 0.000802 | 3209 | 1 |
| R7 | Second Group | N-Methyl Formamide | 17.4 | 18.8 | 15.9 | 789 | 0.00165 | 3742 | 1 |

TABLE 11-continued

Kaolin

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa · s] | Average particle size [nm] | Score |
|---|---|---|---|---|---|---|---|---|---|
| R8 | Second Group | 2-Propanol | 15.8 | 6.1 | 16.4 | 938 | 0.00255 | 4837 | 1 |
| R22 | Third Group | Diacetone Alcohol | 15.8 | 8.2 | 10.8 | 805 | 0.003193 | 5078 | 0 |
| R9 | First Group | Dimethyl Sulfoxide (DMSO) | 18.4 | 16.4 | 10.2 | 810 | 0.001991 | 5480 | 0 |
| R1 | First Group | 1-Butanol | 16.0 | 5.7 | 15.8 | 802 | 0.002571 | 13547 | 0 |
| R3 | Second Group | Acetic Acid | 14.5 | 8.0 | 13.5 | 779 | 0.001066 | 19878 | 0 |
| R11 | Second Group | Cyclohexane | 16.8 | 0.0 | 0.2 | 788 | 0.000629 | — | 0 |
| R12 | First Group | Acetone | 15.5 | 10.4 | 7.0 | 867 | 0.000303 | — | 0 |
| R13 | First Group | Toluene | 18.0 | 1.4 | 2.0 | 1030 | 0.0005525 | — | 0 |
| R4 | First Group | 1,4-Dioxane | 17.5 | 1.8 | 9.0 | 886 | 0.001204 | — | 0 |
| R2 | First Group | Tetrahydrofuran (THF) | 16.8 | 5.7 | 8.0 | 786 | 0.00046 | — | 0 |
| R14 | First Group | Methyl Ethyl Ketone (MEK) | 16.0 | 9.0 | 5.1 | 1050 | 0.00078 | — | 0 |
| R15 | First Group | Ethyl Acetate | 15.8 | 5.3 | 7.2 | 789 | 0.000426 | — | 0 |

TABLE 12

Talc A

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa · s] | Average particle size [nm] | Score |
|---|---|---|---|---|---|---|---|---|---|
| R12 | First Group | Acetone | 15.5 | 10.4 | 7.0 | 788 | 0.000303 | 2298 | 1 |
| R10 | Second Group | Methyl Isobutyl Ketone (MIBK) | 15.3 | 6.1 | 4.1 | 802 | 0.0005463 | 3216 | 1 |
| R14 | First Group | Methyl Ethyl Ketone (MEK) | 16.0 | 9.0 | 5.1 | 802 | 0.0005463 | 3719 | 1 |
| R6 | First Group | Ethanol | 15.8 | 8.8 | 19.4 | 789 | 0.001082 | 4186 | 0 |
| R5 | Second Group | Dimethyl Formamide (DMF) | 17.4 | 13.7 | 11.3 | 944 | 0.000802 | 4870 | 0 |
| R8 | Second Group | 2-Propanol | 15.8 | 6.1 | 16.4 | 786 | 0.00255 | 6165 | 0 |
| R1 | First Group | 1-Butanol | 16.0 | 5.7 | 15.8 | 810 | 0.002571 | 6267 | 0 |
| R7 | Second Group | N-Methyl Formamide | 17.4 | 18.8 | 15.9 | 1011 | 0.00165 | 6913 | 0 |
| R9 | First Group | Dimethyl Sulfoxide (DMSO) | 18.4 | 16.4 | 10.2 | 1101 | 0.001991 | 8309 | 0 |
| R22 | Third Group | Diacetone Alcohol | 15.8 | 8.2 | 10.8 | 938 | 0.003193 | 8927 | 0 |
| R2 | First Group | Tetrahydrofuran (THF) | 16.8 | 5.7 | 8.0 | 836 | 0.00046 | 18094 | 0 |
| R3 | Second Group | Acetic Acid | 14.5 | 8.0 | 13.5 | 1050 | 0.001066 | 18776 | 0 |
| R15 | First Group | Ethyl Acetate | 15.8 | 5.3 | 7.2 | 902 | 0.000426 | — | 0 |
| R4 | First Group | 1,4-Dioxane | 17.5 | 1.8 | 9.0 | 1030 | 0.001204 | — | 0 |
| R13 | First Group | Toluene | 18.0 | 1.4 | 2.0 | 867 | 0.0005525 | — | 0 |
| R11 | Second Group | Cyclohexane | 16.8 | 0.0 | 0.2 | 779 | 0.000629 | — | 0 |

TABLE 13

Talc B

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa · s] | Average particle size [nm] | Score |
|---|---|---|---|---|---|---|---|---|---|
| R8 | Second Group | 2-Propanol | 15.8 | 6.1 | 16.4 | 786 | 0.00255 | 486 | 1 |
| R5 | Second Group | Dimethyl Formamide (DMF) | 17.4 | 13.7 | 11.3 | 944 | 0.000802 | 510 | 1 |
| R7 | Second Group | N-Methyl Formamide | 17.4 | 18.8 | 15.9 | 1011 | 0.00165 | 619 | 0 |
| R12 | First Group | Acetone | 15.5 | 10.4 | 7.0 | 788 | 0.000303 | 629 | 0 |
| R6 | First Group | Ethanol | 15.8 | 8.8 | 19.4 | 789 | 0.001082 | 673 | 0 |

TABLE 13-continued

Talc B

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa · s] | Average particle size [nm] | Score |
|---|---|---|---|---|---|---|---|---|---|
| R14 | First Group | Methyl Ethyl Ketone (MEK) | 16.0 | 9.0 | 5.1 | 805 | 0.00078 | 675 | 0 |
| R9 | First Group | Dimethyl Sulfoxide (DMSO) | 18.4 | 16.4 | 10.2 | 1101 | 0.001991 | 804 | 0 |
| R1 | First Group | 1-Butanol | 16.0 | 5.7 | 15.8 | 810 | 0.002571 | 814 | 0 |
| R2 | First Group | Tetrahydrofuran (THF) | 16.8 | 5.7 | 8.0 | 886 | 0.00046 | — | 0 |
| R3 | Second Group | Acetic Acid | 14.5 | 8.0 | 13.5 | 1050 | 0.001066 | — | 0 |
| R4 | First Group | 1,4-Dioxane | 17.5 | 1.8 | 9.0 | 1030 | 0.001204 | — | 0 |
| R11 | Second Group | Cyclohexane | 16.8 | 0.0 | 0.2 | 779 | 0.000629 | — | 0 |
| R13 | First Group | Toluene | 18.0 | 1.4 | 2.0 | 867 | 0.0005525 | — | 0 |
| R15 | First Group | Ethyl Acetate | 15.8 | 5.3 | 7.2 | 902 | 0.000426 | — | 0 |

TABLE 14

Talc C

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa · s] | Average particle size [nm] | Score |
|---|---|---|---|---|---|---|---|---|---|
| R10 | Second Group | Methyl Isobutyl Ketone (MIBK) | 15.3 | 6.1 | 4.1 | 802 | 0.000546 | 695 | 1 |
| R12 | First Group | Acetone | 15.5 | 10.4 | 7.0 | 788 | 0.000303 | 702 | 1 |
| R5 | Second Group | Dimethyl Formamide (DMF) | 17.4 | 13.7 | 11.3 | 944 | 0.000802 | 851 | 0 |
| R6 | First Group | Ethanol | 15.8 | 8.8 | 19.4 | 789 | 0.001082 | 900 | 0 |
| R9 | First Group | Dimethyl Sulfoxide (DMSO) | 18.4 | 16.4 | 10.2 | 1101 | 0.001991 | 1137 | 0 |
| R8 | Second Group | 2-Propanol | 15.8 | 6.1 | 16.4 | 786 | 0.00255 | 1037 | 0 |
| R1 | First Group | 1-Butanol | 16.0 | 5.7 | 15.8 | 810 | 0.002571 | 1050 | 0 |
| R7 | Second Group | N-Methyl Formamide | 17.4 | 18.8 | 15.9 | 1011 | 0.00165 | 1090 | 0 |
| R14 | First Group | Methyl Ethyl Ketone (MEK) | 16.0 | 9.0 | 5.1 | 805 | 0.00078 | 1198 | 0 |
| R2 | First Group | Tetrahydrofuran (THF) | 16.8 | 5.7 | 8.0 | 886 | 0.00046 | — | 0 |
| R3 | Second Group | Acetic Acid | 14.5 | 8.0 | 13.5 | 1050 | 0.001066 | — | 0 |
| R4 | First Group | 1,4-Dioxane | 17.5 | 1.8 | 9.0 | 1030 | 0.001204 | — | 0 |
| R11 | Second Group | Cyclohexane | 16.8 | 0.0 | 0.2 | 779 | 0.000629 | — | 0 |
| R13 | First Group | Toluene | 18.0 | 1.4 | 2.0 | 867 | 0.0005525 | — | 0 |
| R15 | First Group | Ethyl Acetate | 15.8 | 5.3 | 7.2 | 902 | 0.000426 | — | 0 |

TABLE 15

Talc D

| Reagent No. | Category | Solvent reagent | HSP value $\delta_d$ [MPa$^{1/2}$] | HSP value $\delta_p$ [MPa$^{1/2}$] | HSP value $\delta_h$ [MPa$^{1/2}$] | Solvent density [kg/m$^3$] | Solvent viscosity [Pa · s] | Score |
|---|---|---|---|---|---|---|---|---|
| R1 | First Group | 1-Butanol | 16.0 | 5.7 | 15.8 | 820 | 0.002571 | 1 |
| R22 | Third Group | Diacetone Alcohol | 15.8 | 8.2 | 10.8 | 938 | 0.003193 | 1 |
| R8 | Second Group | 2-Propanol | 15.8 | 6.1 | 16.4 | 786 | 0.00255 | 1 |
| R9 | First Group | Dimethyl Sulfoxide (DMSO) | 18.4 | 16.4 | 10.2 | 1101 | 0.001991 | 1 |
| R5 | Second Group | Dimethyl Formamide (DMF) | 17.4 | 13.7 | 11.3 | 944 | 0.000802 | 1 |
| R7 | Second Group | N-Methyl Formamide | 17.4 | 18.8 | 15.9 | 1011 | 0.00165 | 1 |
| R14 | First Group | Methyl Ethyl Ketone (MEK) | 16.0 | 9.0 | 5.1 | 805 | 0.00078 | 1 |

TABLE 15-continued

Talc D

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa · s] | Score |
|---|---|---|---|---|---|---|---|---|
| R11 | Second Group | Cyclohexane | 16.8 | 0.0 | 0.2 | 779 | 0.000629 | 0 |
| R12 | First Group | Acetone | 15.5 | 10.4 | 7.0 | 788 | 0.000303 | 0 |
| R13 | First Group | Toluene | 18.0 | 1.4 | 2.0 | 867 | 0.0005525 | 0 |
| R4 | First Group | 1,4-Dioxane | 17.5 | 1.8 | 9.0 | 1030 | 0.001204 | 0 |
| R2 | First Group | Tetrahydrofuran (THF) | 16.8 | 5.7 | 8.0 | 886 | 0.00046 | 0 |
| R15 | First Group | Ethyl Acetate | 15.8 | 5.3 | 7.2 | 902 | 0.000426 | 0 |
| R3 | Second Group | Acetic Acid | 14.5 | 8.0 | 13.5 | 1050 | 0.001066 | 0 |
| R6 | First Group | Ethanol | 15.8 | 8.8 | 19.4 | 789 | 0.001082 | 0 |

TABLE 16

Canola oil

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Score |
|---|---|---|---|---|---|---|
| R12 | First Group | Acetone | 15.5 | 10.4 | 7.0 | 1 |
| R14 | First Group | Methyl Ethyl Ketone (MEK) | 16.0 | 9.0 | 5.1 | 1 |
| R15 | First Group | Ethyl Acetate | 15.8 | 5.3 | 7.2 | 1 |
| R2 | First Group | Tetrahydrofuran (THF) | 16.8 | 5.7 | 8.0 | 1 |
| R10 | Second Group | Methyl Isobutyl Ketone (MIBK) | 15.3 | 6.1 | 4.1 | 1 |
| R13 | First Group | Toluene | 18.0 | 1.4 | 2.0 | 0 |
| R4 | First Group | 1,4-Dioxane | 17.5 | 1.8 | 9.0 | 0 |
| R11 | Second Group | Cyclohexane | 16.8 | 0.0 | 0.2 | 0 |
| R22 | Third Group | Diacetone Alcohol | 15.8 | 8.2 | 10.8 | 0 |
| R3 | Second Group | Acetic Acid | 14.5 | 8.0 | 13.5 | 0 |
| R8 | Second Group | 2-Propanol | 15.8 | 6.1 | 16.4 | 0 |
| R5 | Second Group | Dimethyl Formamide (DMF) | 17.4 | 13.7 | 11.3 | 0 |
| R1 | First Group | 1-Butanol | 16.0 | 5.7 | 15.8 | 0 |
| R6 | First Group | Ethanol | 15.8 | 8.8 | 19.4 | 0 |
| R9 | First Group | Dimethyl Sulfoxide (DMSO) | 18.4 | 16.4 | 10.2 | 0 |
| R7 | Second Group | N-Methyl Formamide | 17.4 | 18.8 | 15.9 | 0 |
| R23 | Third Group | Propylene Carbonate | 20.0 | 18.0 | 4.1 | 0 |
| R24 | Third Group | Ethanolamine | 17.0 | 15.5 | 21.0 | 0 |

TABLE 17

Dispersant A

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Score |
|---|---|---|---|---|---|---|
| R3 | Second Group | Acetic Acid | 14.5 | 8.0 | 13.5 | 1 |
| R10 | Second Group | Methyl Isobutyl Ketone (MIBK) | 15.3 | 6.1 | 4.1 | 1 |
| R12 | First Group | Acetone | 15.5 | 10.4 | 7.0 | 1 |
| R2 | First Group | Tetrahydrofuran (THF) | 16.8 | 5.7 | 8.0 | 1 |
| R5 | Second Group | Dimethyl Formamide (DMF) | 17.4 | 13.7 | 11.3 | 0 |
| R14 | First Group | Methyl Ethyl Ketone (MEK) | 16.0 | 9.0 | 5.1 | 0 |
| R22 | Third Group | Diacetone Alcohol | 15.8 | 8.2 | 10.8 | 0 |
| R1 | First Group | 1-Butanol | 16.0 | 5.7 | 15.8 | 0 |
| R7 | Second Group | N-Methyl Formamide | 17.4 | 18.8 | 15.9 | 0 |
| R23 | Third Group | Propylene Carbonate | 20.0 | 18.0 | 4.1 | 0 |
| R15 | First Group | Ethyl Acetate | 15.8 | 5.3 | 7.2 | 0 |
| R9 | First Group | Dimethyl Sulfoxide (DMSO) | 18.4 | 16.4 | 10.2 | 0 |
| R13 | First Group | Toluene | 18.0 | 1.4 | 2.0 | 0 |
| R4 | First Group | 1,4-Dioxane | 17.5 | 1.8 | 9.0 | 0 |

TABLE 17-continued

Dispersant A

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Score |
|---|---|---|---|---|---|---|
| R6 | First Group | Ethanol | 15.8 | 8.8 | 19.4 | 0 |
| R8 | Second Group | 2-Propanol | 15.8 | 6.1 | 16.4 | 0 |
| R11 | Second Group | Cyclohexane | 16.8 | 0.0 | 0.2 | 0 |
| R19 | Third Group | Hexane | 14.9 | 0.0 | 0.0 | 0 |

TABLE 18

Dispersant B

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Score |
|---|---|---|---|---|---|---|
| R3 | Second Group | Acetic Acid | 14.5 | 8.0 | 13.5 | 1 |
| R12 | First Group | Acetone | 15.5 | 10.4 | 7.0 | 1 |
| R2 | First Group | Tetrahydrofuran (THF) | 16.8 | 5.7 | 8.0 | 1 |
| R5 | Second Group | Dimethyl Formamide (DMF) | 17.4 | 13.7 | 11.3 | 0 |
| R14 | First Group | Methyl Ethyl Ketone (MEK) | 16.0 | 9.0 | 5.1 | 0 |
| R22 | Third Group | Diacetone Alcohol | 15.8 | 8.2 | 10.8 | 0 |
| R1 | First Group | 1-Butanol | 16.0 | 5.7 | 15.8 | 0 |
| R7 | Second Group | N-Methyl Formamide | 17.4 | 18.8 | 15.9 | 0 |
| R23 | Third Group | Propylene Carbonate | 20.0 | 18.0 | 4.1 | 0 |
| R15 | First Group | Ethyl Acetate | 15.8 | 5.3 | 7.2 | 0 |
| R9 | First Group | Dimethyl Sulfoxide (DMSO) | 18.4 | 16.4 | 10.2 | 0 |
| R13 | First Group | Toluene | 18.0 | 1.4 | 2.0 | 0 |
| R4 | First Group | 1,4-Dioxane | 17.5 | 1.8 | 9.0 | 0 |
| R6 | First Group | Ethanol | 15.8 | 8.8 | 19.4 | 0 |
| R8 | Second Group | 2-Propanol | 15.8 | 6.1 | 16.4 | 0 |
| R10 | Second Group | Methyl Isobutyl Ketone (MIBK) | 15.3 | 6.1 | 4.1 | 0 |
| R11 | Second Group | Cyclohexane | 16.8 | 0.0 | 0.2 | 0 |
| R19 | Third Group | Hexane | 14.9 | 0.0 | 0.0 | 0 |

TABLE 19

Dispersant C

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Score |
|---|---|---|---|---|---|---|
| R2 | First Group | Tetrahydrofuran (THF) | 16.8 | 5.7 | 8.0 | 1 |
| R15 | First Group | Ethyl Acetate | 15.8 | 5.3 | 7.2 | 1 |
| R5 | Second Group | Dimethyl Formamide (DMF) | 17.4 | 13.7 | 11.3 | 1 |
| R4 | First Group | 1,4-Dioxane | 17.5 | 1.8 | 9.0 | 1 |
| R13 | First Group | Toluene | 18.0 | 1.4 | 2.0 | 1 |
| R14 | First Group | Methyl Ethyl Ketone (MEK) | 16.0 | 9.0 | 5.1 | 1 |
| R12 | First Group | Acetone | 15.5 | 10.4 | 7.0 | 1 |
| R9 | First Group | Dimethyl Sulfoxide (DMSO) | 18.4 | 16.4 | 10.2 | 0 |
| R24 | Third Group | Ethanolamine | 17.0 | 15.5 | 21.0 | 0 |
| R22 | Third Group | Diacetone Alcohol | 15.8 | 8.2 | 10.8 | 0 |
| R8 | Second Group | 2-Propanol | 15.8 | 6.1 | 16.4 | 0 |
| R10 | Second Group | Methyl Isobutyl Ketone (MIBK) | 15.3 | 6.1 | 4.1 | 0 |
| R6 | First Group | Ethanol | 15.8 | 8.8 | 19.4 | 0 |
| R23 | Third Group | Propylene Carbonate | 20.0 | 18.0 | 4.1 | 0 |
| R11 | Second Group | Cyclohexane | 16.8 | 0.0 | 0.2 | 0 |
| R1 | First Group | 1-Butanol | 16.0 | 5.7 | 15.8 | 0 |

TABLE 20

Aluminum hydroxide B

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa · s] | Score |
|---|---|---|---|---|---|---|---|---|
| R3 | Second Group | Acetic Acid | 14.5 | 8.0 | 13.5 | 1050 | 0.001066 | 1 |
| R22 | Third Group | Diacetone Alcohol | 15.8 | 8.2 | 10.8 | 938 | 0.003193 | 1 |
| R7 | Second Group | N-Methyl Formamide | 17.4 | 18.8 | 15.9 | 1011 | 0.00165 | 1 |
| R1 | First Group | 1-Butanol | 16.0 | 5.7 | 15.8 | 810 | 0.002571 | 1 |
| R10 | Second Group | Methyl Isobutyl Ketone (MIBK) | 15.3 | 6.1 | 4.1 | 802 | 0.000546 | 0 |
| R2 | First Group | Tetrahydrofuran (THF) | 16.8 | 5.7 | 8.0 | 886 | 0.00046 | 0 |
| R12 | First Group | Acetone | 15.5 | 10.4 | 7.0 | 788 | 0.000303 | 0 |
| R5 | Second Group | Dimethyl Formamide (DMF) | 17.4 | 13.7 | 11.3 | 944 | 0.000802 | 0 |
| R6 | First Group | Ethanol | 15.8 | 8.8 | 19.4 | 789 | 0.001082 | 0 |
| R8 | Second Group | 2-Propanol | 15.8 | 6.1 | 16.4 | 786 | 0.00255 | 0 |
| R9 | First Group | Dimethyl Sulfoxide (DMSO) | 18.4 | 16.4 | 10.2 | 1101 | 0.001991 | 0 |
| R14 | First Group | Methyl Ethyl Ketone (MEK) | 16.0 | 9.0 | 5.1 | 805 | 0.00078 | 0 |
| R4 | First Group | 1,4-Dioxane | 17.5 | 1.8 | 9.0 | 1030 | 0.001204 | 0 |
| R11 | Second Group | Cyclohexane | 16.8 | 0.0 | 0.2 | 779 | 0.000629 | 0 |
| R13 | First Group | Toluene | 18.0 | 1.4 | 2.0 | 867 | 0.0005525 | 0 |
| R15 | First Group | Ethyl Acetate | 15.8 | 5.3 | 7.2 | 902 | 0.000426 | 0 |

TABLE 21

Aluminum hydroxide C

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Solvent density [kg/m$^3$] | Solvent viscosity [Pa · s] | Score |
|---|---|---|---|---|---|---|---|---|
| R1 | First Group | 1-Butanol | 16.0 | 5.7 | 15.8 | 810 | 0.002571 | 1 |
| R22 | Third Group | Diacetone Alcohol | 15.8 | 8.2 | 10.8 | 938 | 0.003193 | 1 |
| R8 | Second Group | 2-Propanol | 15.8 | 6.1 | 16.4 | 786 | 0.00255 | 1 |
| R3 | Second Group | Acetic Acid | 14.5 | 8.0 | 13.5 | 1050 | 0.001066 | 1 |
| R6 | First Group | Ethanol | 15.8 | 8.8 | 19.4 | 789 | 0.001082 | 1 |
| R5 | Second Group | Dimethyl Formamide (DMF) | 17.4 | 13.7 | 11.3 | 944 | 0.000802 | 1 |
| R7 | Second Group | N-Methyl Formamide | 17.4 | 18.8 | 15.9 | 1011 | 0.00165 | 1 |
| R9 | First Group | Dimethyl Sulfoxide (DMSO) | 18.4 | 16.4 | 10.2 | 1101 | 0.001991 | 0 |
| R14 | First Group | Methyl Ethyl Ketone (MEK) | 16.0 | 9.0 | 5.1 | 805 | 0.00078 | 0 |
| R11 | Second Group | Cyclohexane | 16.8 | 0.0 | 0.2 | 779 | 0.000629 | 0 |
| R12 | First Group | Acetone | 15.5 | 10.4 | 7.0 | 788 | 0.000303 | 0 |
| R13 | First Group | Toluene | 18.0 | 1.4 | 2.0 | 867 | 0.0005525 | 0 |
| R4 | First Group | 1,4-Dioxane | 17.5 | 1.8 | 9.0 | 1030 | 0.001204 | 0 |
| R2 | First Group | Tetrahydrofuran (THF) | 16.8 | 5.7 | 8.0 | 886 | 0.00046 | 0 |
| R15 | First Group | Ethyl Acetate | 15.8 | 5.3 | 7.2 | 902 | 0.000426 | 0 |
| R10 | Second Group | Methyl Isobutyl Ketone (MIBK) | 15.3 | 6.1 | 4.1 | 802 | 0.000546 | 0 |

TABLE 22

Porous silica

| Reagent No. | Category | Solvent reagent | HSP value $\delta_d$ [MPa$^{1/2}$] | $\delta_p$ [MPa$^{1/2}$] | $\delta_h$ [MPa$^{1/2}$] | Contact angle [°] | Score |
|---|---|---|---|---|---|---|---|
| R25 | Third Group | o-Dichlorobenzene | 19.2 | 6.3 | 3.3 | 7 | 1 |
| R2 | First Group | Tetrahydrofuran (THF) | 16.8 | 5.7 | 8.0 | 43 | 1 |
| R1 | First Group | 1-Butanol | 16.0 | 5.7 | 15.8 | 44 | 0 |
| R26 | Third Group | 1-Methoxy-2-Propanol | 15.6 | 6.3 | 11.6 | 45 | 0 |
| R6 | First Group | Ethanol | 15.8 | 8.8 | 19.4 | 46 | 0 |
| R27 | Third Group | Bromobenzene | 19.2 | 5.5 | 4.1 | 50 | 0 |
| R15 | First Group | Ethyl Acetate | 15.8 | 5.3 | 7.2 | 52 | 0 |
| R28 | Third Group | Pyridine | 19.0 | 8.8 | 5.9 | 52 | 0 |
| R29 | Third Group | Benzyl Benzoate | 20.0 | 5.1 | 5.2 | 52 | 0 |
| R4 | First Group | 1,4-Dioxane | 17.5 | 1.8 | 9.0 | 52 | 0 |
| R14 | First Group | Methyl Ethyl Ketone (MEK) | 16.0 | 9.0 | 5.1 | 54 | 0 |
| R12 | First Group | Acetone | 15.5 | 10.4 | 7.0 | 56 | 0 |
| R18 | Third Group | N-Methyl-2-Pyrrolidone (NMP) | 18.0 | 12.3 | 7.2 | 58 | 0 |
| R30 | Third Group | N,N-Diethyl Formamide | 16.4 | 11.4 | 9.2 | 58 | 0 |
| R31 | Third Group | γ-Butyrolactone (GBL) | 18.0 | 16.6 | 7.4 | 60 | 0 |
| R9 | First Group | Dimethyl Sulfoxide (DMSO) | 18.4 | 16.4 | 10.2 | 66 | 0 |
| R13 | First Group | Toluene | 18.0 | 1.4 | 2.0 | 74 | 0 |

As shown in Table 5 to Table 22, the classification of the solvent reagents for the solid particles and the dispersants (specifically, non-aqueous liquids) to be measured can be performed by the method described according to the first embodiment. Based on the results thereof, the Hansen spheres and the HSP values can be measured. In addition, the HSP distances Ra of the solid particles to water can be calculated. The Hansenسphere is ordinarily expressed within a three-dimensional space that is referred to as a Hansen space in which the London dispersion force $\delta_d$, the dipole-dipole force $\delta_p$, and the hydrogen bonding force $\delta_h$ are each a coordinate axis. However, in the present experiment example 1, as shown in FIG. 4 to FIG. 10, the Hansen spheres S1 and S2 are respectively expressed by three two-dimensional coordinates to clarify overlap of the Hansen spheres S1 and S2. Here, this also similarly applies to FIG. 22 to FIG. 25 of experiment example 2.

(a) in FIG. 4 to FIG. 10 can be said to be diagrams in which the Hansen spheres S1 and S2 that are expressed by three-dimensional coordinates of which the London dispersion force $\delta_d$, the dipole-dipole force $\delta_p$, and the hydrogen bonding force $\delta_h$ are the axes are projected onto two-dimensional coordinates of which the London dispersion force $\delta_d$ and the dipole-dipole force $\delta_p$ are the axes. That is, (a) in FIG. 4 to FIG. 10 show outer shapes of the Hansen spheres S1 and S2 on the two-dimensional coordinates of which the London dispersion force $\delta_d$ and the dipole-dipole force are the axes. (b) in FIG. 4 to FIG. 10 can be said to be diagrams in which the Hansen sphere that is expressed by three-dimensional coordinates is projected onto two-dimensional coordinates of which the dipole-dipole force $\delta_p$ and the hydrogen bonding force $\delta_h$ are the axes. That is, (b) in FIG. 4 to FIG. 10 show the outer shapes of the Hansen spheres S1 and S2 on the two-dimensional coordinates of which the dipole-dipole force $\delta_p$ and the hydrogen bonding force $\delta_h$ are the axes. (c) in FIG. 4 to FIG. 10 can be said to be diagrams in which the Hansen spheres S1 and S2 that are expressed by three-dimensional coordinates are projected onto two-dimensional coordinates of which the London dispersion force $\delta_d$ and the hydrogen bonding force $\delta_h$ are the axes. That is, (c) in FIG. 4 to FIG. 10 show the outer shapes of the Hansen spheres S1 and S2 on the two-dimensional coordinates of which the London dispersion force $\delta_d$ and the hydrogen bonding force $\delta_h$ are the axes. Here, this also similarly applies to FIG. 22 to FIG. 25 in experiment example 2, described hereafter.

Here, the Hansen spheres shown in FIG. 4 to FIG. 10 and FIG. 22 to FIG. 25 are those of the following solid particles and dispersants. The Hansen sphere S11 is the Hansen sphere of aluminum hydroxide A. The Hansen sphere S12 is the Hansen sphere of aluminum hydroxide D. The Hansen sphere S13 is the Hansen sphere of talc A. The Hansen sphere S14 is the Hansen sphere of talc B. The Hansen sphere S15 is the Hansen sphere of talc C. The Hansen sphere S16 is the Hansen sphere of talc D. The Hansen sphere S17 is the Hansen sphere of porous silica. The Hansen sphere S21 is the Hansen sphere of canola oil. The Hansen sphere S22 is the Hansen sphere of a dispersant A. The Hansen sphere S23 is the Hansen sphere of a dispersant B. The Hansen sphere S24 is the Hansen sphere of a dispersant C.

Figure 8:
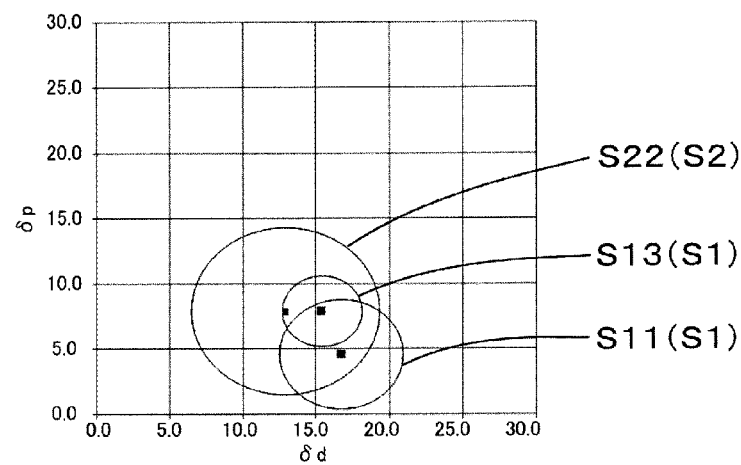
FIG. 8(a) to (c) are explanatory diagrams of overlap of the Hansen spheres of solid particles and a dispersant in example 1.
Figure 8:
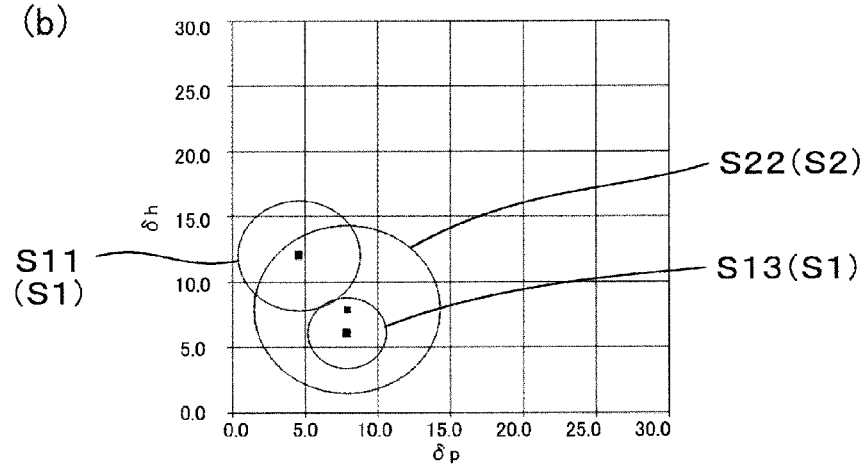
Figure 8:
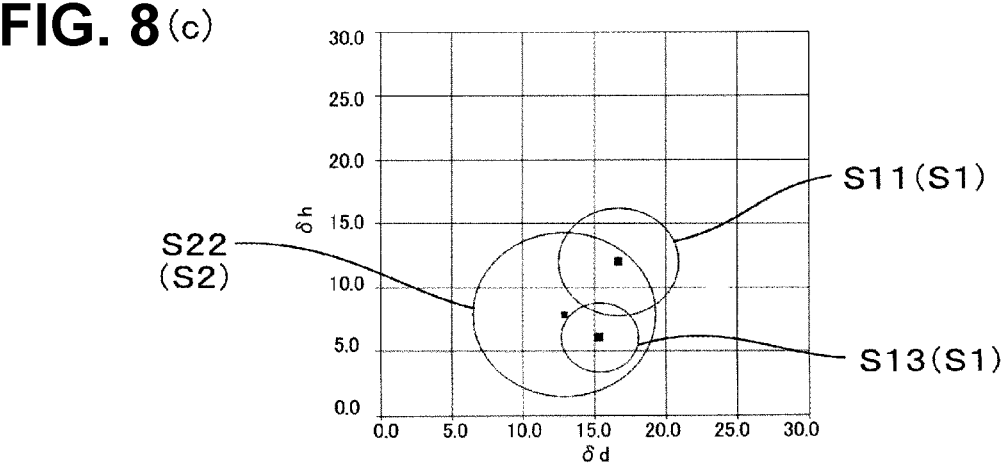
Figure 9:
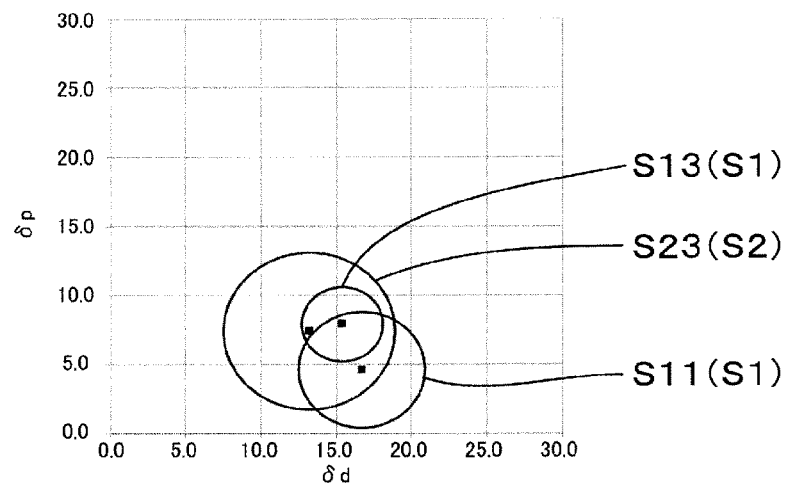
FIG. 9(a) to (c) are explanatory diagrams of overlap of the Hansen spheres of solid particles and a dispersant in example 2.
Figure 9:
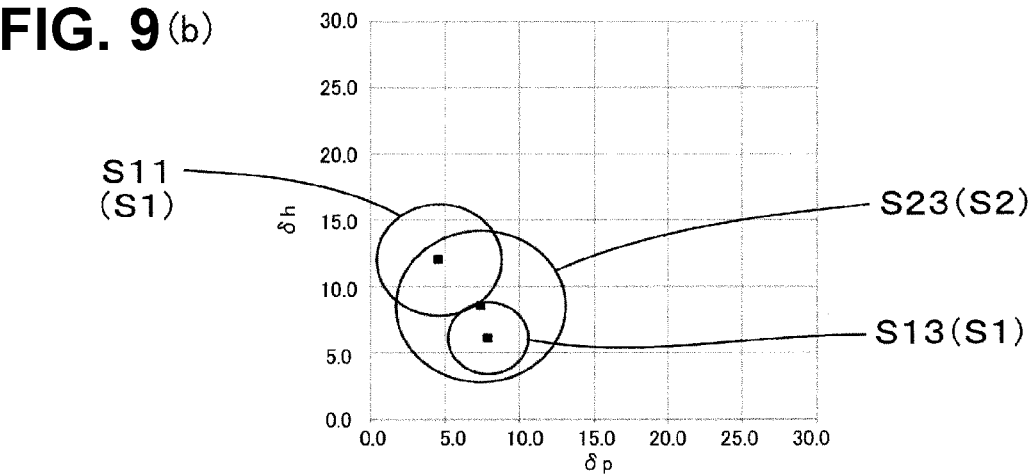
Figure 9:
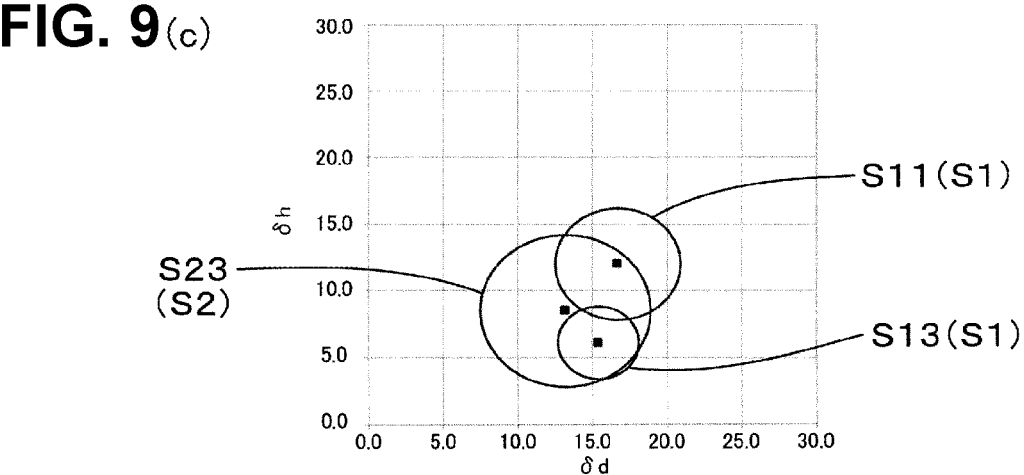
Figure 10:
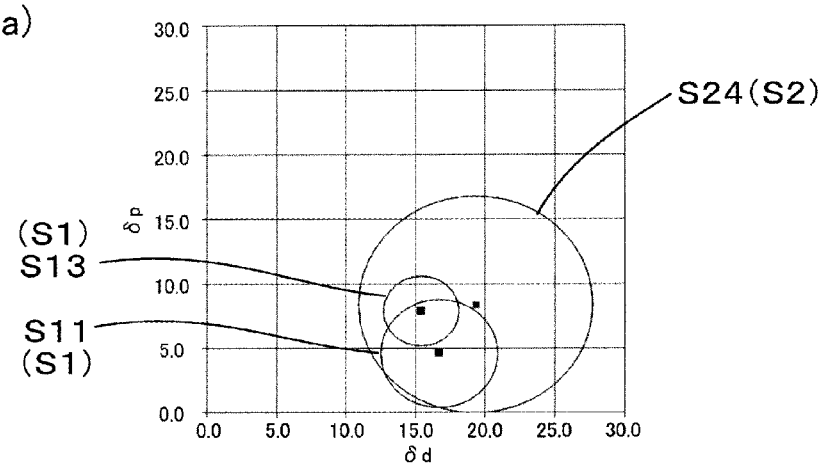
FIG. 10(a) to (c) are explanatory diagrams of overlap of the Hansen spheres of solid particles and a dispersant in example 3.
Figure 10:
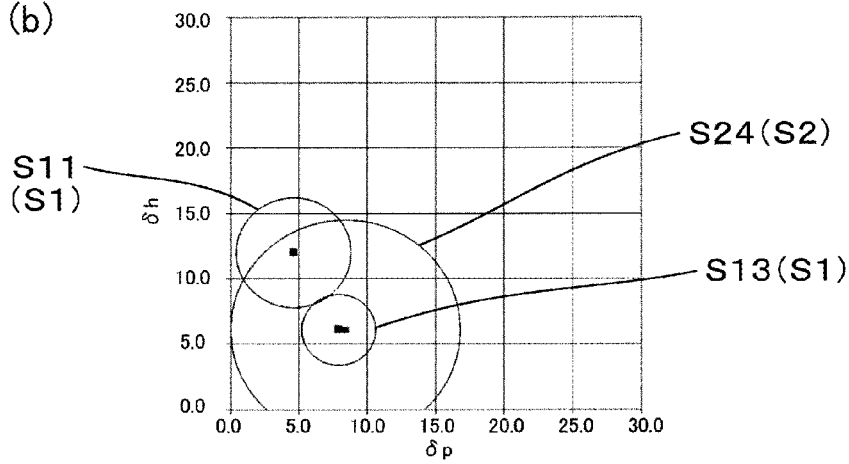
Figure 10:
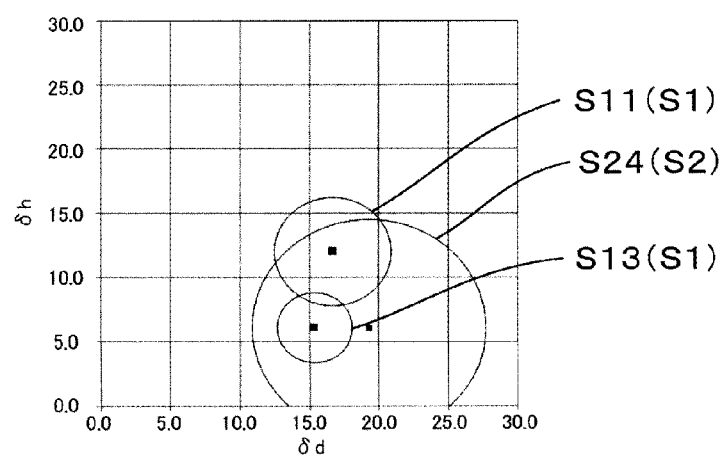

As shown in Table 23 and Table 24, the solid particles and the dispersants that serve as the raw materials for the monolith substrate were selected. "o" in a selection field indicates that the solid particles or the dispersant is selected. A blank field indicates that the solid particles or the dispersant is not selected. The selection was performed based on the HSP distance Ra to water and the overlap of the Hansen spheres shown in FIG. 4 to FIG. 10, based on the above-described measurement results. As shown in FIG. 8 to FIG. 10, in examples 1 to 3, the selection was performed such that the Hansen spheres S1 of two solid particles and the Hansen sphere S2 of one type of dispersant mutually overlap. As shown in FIG. 4 to FIG. 7, in the solid particles and the dispersants used in the comparative examples 1 to 4, a combination in which the Hansen spheres S1 and S2 do not overlap is present. Here, in FIG. 4 to FIG. 10, the Hansen spheres are shown as two-dimensional circles as described above. Therefore, the overlap of Hansen spheres is expressed as overlap of circles. This also similarly applies to FIG. 22 to FIG. 25 in experiment example 2, described hereafter.

The solid particles and the dispersants were selected as the raw materials for the monolith substrate based on the HSP distance Ra to water and the overlap of the Hansen spheres, based on the above-described measurement results. Specifically, in examples 1 to 3 in Table 24, at least aluminum hydroxide A and talc A were selected as the solid particles, and the dispersants A to C were selected as the dispersant. These solid particles and dispersants, as well as kaolin, silica, alumina, and water were mixed, and a green body for the first honeycomb structure was prepared. The raw material that has a greatest mixing amount among the solid particles is talc, and the raw material that has a second greatest mixing amount is aluminum hydroxide. Here, "o" in the selection field in Table 23, Table 24, and Table 25, described hereafter, indicates that the solid particles or the dispersant that serves as the raw material is selected and used. A blank field indicates that the dispersant is not selected. In addition, "o" in a Hansen sphere overlap field indicates that both of the Hansen spheres S1 of the two solid particles overlap the Hansen sphere S2 of the dispersant. An "x" indicates that one of the Hansen spheres S1 of the two solid particles does not overlap the Hansen sphere S2 of the dispersant.

Furthermore, the solid particles and the dispersants were selected as shown in comparative examples 1 to 5 in Table 23. That is, as the solid particles, at least aluminum hydroxide A, aluminum hydroxide D, or talc A was selected and, as the dispersant, canola oil, the dispersant A, the dispersant B, or the dispersant C was selected. Other aspects were similar to those in examples 1 to 3, and the green body for the first honeycomb structure was prepared. Here, as shown in FIG. 4 to FIG. 7, the Hansen sphere S13 of talc A overlaps the Hansen sphere S21 of canola oil and the Hansen sphere S22 of the dispersant A. However, the Hansen sphere S12 of aluminum hydroxide D does not overlap the Hansen sphere S21 of canola oil or the Hansen spheres S22, S23, and S24 of the dispersants A to C.

Next, the optimal amount α of the dispersant was determined based on the optimal amount determination method according to the first embodiment. In the determination of the optimal amount α, the viscosity was measured as the torque value by the torque method. Specifically, first, torque value data was obtained by the torque method according to the first embodiment. FIG. 11(a), FIG. 11(b), and FIGS. 12(a) to (c) show the torque value data when the green body of example 3 in Table 24 is fabricated.

Figure 11A:
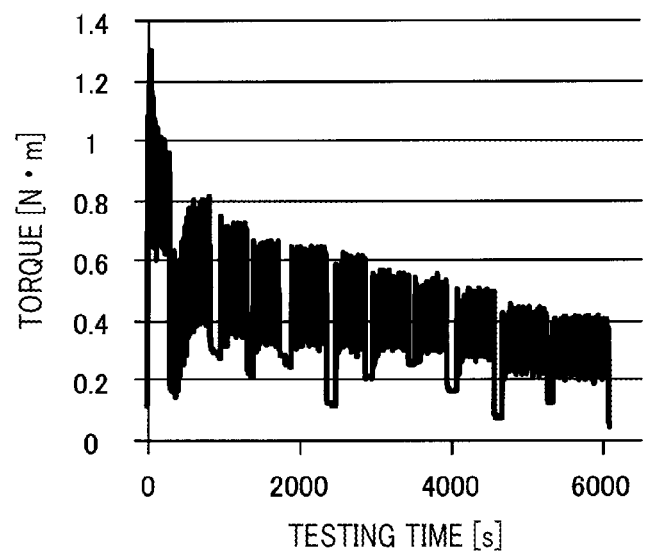
FIG. 11(a) is a diagram showing a relationship between experiment time and torque in example 3 and FIG. 11(b) is a diagram showing a relationship between the experiment time and rotation frequency.
Figure 11B:
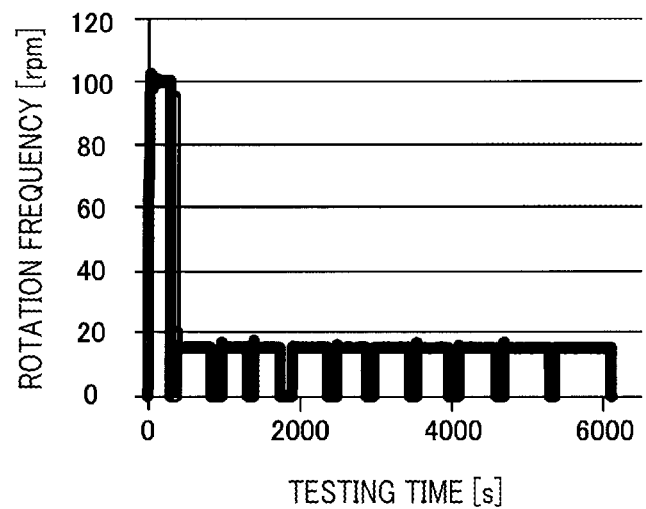
Figure 12A:
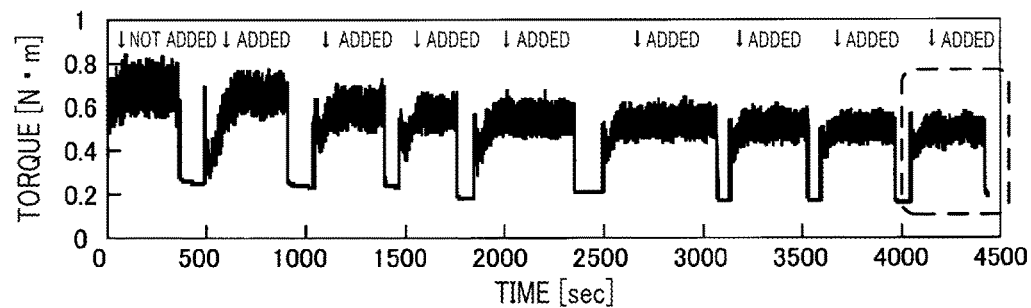
FIG. 12(a) is a diagram showing a relationship between a timing for dispersant addition, time, and torque in example 3.
Figure 12B:
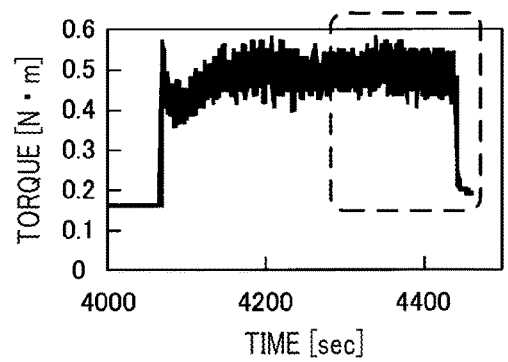
FIG. 12(b) is an enlarged view of a broken-line area in FIG. 12(a)
Figure 12C:
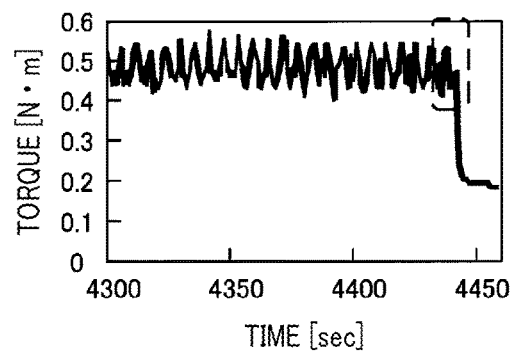
FIG. 12(c) is an enlarged view of a broken-line area in FIG. 12(b)

FIG. 11(a) and FIG. 11(b) show the torque value data and rotation frequency data when the dispersant C is gradually added to a mixture in which the dispersant C is excluded from the materials that are used to fabricate the green body in example 3. In FIG. 11(a), a horizontal axis indicates a testing time (specifically, an elapsed time from when mixing is started at 100 rpm at (3) in the "measurement steps of the torque method," described above), and a vertical axis indicates rotation frequency. In addition, FIG. 12(a) shows the torque value data in FIG. 11(a) excluding a region amounting to time required to achieve thickening. That is, FIG. 12(a) shows the torque value data after thickening. FIG. 12(b) shows the torque value data in which a region surrounded by a broken line in FIG. 12(a) is extracted. Furthermore, FIG. 12(c) shows the torque value data in which a region surrounded by a broken line in FIG. 12(b) is extracted.

As is clear from FIG. 11 and FIG. 12, as the dispersant is gradually added and the added amount of the dispersant increases, the torque value decreases and the changes in the torque value decrease. That is, it is clear that, as the added amount of the dispersant increases, the viscosity decreases, and the changes in viscosity decrease.

Figure 13A:
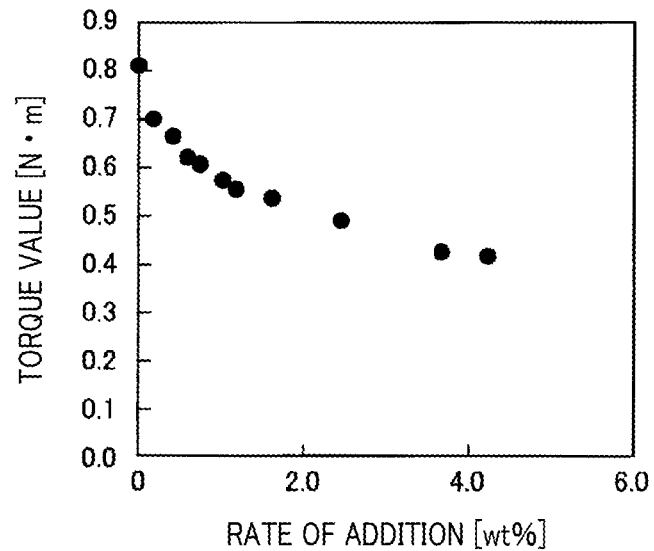
FIG. 13(a) is a diagram showing a relationship between an added amount of dispersant and torque in example 3 and comparative example 5.
Figure 13B:
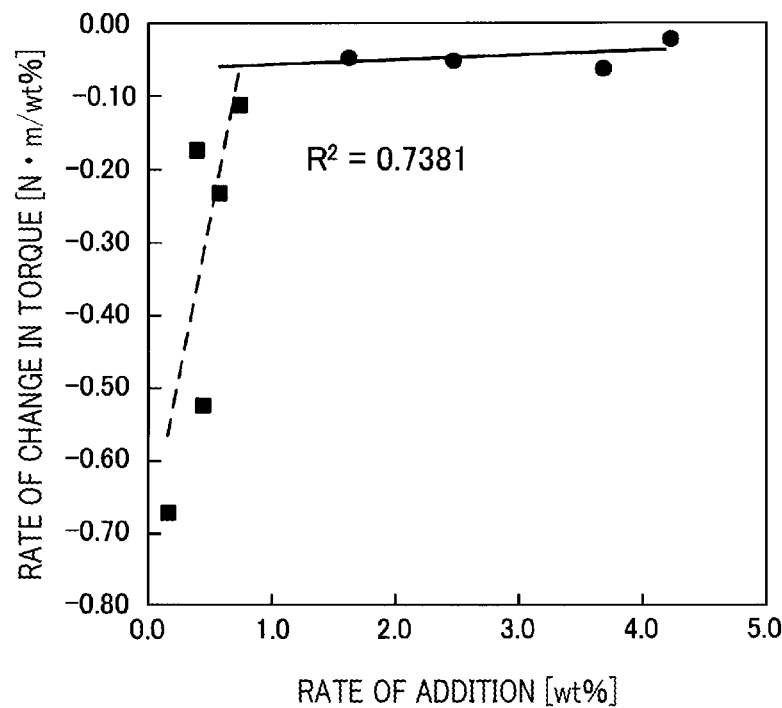
FIG. 13(b) is a diagram showing a relationship between the added amount of dispersant and a rate of change in torque in example 3 and comparative example 5.
Figure 14:
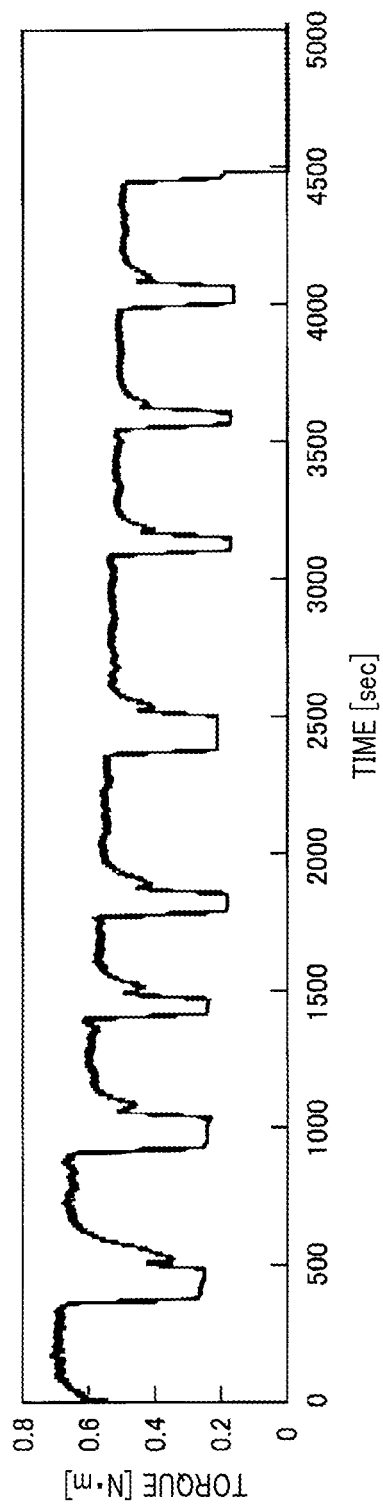
FIG. 14 is a diagram showing a relationship between time and a moving average line of a torque value.
Figure 16A:
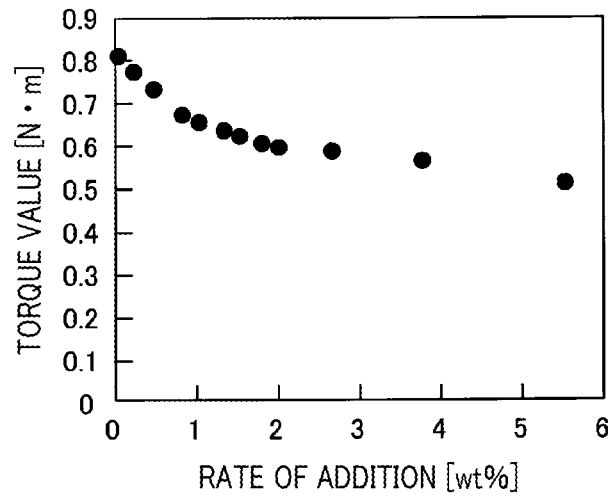
FIG. 16(a) is a diagram showing a relationship between the added amount of dispersant and the torque value in comparative example 2.
Figure 16B:
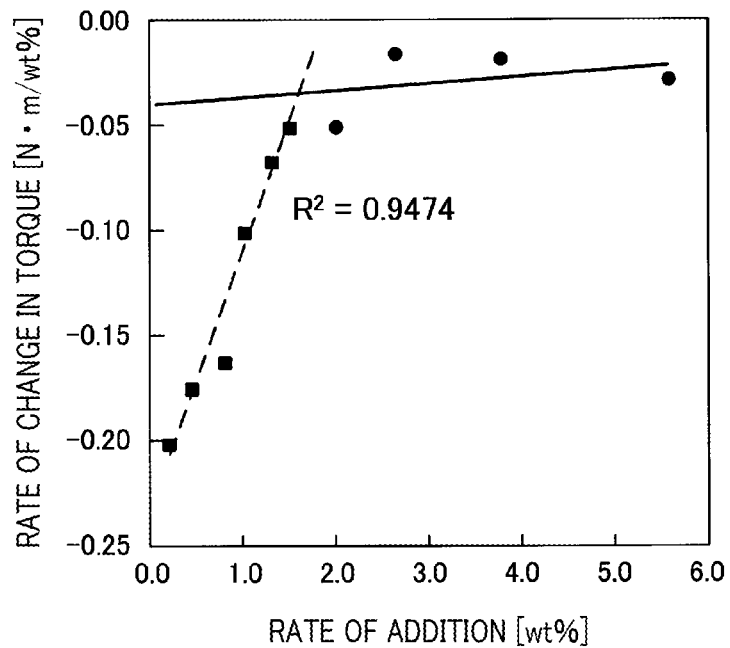
FIG. 16(b) is a diagram showing a relationship between the added amount of dispersant and the rate of change in torque in comparative example 2.
Figure 17:
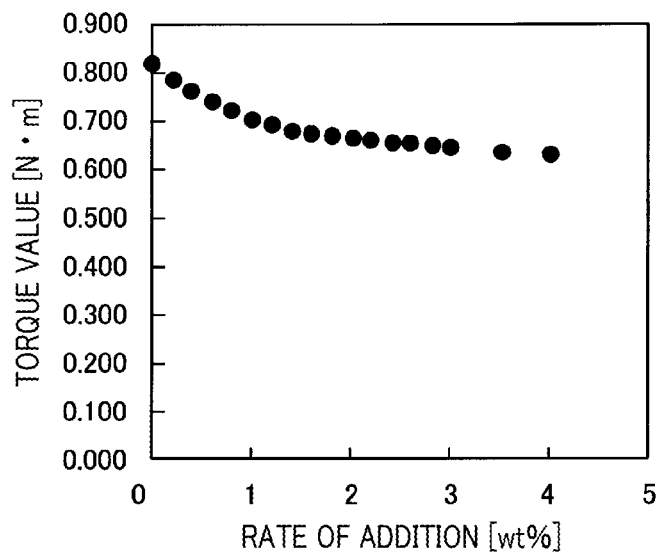
FIG. 17(a) is a diagram showing a relationship between the added amount of dispersant and the torque value in comparative example 3.
FIG. 17(b) is a diagram showing a relationship between the added amount of dispersant and the rate of change in torque in comparative example 3.
Figure 17:
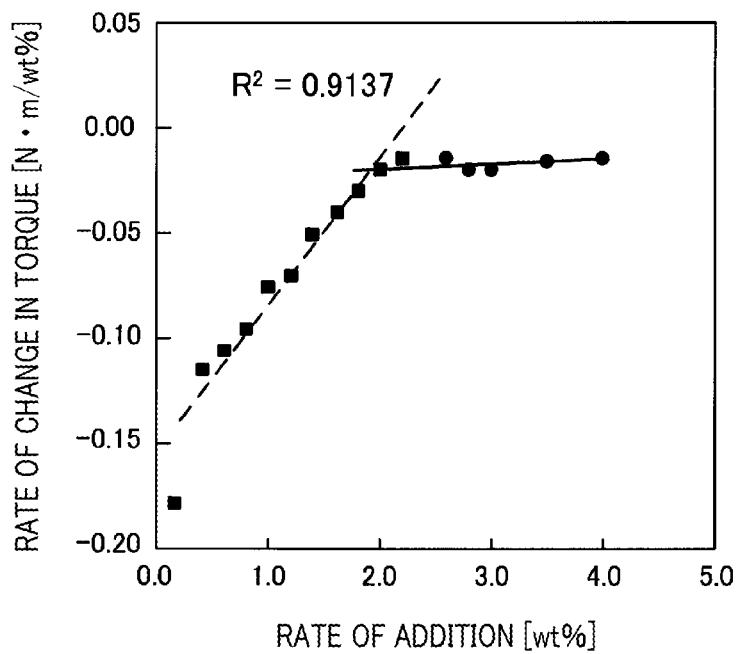
Figure 18:
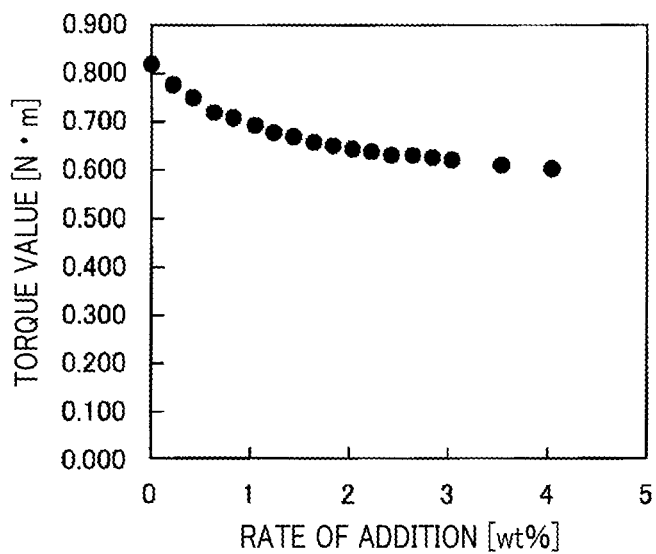
FIG. 18(a) is a diagram showing a relationship between the added amount of dispersant and the torque value in comparative example 4.
FIG. 18(b) is a diagram showing a relationship between the added amount of dispersant and the rate of change in torque in comparative example 4.
Figure 18:
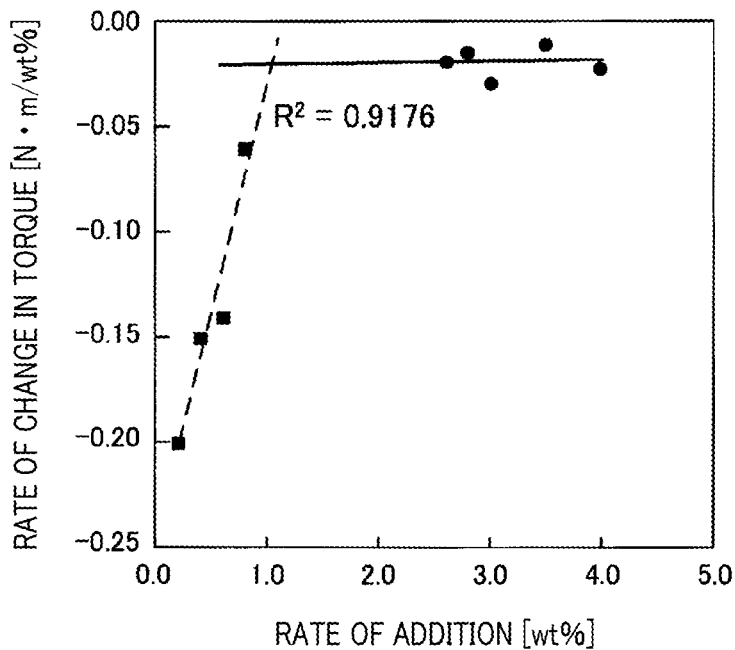
Figure 19:
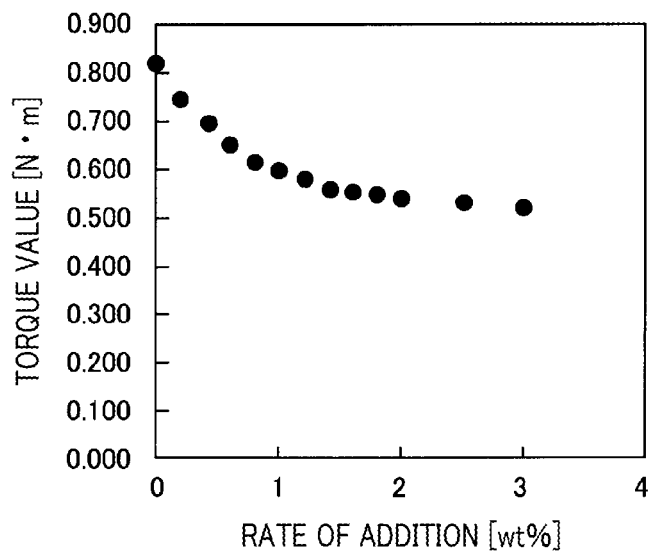
FIG. 19(a) is a diagram showing a relationship between the added amount of dispersant and the torque value in example 1.
FIG. 19(b) is a diagram showing a relationship between the added amount of dispersant and the rate of change in torque in example 1.
Figure 19:
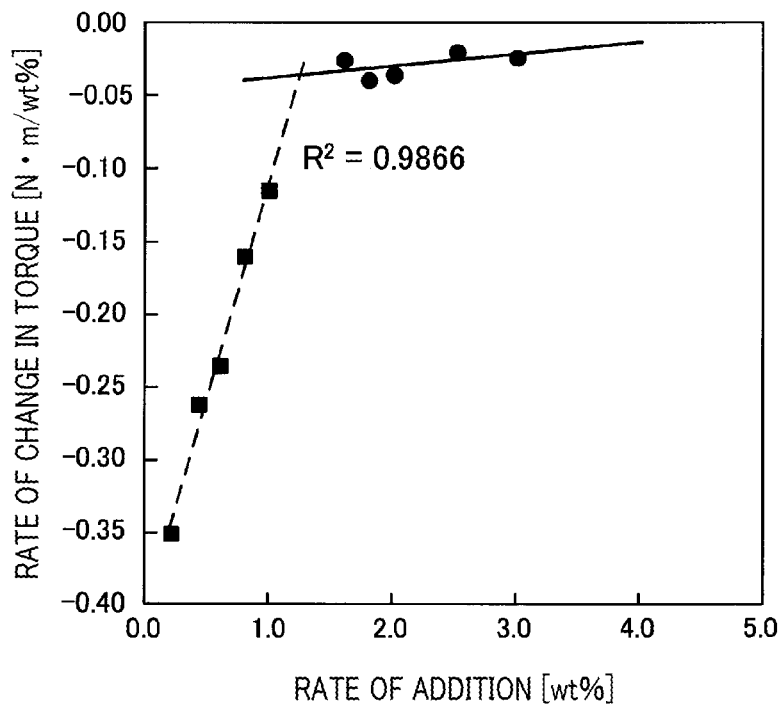
Figure 20A:
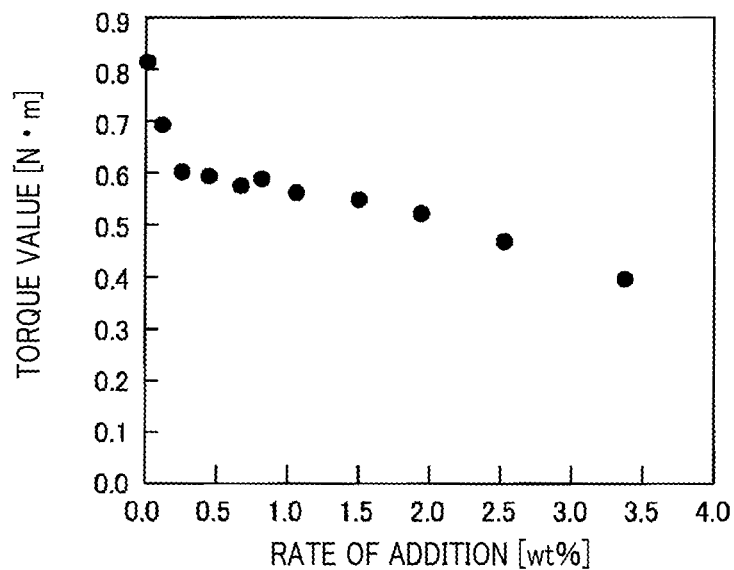
FIG. 20(a) is a diagram showing a relationship between the added amount of dispersant and the torque value in example 2.
Figure 20B:
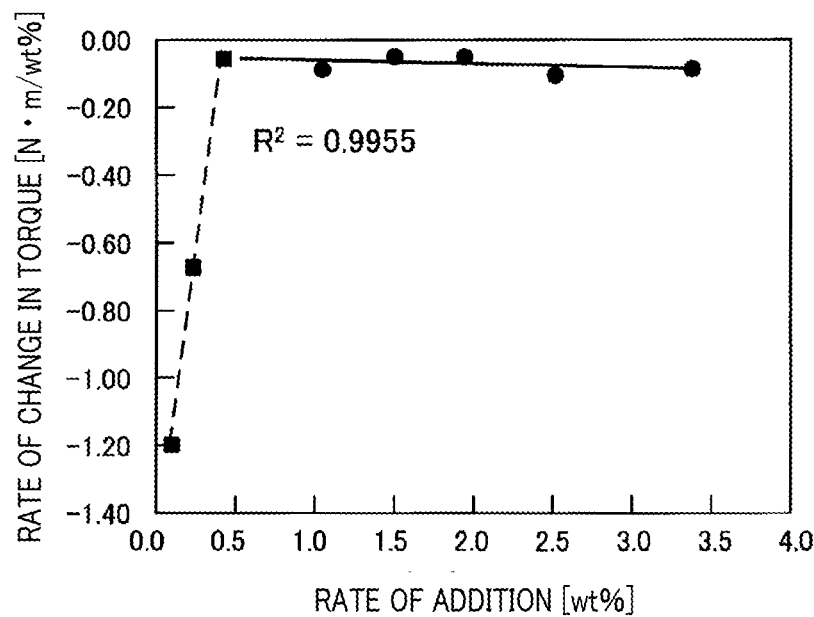
FIG. 20(b) is a diagram showing a relationship between the added amount of dispersant and the rate of change in torque in example 2.

To show the relationship between the added amount of the dispersant and the changes in viscosity, FIG. 13(a) shows a relationship between the added amount of the dispersant and the torque value in example 3. FIG. 13(b) shows a relationship between the added amount of the dispersant and the rate of change in torque. The added amount of the dispersant is an amount (unit: weight %) in relation to 100 weight % of solid particles. As according to the first embodiment, as the torque value, the maximum torque value subsequent to 60 seconds in a waveform of the torque in which the torque value is continuously stable for 240 seconds after addition of the dispersant was read. That is, the maximum value of the torque within a region surrounded by a broken line in FIG. 12(c) was read. As a result of the maximum value of the torque being read from each waveform that has stabilized after addition of the dispersant, each torque value after addition of the dispersant was determined. The rate of change in torque is obtained by a difference in torque value before and after the addition of the dispersant being divided by a difference in added amount. Here, in the present example, the torque data is read based on the waveform of the torque value shown in FIG. 12(a). However, for example, the torque value can also be read based on a moving average of the torque value. A moving average line of the torque value in FIG. 12(a) is shown in FIG. 14.

As is clear from FIG. 13(a) and FIG. 13(b), the torque value stabilizes as the added amount of the dispersant increases. The stabilization can be determined by the rate of change decreasing and a slope thereof approaching zero. Two approximate straight lines can be prescribed based on the relationship between the added amount of the dispersant and the rate of change in the torque value. Steps thereof are as follows.

As shown in FIG. 13(b), two approximate lines are determined by a least squares method for the added amount and the rate of change in the torque value in relation to the added amount. The rate of change in torque is obtained by the difference in the torque value being divided by a difference in a rate of addition, and a unit thereof is N·m/wt %. A first approximate line is an approximate line that drastically changes, in which the rate of change in the torque value significantly changes as a result of the addition of the dispersant from an added amount of 0 wt %. A second approximate line is an approximate line in which the dispersion is stable as a result of the dispersant being added at a required amount, for example, and the changes in the torque value are gradual. For the first approximate line, plots that are used for approximation are added in order from a side on which the added amount is low, and the first approximate line is determined using the plots of which a coefficient of determination $R^2$ is greatest and closest to 1. At this time, because $R^2$ is 1 when the plots are two points, three points or more are used for the plots to determine approximation. The second approximate line is an approximate line in which three or more points are selected from plots that are from a plot at which the added amount is large second to the plots that are used to derive the first approximate line to a last test plot of which the added amount is the greatest, and an absolute value of a slope of the approximate line determined by the least squares method is smallest.

The added amount of the dispersant at an intersection of the approximate lines is the optimal amount α weight %. The result is shown in Table 24. In addition, regarding example 1, example 2, and comparative examples 1 to 5 as well, the optimal amount α of the dispersant was determined in a manner similar to that for example 3. The results are shown in Table 23 and Table 24. FIG. 15 to FIG. 19 show the relationship between the added amount of the dispersant and the torque value, and the relationship between the added amount of the dispersant and the rate of change in the torque value of the examples and comparative examples, in a manner similar to those for example 3 in FIG. 13. FIGS. 21(a) and (b) show the relationship between the added amount of the dispersant and the torque value of examples 1 to 3 and comparative examples 1 to 4. Here, the straight lines in FIG. 15 to FIG. 19 are approximate lines, and the added amount at the intersection is the optimal amount α of the dispersant. Table 23 and Table 24 show the optimal amount α of the dispersant and an actual added amount of the dispersant in the examples and comparative examples.

Next, to study dispersibility in the green bodies in examples 1 to 3 and comparative examples 1 to 5, variations in green body density were measured. Specifically, the green body after kneading and before molding was removed, and measurement samples were obtained by the green body being scooped out from eight random positions. The measurement sample was placed in a measurement tool that has a diameter of 25 mm and a length of 20 mm, and compressed under conditions of a pressing speed of 1 mm/min and pressure of 1 kN. Subsequently, height and weight of the measurement sample removed from the measurement tool were measured, and the density was calculated from the results. Next, a difference of an actual measurement value of the green body density in relation to a theoretical green body density that can be calculated based on a composition of the raw materials in advance was calculated. When the measurement value is less than the theoretical green body density and a width of variance is large, this means that wettability of the measurement sample is poor. In this case, air is present on a particle surface and, for example, cracks and the like may occur as a result of firing. Meanwhile, if the theoretical green body density and the measurement value are similar values, it can be said that dispersibility is good. Results thereof are shown in Table 23 and Table 24.

TABLE 23

| Measurement target No. | Material name | Manufacturer, place of production or product name, product number | HSP distance Ra to water | Compar. example 1 Selection | Compar. example 2 Selection | Compar. example 3 Selection | Compar. example 4 Selection | Example 1 Selection |
|---|---|---|---|---|---|---|---|---|
| S1 | Aluminum hydroxide A | Manufacturer A | 32.5 | ○ | | | | ○ |
| S2 | Aluminum hydroxide D | Manufacturer B | 29.3 | | ○ | ○ | ○ | |
| S3 | Alumina | Manufacturer C | 30.1 | | | | | |
| S4 | Silica | Manufacturer D | 26.8 | | | | | |
| S5 | Kaolin | Manufacturer E | 26.5 | | | | | |
| S6 | Talc A | Manufacturer F | 37.1 | | | | | ○ |
| S7 | Talc B | Manufacturer G Place of production A | 28.2 | ○ | | ○ | | |
| S8 | Talc C | Manufacturer G Place of production B | 36.8 | | ○ | | ○ | |
| S9 | Talc D | Manufacturer G Place of production C | 30.3 | | | | | |
| L1 | Canola oil | — | | ○ | | ○ | ○ | ○ |
| L2 | Dispersant A | Unilube* 50MB-26 | | | | | | |
| L3 | Dispersant B | Unilube* 750E-25 | | | | | | |
| L4 | Dispersant C | Unilube* 25TG-55 | | | | | | |
| Result of overlap of Hansen spheres | | | | x | x | x | x | ○ |
| Variations in density relative to theoretical density of dispersion body (green body) | | | | about 10% | about 10% | about 10% | about 10% | 5% or less |

| Measurement target No. | Material name | Manufacturer, place of production or product name, product number | HSP distance Ra to water | Example 2 Selection | Example 3 Selection | Example 4 Selection | Example 5 Selection |
|---|---|---|---|---|---|---|---|
| S1 | Aluminum hydroxide A | Manufacturer A | 32.5 | ○ | ○ | ○ | ○ |
| S2 | Aluminum hydroxide D | Manufacturer B | 29.3 | | | | |
| S3 | Alumina | Manufacturer C | 30.1 | | | | |
| S4 | Silica | Manufacturer D | 26.8 | | | | |
| S5 | Kaolin | Manufacturer E | 26.5 | | | | |
| S6 | Talc A | Manufacturer F | 37.1 | | ○ | ○ | ○ |
| S7 | Talc B | Manufacturer G Place of production A | 28.2 | | | | |

TABLE 23-continued

| | | | | | | | |
|---|---|---|---|---|---|---|---|
| S8 | Talc C | Manufacturer G Place of production B | 36.8 | | | | |
| S9 | Talc D | Manufacturer G Place of production C | 30.3 | ○ | | | |
| L1 | Canola oil | — | | ○ | | | |
| L2 | Dispersant A | Unilube* 50MB-26 | | | ○ | | |
| L3 | Dispersant B | Unilube* 750E-25 | | | | ○ | |
| L4 | Dispersant C | Unilube* 25TG-55 | | | | | ○ |
| Result of overlap of Hansen spheres | | | | ○ | ○ | ○ | ○ |
| Variations in density relative to theoretical density of dispersion body (green body) | | | | 5% or less | 5% or less | 5% or less | 5% or less |

*Unilube is a registered trademark.

TABLE 24

| Measurement target No. | Material name | Manufacturer, place of production or product name, product number | HSP distance Ra to water | Example 6 Selection | Example 7 Selection | Example 8 Selection | Example 9 Selection | Example 10 Selection | Example 11 Selection |
|---|---|---|---|---|---|---|---|---|---|
| S1 | Aluminum hydroxide A | Manufacturer A | 32.5 | ○ | ○ | ○ | ○ | ○ | ○ |
| S2 | Aluminum hydroxide D | Manufacturer B | 29.3 | | | | | | |
| S3 | Alumina | Manufacturer C | 30.1 | | | | | | |
| S4 | Silica | Manufacturer D | 26.8 | | | | | | |
| S5 | Kaolin | Manufacturer E | 26.5 | | | | | | |
| S6 | Talc A | Manufacturer F | 37.1 | | | | | | |
| S7 | Talc B | Manufacturer G Place of production A | 28.2 | ○ | ○ | ○ | | | |
| S8 | Talc C | Manufacturer G Place of production B | 36.8 | | | | ○ | ○ | ○ |
| S9 | Talc D | Manufacturer G Place of production C | 30.3 | | | | | | |
| L1 | Canola oil | — | — | | | | ○ | | |
| L2 | Dispersant A | Unilube* 50MB-26 | — | ○ | | | | ○ | |
| L3 | Dispersant B | Unilube* 750E-25 | — | | ○ | | | | |
| L4 | Dispersant C | Unilube* 25TG-55 | — | | | ○ | | | ○ |
| Result of overlap of Hansen spheres | | | | ○ | ○ | ○ | ○ | ○ | ○ |
| Variations in density relative to theoretical density of dispersion body (green body) | | | | | | | | | |

*Unilube is a registered trademark.

As is clear from Table 24, in the comparative examples 1 to 5, an average value of the results of the green body density that have actually been measured is about 10% lower than the theoretical green body density in each case. In addition, although not shown in the tables, variations based on the extraction location of the green body were significant, and a location in which the actual measurement value of the green body density was 17% lower compared to the theoretical value was present. In contrast, in the examples 1 to 3, the variance from the theoretical value was equal to or less than 5% in terms of average value, specifically low-valued locations were not present, and variations were small. Furthermore, as is clear from FIG. 21(a) and FIG. 21(b), the torque values are clearly smaller in examples 1 to 3, compared to those in comparative example 1 and comparative example 2. In example 3, the torque value is 19% less than that in comparative example 1.

Figure 21:
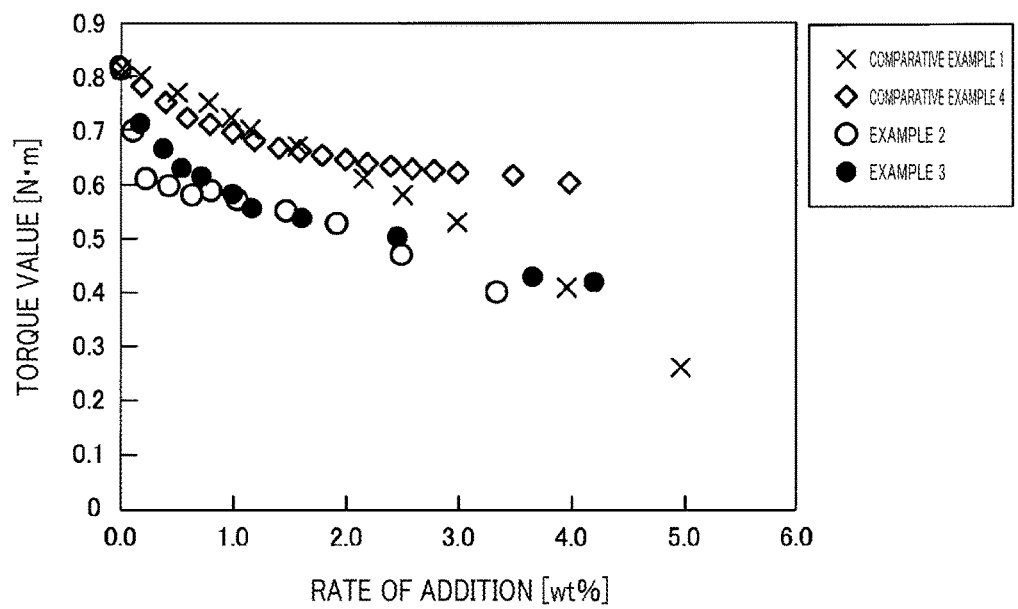
FIG. 21(a) is a diagram showing a relationship between the added amount of dispersant and the torque value in comparative example 1, comparative example 4, example 2, and example 3.
FIG. 21(b) is a diagram showing a relationship between the added amount of dispersant and the torque value in example 1, comparative example 2, and comparative example 3.
Figure 21:
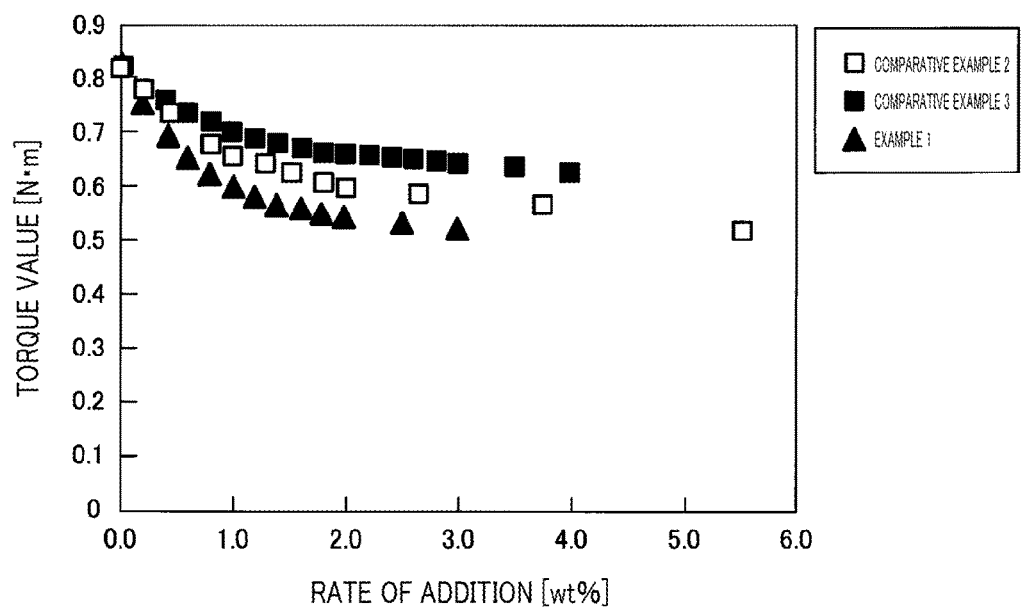

As is clear from Table 23 and Table 24, in examples 1 and 2, the optimal amount α of the dispersant is determined. In the manufacturing of the dispersion body, at least the optimal amount α of the dispersant is added. The optimal amount α in the examples are about 23% to 74% less than that in comparative example 2, for example. Comparative example 1 is an example in which canola oil is used as the dispersant. As described above, the Hansen sphere S29 of canola oil does not overlap the Hansen sphere S12 of aluminum hydroxide D. As shown in FIG. 15 and FIG. 21, when overlap with the Hansen sphere S1 is not present as in canola oil, the torque value may not stabilize and the optimal amount α may be difficult to determine. In addition, in comparative example 5, a green body is fabricated with an added amount that is less than the optimal amount α. As a result, the density variation in relation to the theoretical density of the dispersion body is significant, as described above. Furthermore, in comparative example 5, when a honeycomb molded body is molded, variations in molding speed inside a mold surface is significant. In the molded body, a shape defect in which a cylindrical outer peripheral wall and a cell wall that partitions the cells separate occurs.

In addition, honeycomb structures were manufactured by molding, drying, and firing being performed in a manner similar to that according to the third embodiment using the green bodies of example 1, example 2, comparative example 1, and comparative example 2. As a result of a premise that changes are not made to temperature increase-speed conditions, in example 1 and example 2, a rate of defects during firing was less than half in each case, in relation to comparative example 1 and comparative example 2.

Furthermore, pastes of compositions similar to those of examples 1 to 3 and comparative examples 1 to 5 where prepared, and the dispersibility of these pastes was evaluated. The viscosity of the paste was measured by the method according to the first embodiment, using the capillary rheometer. In addition, the dispersibility based on pressure variation was evaluated by the method according to the first embodiment. As a result, in the examples, the viscosity was 20% to 40% lower compared to the comparative examples. Furthermore, in the examples, the yield point hardly changed while fluidity improved, compared to the comparative examples. In the evaluation results regarding dispersibility, although pressure increase was not found in the examples, pressure increased by about 10% to 30% in the comparative examples.

Experiment Example 2

A present example is an example in which solid particles and a dispersant that are used to manufacture a honeycomb structure that is composed of cordierite are selected. Specifically, the solid particles and the dispersant that are used to manufacture the second honeycomb structure for the exhaust gas purification filter are selected. The second honeycomb structure has a structure that is similar to that of the first honeycomb structure. The exhaust gas purification filter is formed by a sealing portion that alternately seals the cells of the second honeycomb structure on both ends in the axial direction thereof being formed.

In the manufacturing of the second honeycomb structure for the exhaust gas purification filter, porous silica, aluminum hydroxide, and talc are used such that a desired cordierite composition is obtained. Then, a dispersion body is manufactured by these raw materials, water, and a liquid dispersant being mixed. The dispersion body was then molded, dried, and fired and the honeycomb structure was thereby manufactured.

The raw materials for the exhaust gas purification filter were selected based on the HSP values, the HSP distances Ra to water, and the Hansen spheres of the measurement targets that were measured in experiment example 1. The results are shown in Table 25 and FIG. 22 to FIG. 25. In example 4 and example 5, as the solid particles, at least porous silica and talc A were selected and, as the dispersant, the dispersant A or the dispersant C was selected. These solid particles and the dispersant, as well as aluminum hydroxide and water were mixed, and a green body for the second honeycomb structure was prepared. In addition, in example 6 and 7, as the solid particles, at least porous silica and talc B were selected and, as the dispersant, the dispersant A or the dispersant C was selected. These solid particles and the dispersant, as well as aluminum hydroxide and water were mixed, and a green body for the second honeycomb structure was prepared. The raw material that has the greatest mixing amount (that is, mass ratio) among the solid particles that are used in the manufacturing of the dispersion body (specifically, the green body for the exhaust gas purification filter) of the present example is aluminum hydroxide, and the raw material that has the second greatest mixing amount is talc. In addition, the solid particles of which the HSP distance to water is the greatest in the solid particle candidate group is porous silica, and the solid particles of which the HSP distance is the second greatest is talc A.

Moreover, the optimal amount α of the dispersant was determined by a method similar to that in experiment example 1, by the torque method. The relationship between the added amount of the dispersant and the torque value, and the relationship between the added amount of the dispersant and the rate of change in torque of the examples and comparative examples are shown in FIG. 26 to FIG. 30. The optimal amount α was determined as the added amount of the dispersant at the intersection of the approximate lines, based on the relationship between the added amount of the dispersant and the rate of change in torque, in a manner similar to that in experiment example 1. The results thereof are shown in Table 25.

TABLE 25

| Measurement target No. | Material name | Manufacturer, place of production or product name, product number | HSP distance Ra to water | Compar. example 5 Selection | Compar. example 6 Selection | Compar. example 7 Selection | Compar. example 8 Selection | Example 12 Selection | Example 13 Selection | Example 14 Selection | Example 15 Selection |
|---|---|---|---|---|---|---|---|---|---|---|---|
| S10 | Aluminum hydroxide B | Manufacturer A | 28.1 | | | | | | | | |
| S11 | Aluminum hydroxide C | Manufacturer B | 26.9 | | | | | | | | |
| S12 | Talc A | Manufacturer F | 37.1 | | | | | ○ | ○ | ○ | ○ |
| S13 | Talc B | Manufacturer G Place of production A | 28.2 | ○ | ○ | ○ | ○ | | | | |
| S14 | Porous silica | Manufacturer H | 39.0 | ○ | ○ | ○ | ○ | ○ | ○ | ○ | ○ |
| L1 | Canola oil | — | — | ○ | | | | ○ | | | |
| L2 | Dispersant A | Unilube* 50MB-26 | — | | ○ | | | | ○ | | |

TABLE 25-continued

| Measurement target No. | Material name | Manufacturer, place of production or product name, product number | HSP distance Ra to water | Compar. example 5 Selection | Compar. example 6 Selection | Compar. example 7 Selection | Compar. example 8 Selection | Example 12 Selection | Example 13 Selection | Example 14 Selection | Example 15 Selection |
|---|---|---|---|---|---|---|---|---|---|---|---|
| L3 | Dispersant B | Unilube* 750E-25 | — | | | ○ | | | | ○ | |
| L4 | Dispersant C | Unilube* 25TG-55 | — | | | | ○ | | | | ○ |
| | Result of overlap of Hansen spheres | | | x | x | x | x | ○ | ○ | ○ | ○ |

*Unilube is a registered trademark.

Figure 22:
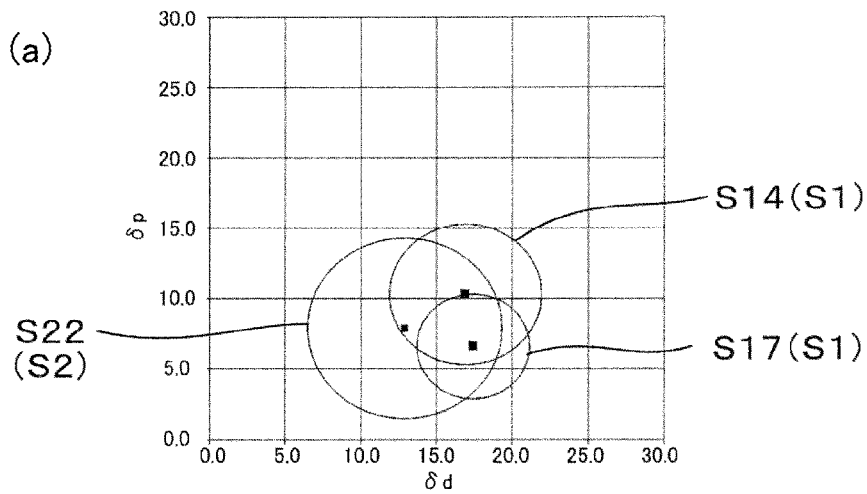
FIG. 22(a) to (c) are explanatory diagrams of overlap of the Hansen spheres of solid particles and a dispersant in comparative example 6.
Figure 22:
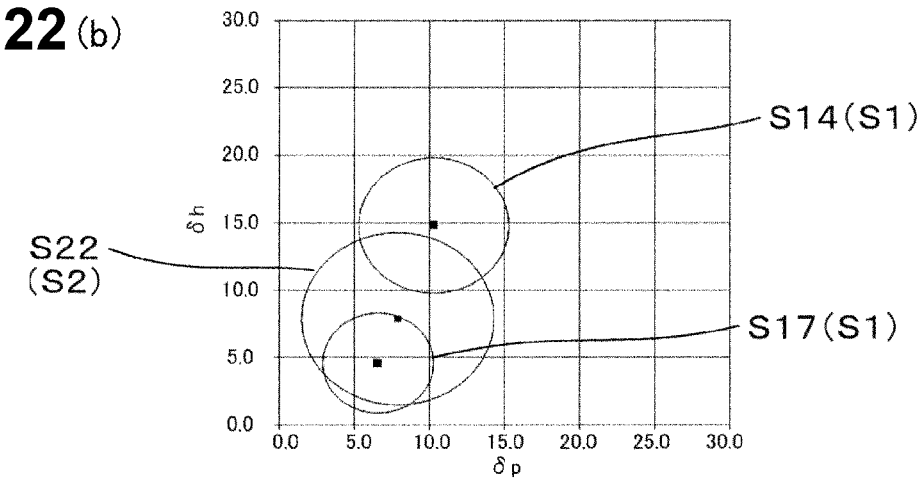
Figure 22:
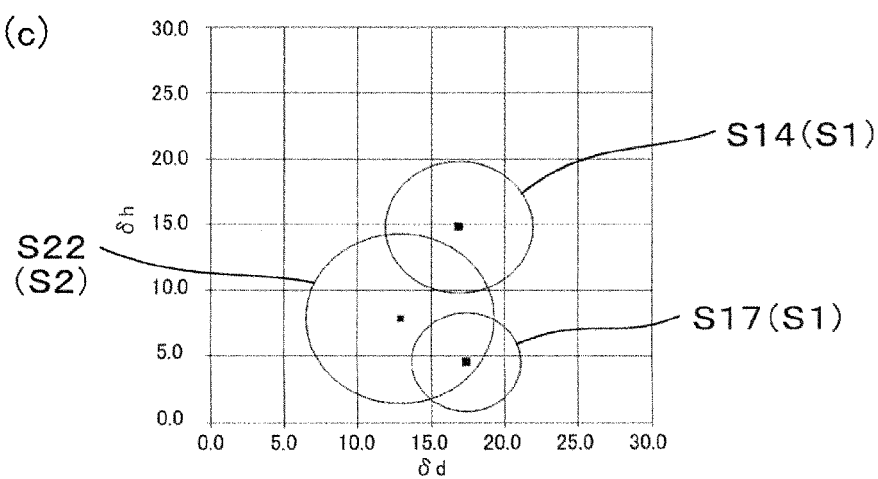
Figure 23:
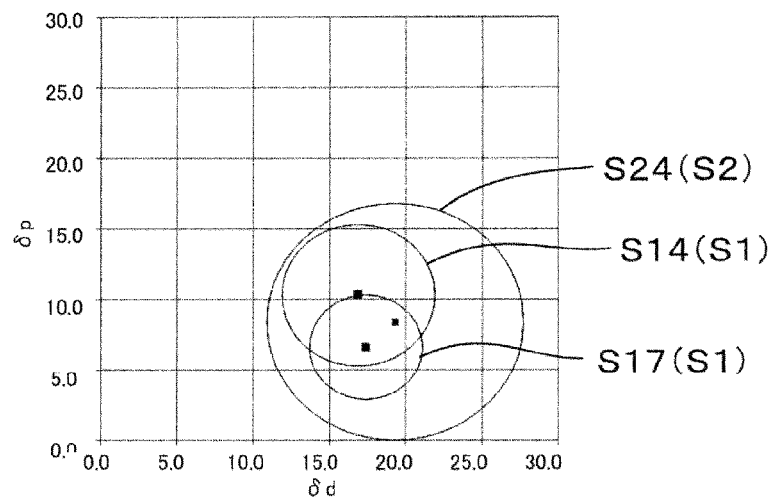
FIG. 23(a) to (c) are explanatory diagrams of overlap of the Hansen spheres of solid particles and a dispersant in comparative example 7.
Figure 23:
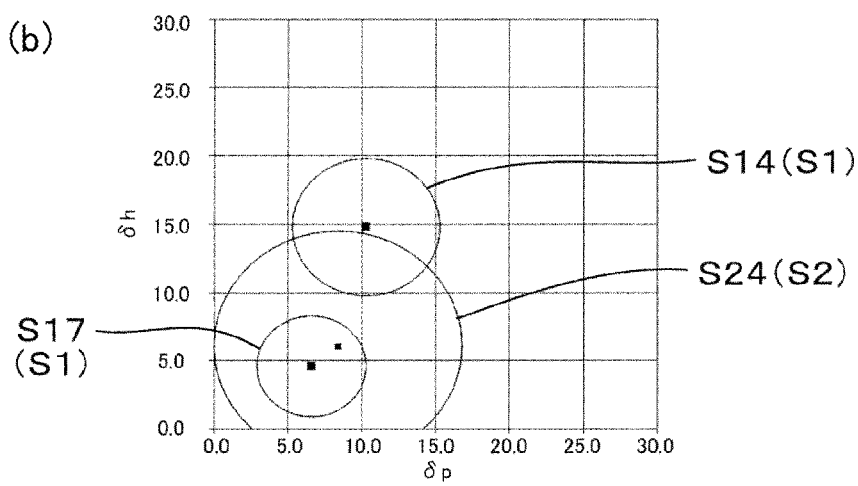
Figure 23:
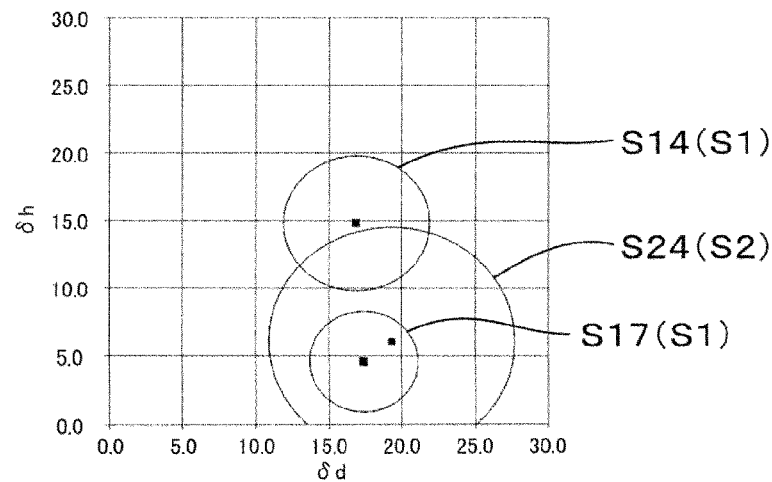
Figure 24:
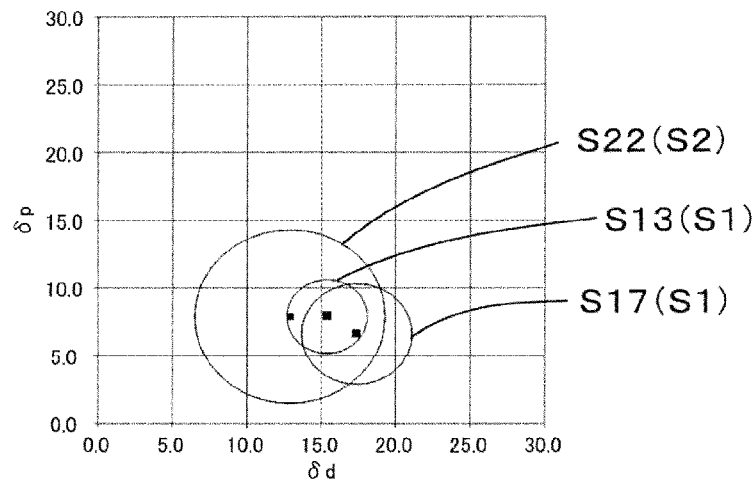
FIG. 24(a) to (c) are explanatory diagrams of overlap of the Hansen spheres of solid particles and a dispersant in example 4.
Figure 24:
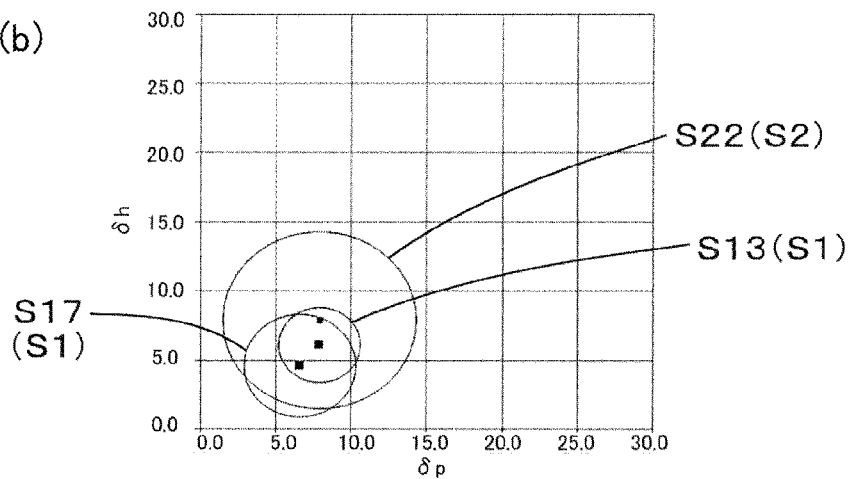
Figure 24:
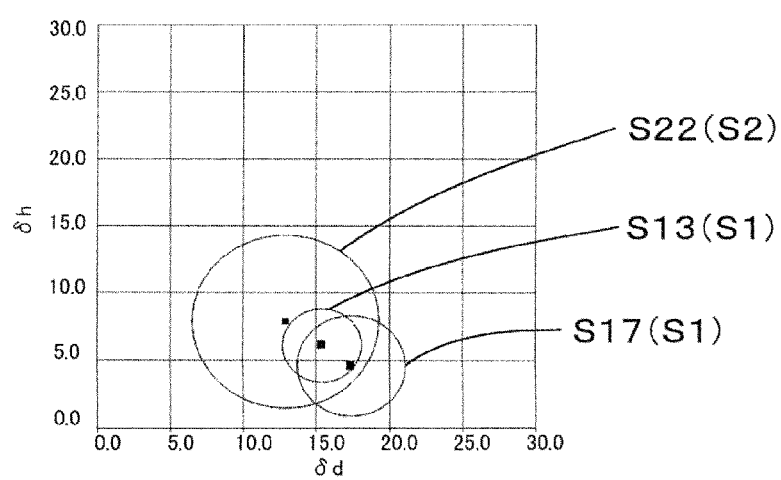
Figure 25:
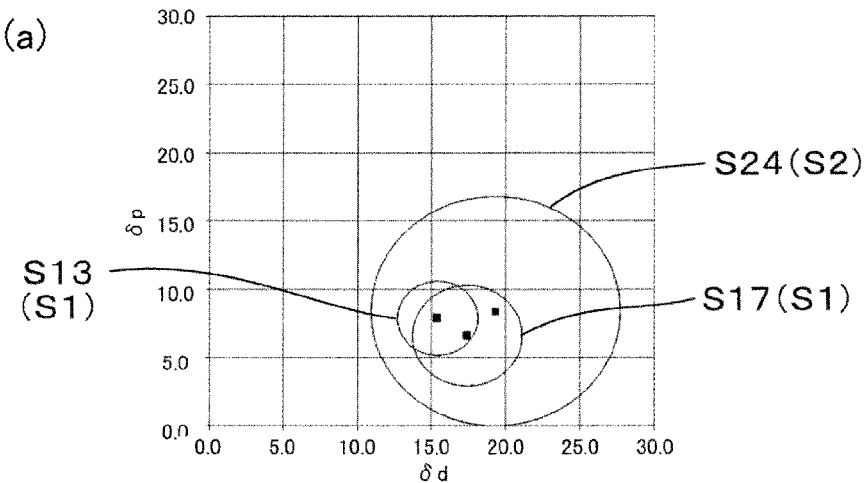
FIG. 25(a) to (c) are explanatory diagrams of overlap of the Hansen spheres of solid particles and a dispersant in example 5.
Figure 25:
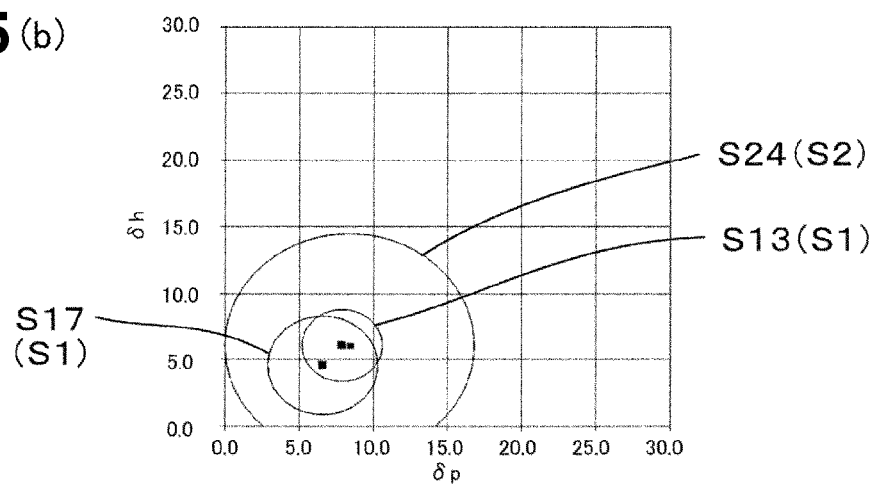
Figure 25:
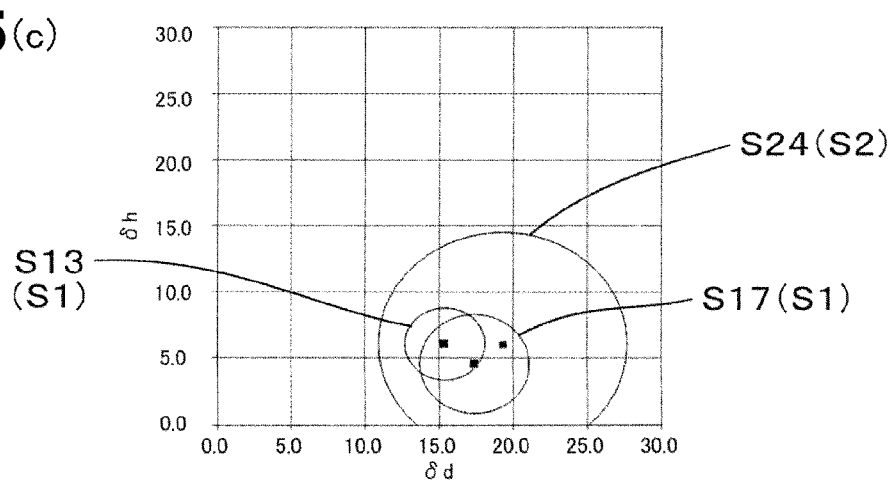
Figure 26A:
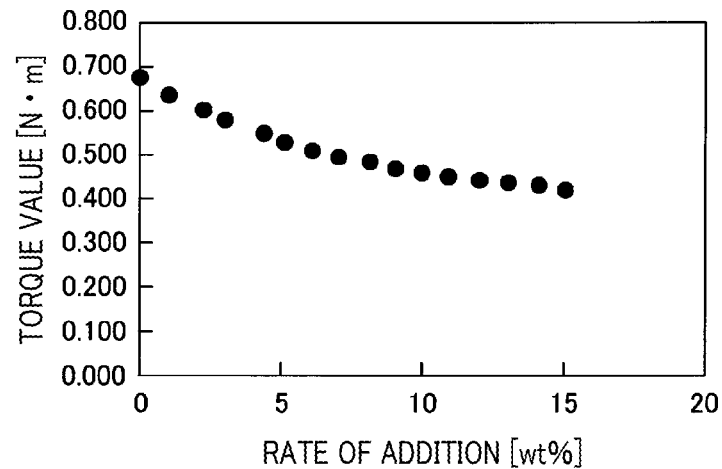
FIG. 26(a) is a diagram showing a relationship between the added amount of dispersant and the torque value in comparative example 6.
Figure 26B:
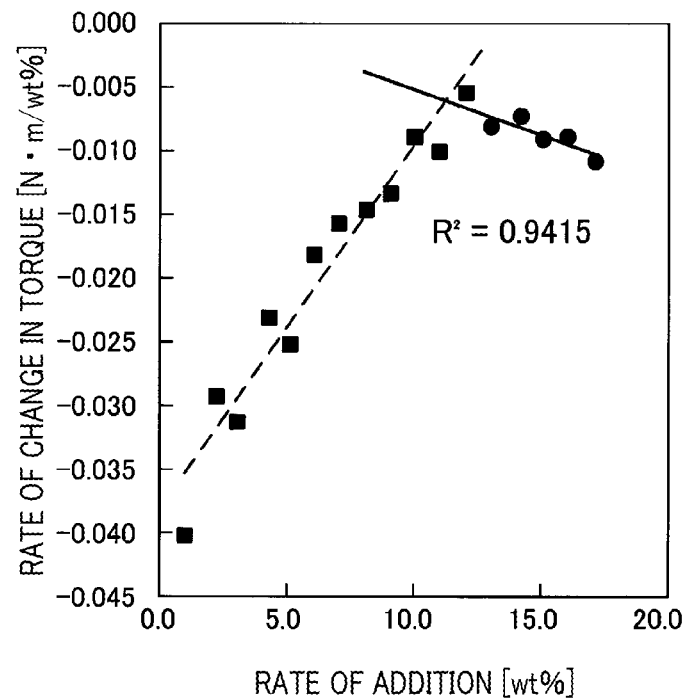
FIG. 26(b) is a diagram showing a relationship between the added amount of dispersant and the rate of change in torque in comparative example 6.
Figure 27A:
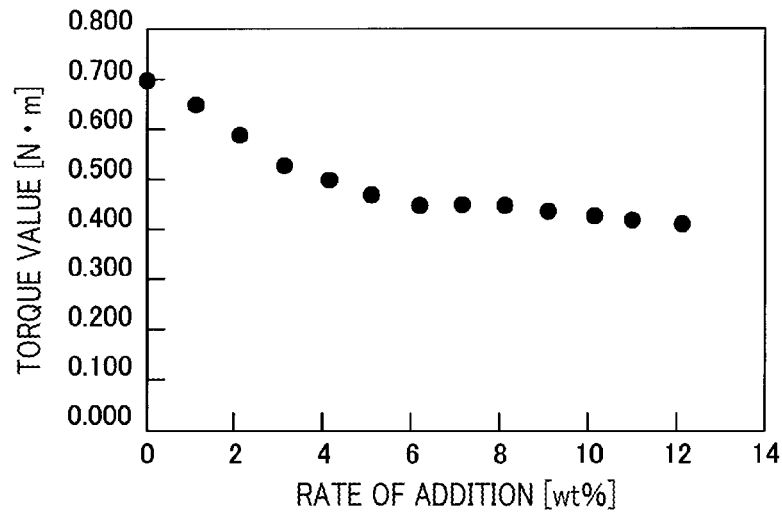
FIG. 27(a) is a diagram showing a relationship between the added amount of dispersant and the torque value in comparative example 7.
Figure 27B:
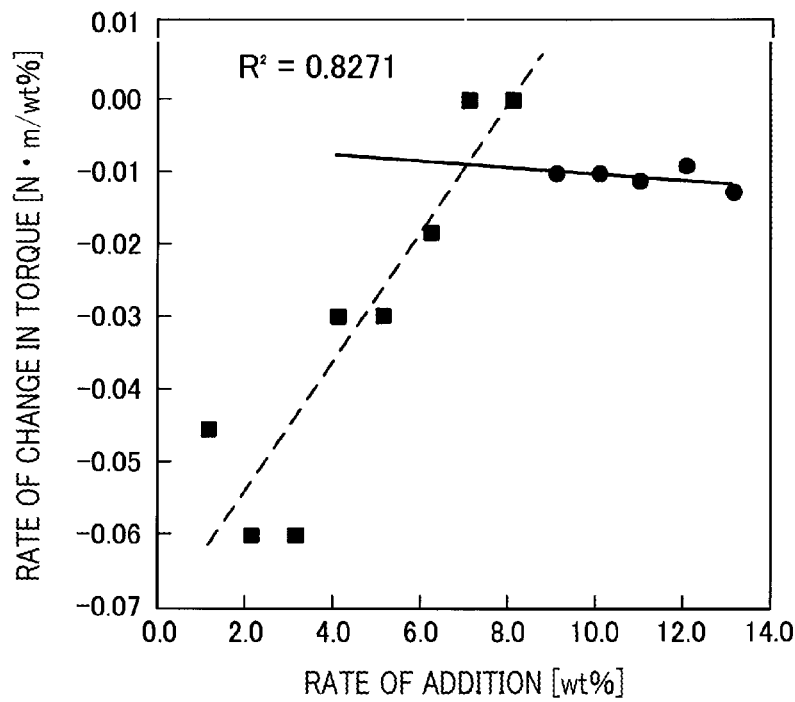
FIG. 27(b) is a diagram showing a relationship between the added amount of dispersant and the rate of change in torque in comparative example 7.
Figure 28A:
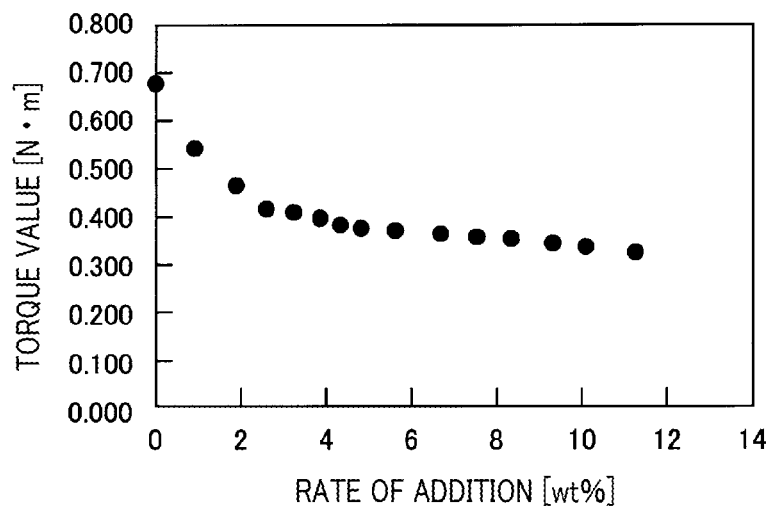
FIG. 28(a) is a diagram showing a relationship between the added amount of dispersant and the torque value in example 4.
Figure 28B:
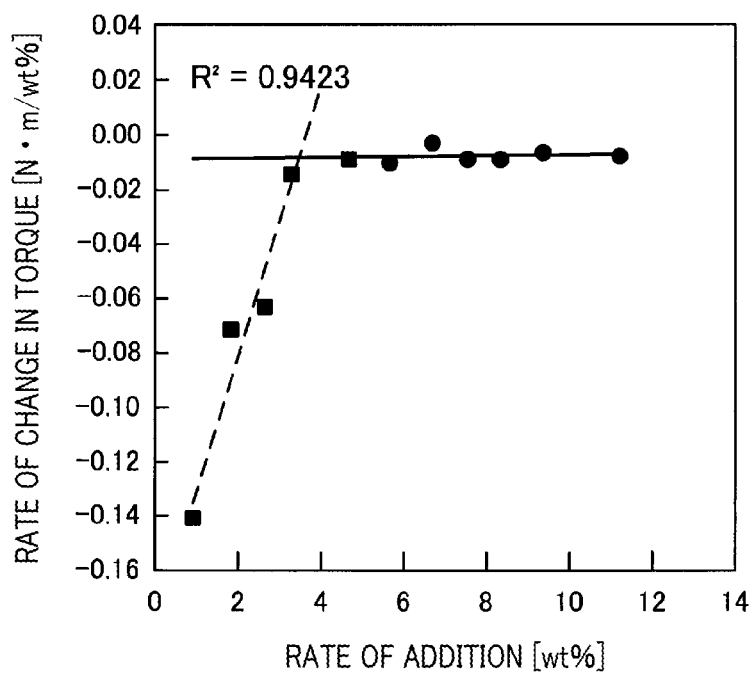
FIG. 28(b) is a diagram showing a relationship between the added amount of dispersant and the rate of change in torque in example 4.
Figure 29:
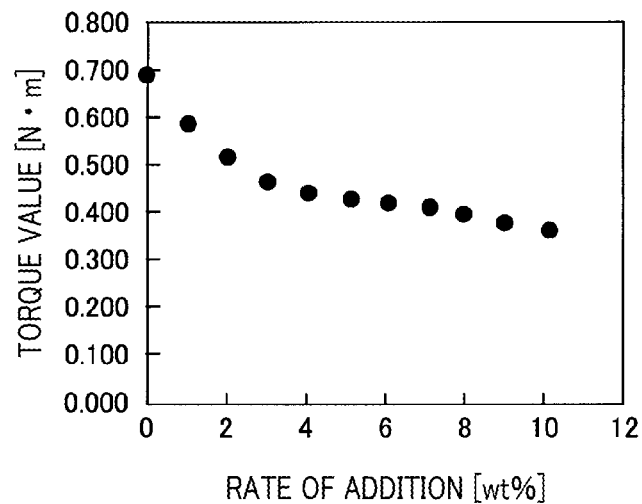
FIG. 29(a) is a diagram showing a relationship between the added amount of dispersant and the torque value in example 5.
FIG. 29(b) is a diagram showing a relationship between the added amount of dispersant and the rate of change in torque in example 5.
Figure 29:
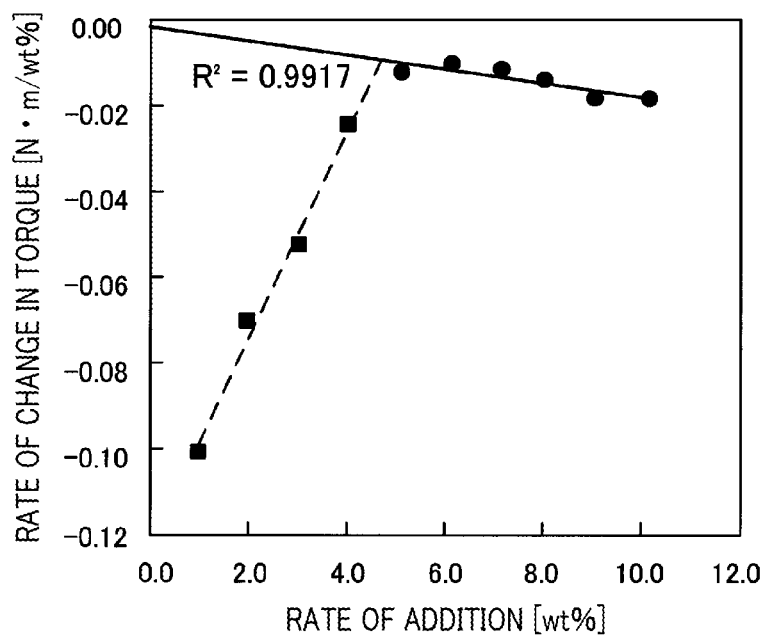
Figure 30:
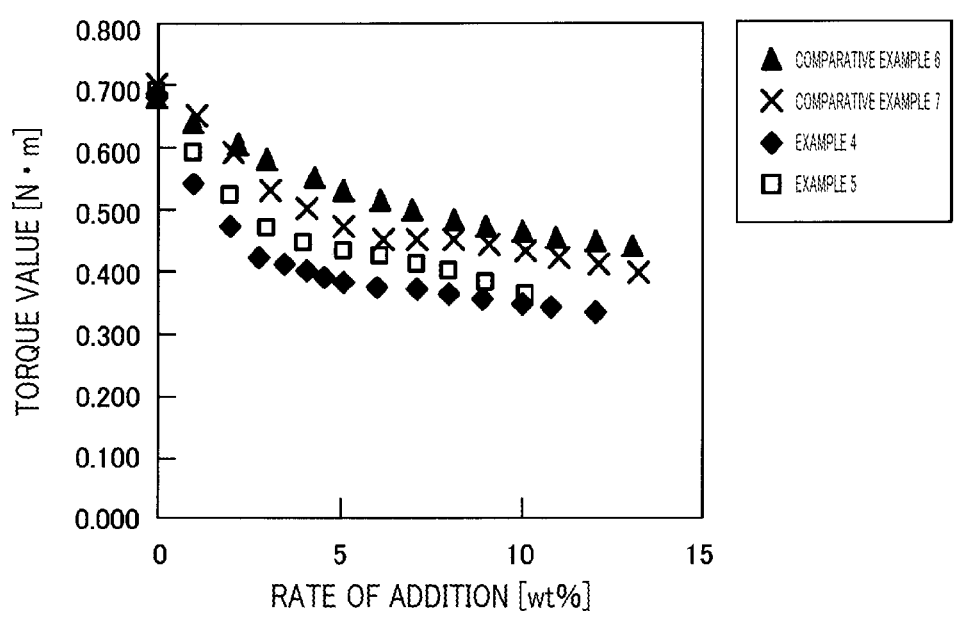
FIG. 30 is a diagram showing a relationship between the added amount of dispersant and the torque value in example 4, example 5, comparative example 6, and comparative example 7.

As is clear from Table 25, the HSP distance Ra of porous silica to water is 39.0. This value is the greatest among the solid particles that are used. Furthermore, as shown in Table 25, and FIG. 24 and FIG. 25, the Hansen sphere S17 of porous silica and the Hansen sphere S13 of talc A overlap the Hansen sphere S22 of the dispersant A and the Hansen sphere S24 of the dispersant C. Therefore, the green bodies in examples 4 and 5 can be said to have favorable dispersibility based on the results of experiment example 2. Meanwhile, as shown in FIG. 22 and FIG. 23, the Hansen sphere S14 of talc B does not overlap the Hansen sphere S22 of the Hansen sphere S2A of the dispersant A and the Hansen sphere S24 of the dispersant C. Therefore, the green bodies in comparative example 6 and comparative example 7 can be said to have poor dispersibility based on the results of experiment example 2. In actuality, as is clear from FIG. 30, the green bodies in example 4 and example 5 have lower torque compared to those in comparative example 5 and comparative example 6. In addition, as is clear from Table 25, regarding the optimal amount α of the dispersant, example 4 is about 44% to 56% less than comparative example 6 and comparative example 7, and example 5 is 30% to 58% less than comparative example 7.

The present disclosure is not limited to the above-described embodiments and examples and can be applied to various embodiments without departing from the spirit of the invention. According to the embodiments and in the examples, as the dispersion body, the green body that is used in the manufacturing of the honeycomb structure is mainly described. However, the present disclosure can also be applied to other technical fields in which solid particles such as ceramic raw materials, water, and a dispersant are mixed. Specifically, gas sensors, solid-state batteries, and spark plugs can be used as examples. The present technology is widely applied to products that include a sintered body such as ceramics.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A manufacturing method for manufacturing a dispersion body by mixing a plurality of types of solid particles, water, and a liquid dispersant, the manufacturing method comprising:

using at least two types of the solid particles and at least one type of the dispersant that are selected based on a material type selection method for selecting the solid particles and the dispersant such that Hansen spheres of at least two types of the solid particles and a Hansen sphere of at least one type of the dispersant mutually overlap, and a Hansen solubility parameter distance to water of at least one type of the solid particles of which the Hansen spheres overlap that of the liquid is greatest among all solid particles used in manufacturing of the dispersion body; and adding and mixing at least an optimal amount of the dispersant that is determined based on an optimal amount determination method for fabricating a mixture by mixing all materials that are used in the manufacturing of the dispersion body, excluding the dispersant, measuring viscosity when the dispersant is gradually added to the mixture while an added amount is increased, and setting, as the optimal amount, the added amount when changes in the viscosity begin to stabilize.

2. A manufacturing method for manufacturing a dispersion body by mixing a plurality of types of solid particles, water, and a liquid dispersant, the manufacturing method comprising:

using at least two types of the solid particles and at least one type of the dispersant that are selected based on a material type selection method for selecting at least two types of solid particles from a solid particle candidate group of which a Hansen solubility parameter distance to water is equal to or greater than 28 MPa$^{1/2}$, and selecting the solid particles and the dispersant such that Hansen spheres of the solid particles and a Hansen sphere of at least one type of the dispersant from a dispersant candidate group mutually overlap; and adding and mixing at least an optimal amount of the dispersant that is determined based on an optimal amount determination method for fabricating a mixture by mixing all materials that are used in the manufacturing of the dispersion body, excluding the dispersant, measuring viscosity when the dispersant is gradually added to the mixture while an added amount is increased, and setting, as the optimal amount, the added amount when changes in the viscosity begin to stabilize.

3. The manufacturing method for a dispersion body according to claim 1, further comprising:

measuring the viscosity as a torque value of the mixture during kneading; and setting, as the optimal amount, the added amount when changes in the torque value begin to stabilize.

4. The manufacturing method for a dispersion body according to claim 2, further comprising:
   measuring the viscosity as a torque value of the mixture during kneading; and
   setting, as the optimal amount, the added amount when changes in the torque value begin to stabilize.

5. The manufacturing method for a dispersion body according to claim 1, further comprising:
   acquiring a graph of the added amount of the dispersant and a rate of change in the viscosity;
   approximating the graph by two straight lines; and
   setting, as the optimal amount, an intersection of approximate straight lines.

6. The manufacturing method for a dispersion body according to claim 2, further comprising:
   acquiring a graph of the added amount of the dispersant and a rate of change in the viscosity;
   approximating the graph by two straight lines; and
   setting, as the optimal amount, an intersection of approximate straight lines.

7. The manufacturing method for a dispersion body according to claim 3, further comprising:
   acquiring a graph of the added amount of the dispersant and a rate of change in the viscosity;
   approximating the graph by two straight lines; and
   setting, as the optimal amount, an intersection of approximate straight lines.

8. The manufacturing method for a dispersion body according to claim 4, further comprising:
   acquiring a graph of the added amount of the dispersant and a rate of change in the viscosity;
   approximating the graph by two straight lines; and
   setting, as the optimal amount, an intersection of approximate straight lines.

9. The manufacturing method for a dispersion body according to claim 1, further comprising:
   adding the dispersant at the optimal amount that is $\alpha$ weight % or more and $2\alpha$ weight % or less.

10. The manufacturing method for a dispersion body according to claim 2, further comprising:
    adding the dispersant at the optimal amount that is $\alpha$ weight % or more and $2\alpha$ weight % or less.

11. The manufacturing method for a dispersion body according to claim 3, further comprising:
    adding the dispersant at the optimal amount that is $\alpha$ weight % or more and $2\alpha$ weight % or less.

12. The manufacturing method for a dispersion body according to claim 4, further comprising:
    adding the dispersant at the optimal amount that is $\alpha$ weight % or more and $2\alpha$ weight % or less.

13. The manufacturing method for a dispersion body according to claim 5, further comprising:
    adding the dispersant at the optimal amount that is $\alpha$ weight % or more and $2\alpha$ weight % or less.

14. The manufacturing method for a dispersion body according to claim 6, further comprising:
    adding the dispersant at the optimal amount that is $\alpha$ weight % or more and $2\alpha$ weight % or less.

15. The manufacturing method for a dispersion body according to claim 7, further comprising:
    adding the dispersant at the optimal amount that is $\alpha$ weight % or more and $2\alpha$ weight % or less.

16. The manufacturing method for a dispersion body according to claim 8, further comprising:
    adding the dispersant at the optimal amount that is $\alpha$ weight % or more and $2\alpha$ weight % or less.

17. A manufacturing method for a ceramic sintered body, comprising:
    using a ceramic raw material as solid particles are; and
    molding and firing a dispersion body that is obtained by a manufacturing method for manufacturing a dispersion body by mixing a plurality of types of solid particles, water, and a liquid dispersant, the manufacturing method comprising:
    using at least two types of the solid particles and at least one type of the dispersant that are selected based on a material type selection method for selecting the solid particles and the dispersant such that Hansen spheres of at least two types of the solid particles and a Hansen sphere of at least one type of the dispersant mutually overlap, and a Hansen solubility parameter distance to water of at least one type of the solid particles of which the Hansen spheres overlap that of the liquid is greatest among all solid particles used in manufacturing of the dispersion body; and
    adding and mixing at least an optimal amount of the dispersant that is determined based on an optimal amount determination method for fabricating a mixture by mixing all materials that are used in the manufacturing of the dispersion body, excluding the dispersant, measuring viscosity when the dispersant is gradually added to the mixture while an added amount is increased, and setting, as the optimal amount, the added amount when changes in the viscosity begin to stabilize.

18. A manufacturing method for a ceramic sintered body, comprising:
    using a ceramic raw material as the solid particles are; and
    molding and firing a dispersion body that is obtained by a manufacturing method for manufacturing a dispersion body by mixing a plurality of types of solid particles, water, and a liquid dispersant, the manufacturing method comprising:
    using at least two types of the solid particles and at least one type of the dispersant that are selected based on a material type selection method for selecting at least two types of solid particles from a solid particle candidate group of which a Hansen solubility parameter distance to water is equal to or greater than 28 $MPa^{1/2}$, and selecting the solid particles and the dispersant such that Hansen spheres of the solid particles and a Hansen sphere of at least one type of the dispersant from a dispersant candidate group mutually overlap; and
    adding and mixing at least an optimal amount of the dispersant that is determined based on an optimal amount determination method for fabricating a mixture by mixing all materials that are used in the manufacturing of the dispersion body, excluding the dispersant, measuring viscosity when the dispersant is gradually added to the mixture while an added amount is increased, and setting, as the optimal amount, the added amount when changes in the viscosity begin to stabilize.

19. The manufacturing method for a ceramic sintered body according to claim 17, wherein:
    the ceramic sintered body has a honeycomb structure.

20. The manufacturing method for a ceramic sintered body according to claim 18, wherein:
    the ceramic sintered body has a honeycomb structure.

* * * * *